Jan. 6, 1953     B. E. PHELPS     2,624,507
ELECTRONIC CALCULATING MACHINE
Filed Sept. 27, 1945     23 Sheets-Sheet 1
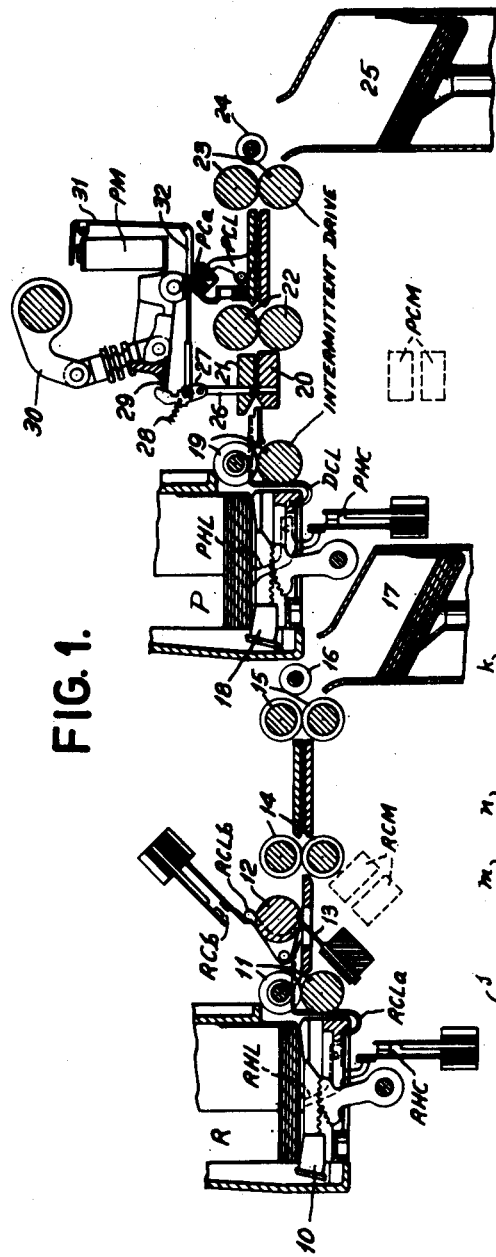
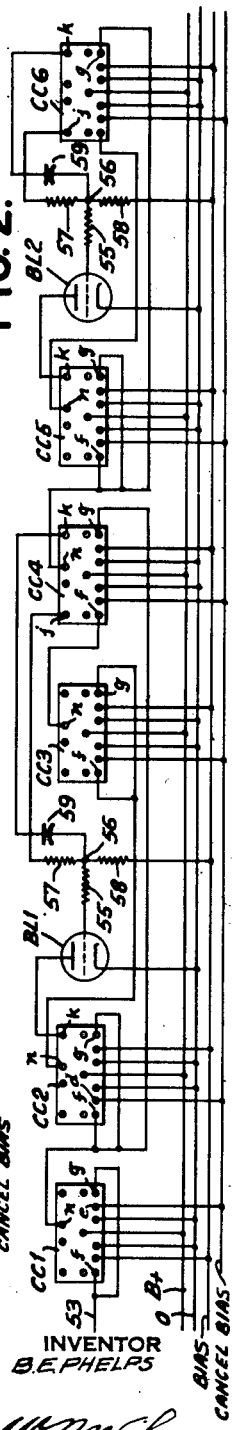
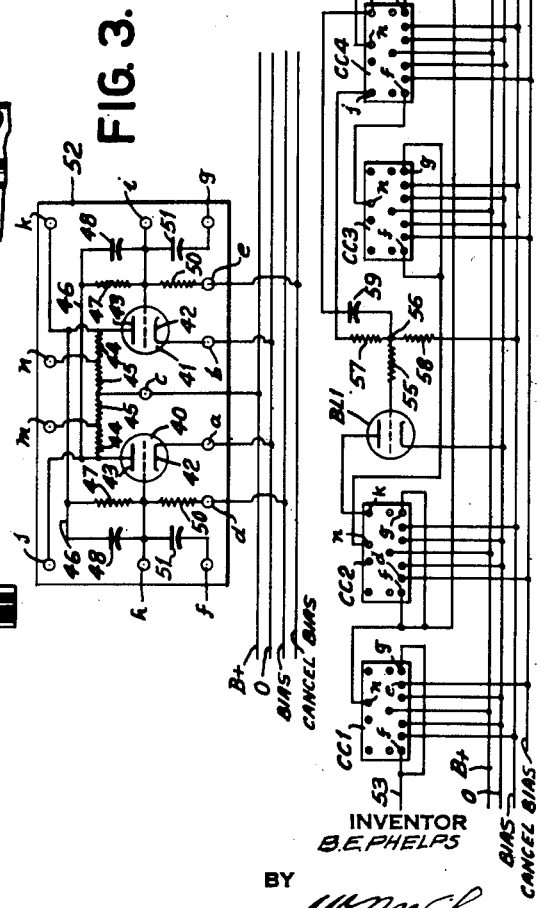
INVENTOR
B.E. PHELPS
BY
ATTORNEY Jan. 6, 1953   B. E. PHELPS   2,624,507
ELECTRONIC CALCULATING MACHINE
Filed Sept. 27, 1945   23 Sheets-Sheet 2
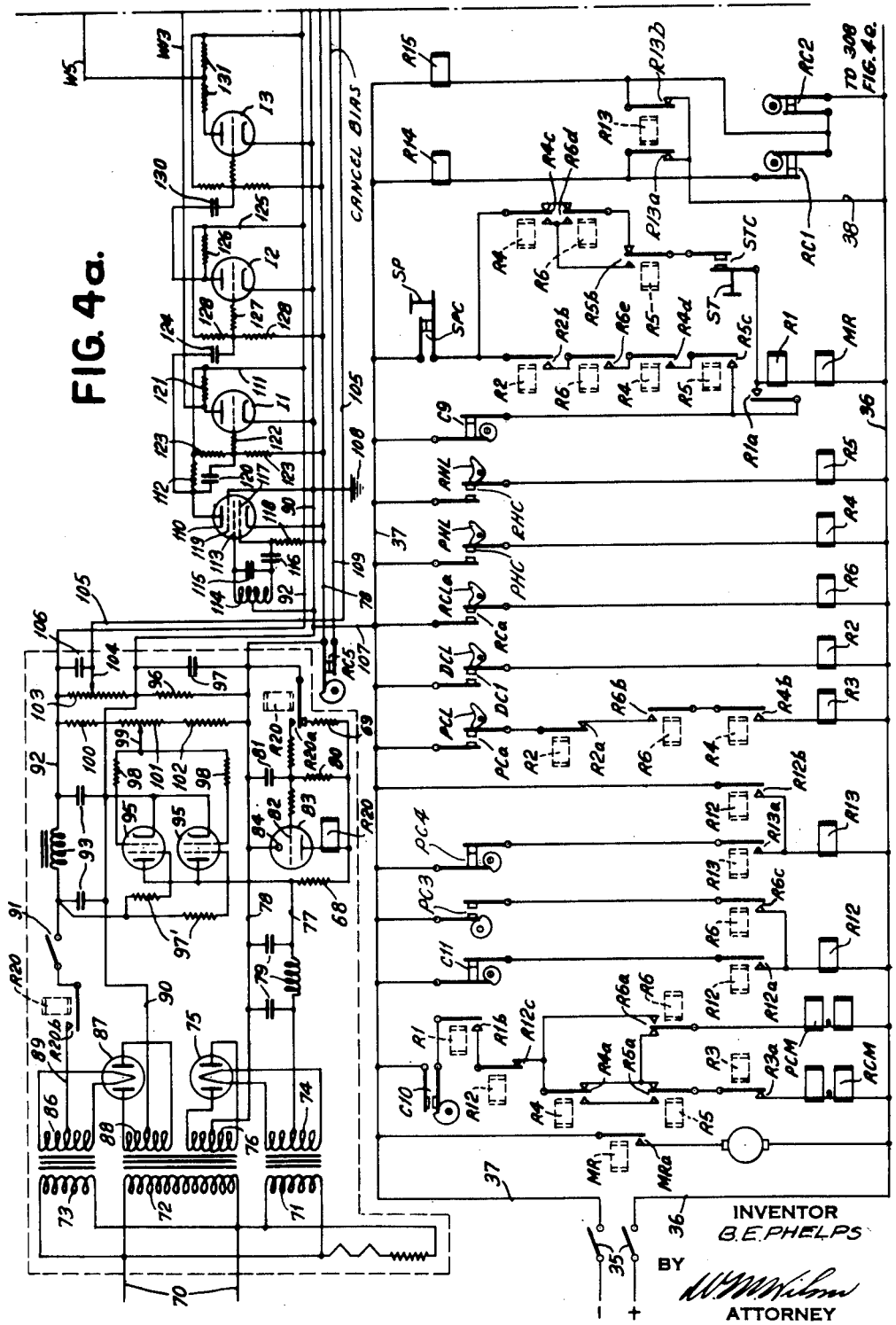
INVENTOR
B.E. PHELPS
BY
ATTORNEY Jan. 6, 1953  B. E. PHELPS  2,624,507
ELECTRONIC CALCULATING MACHINE
Filed Sept. 27, 1945  23 Sheets-Sheet 3

INVENTOR
B.E. PHELPS
BY
ATTORNEY

Jan. 6, 1953          B. E. PHELPS          2,624,507
ELECTRONIC CALCULATING MACHINE
Filed Sept. 27, 1945                             23 Sheets-Sheet 4
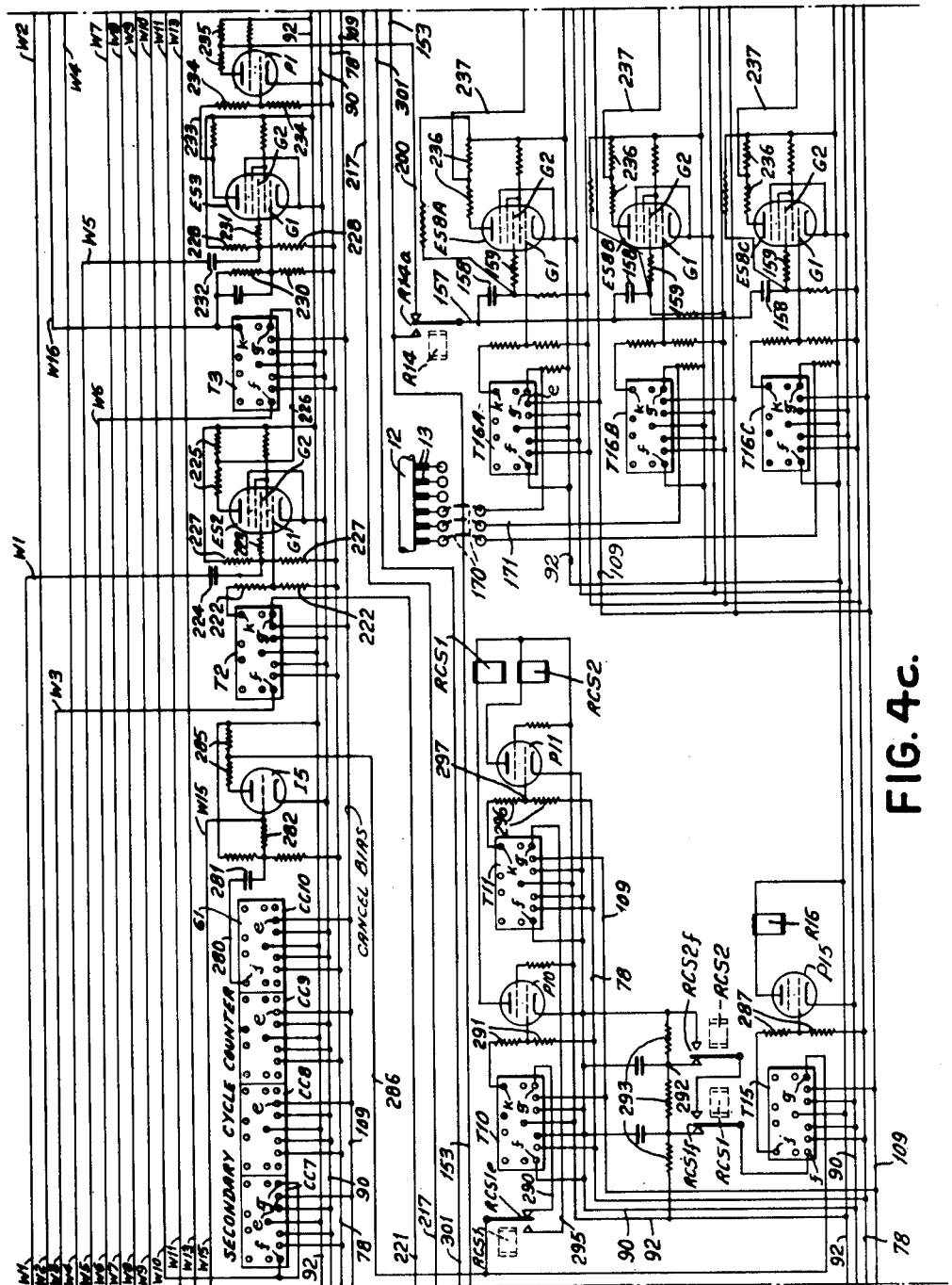
FIG. 4c.
INVENTOR
B. E. PHELPS
BY
ATTORNEY

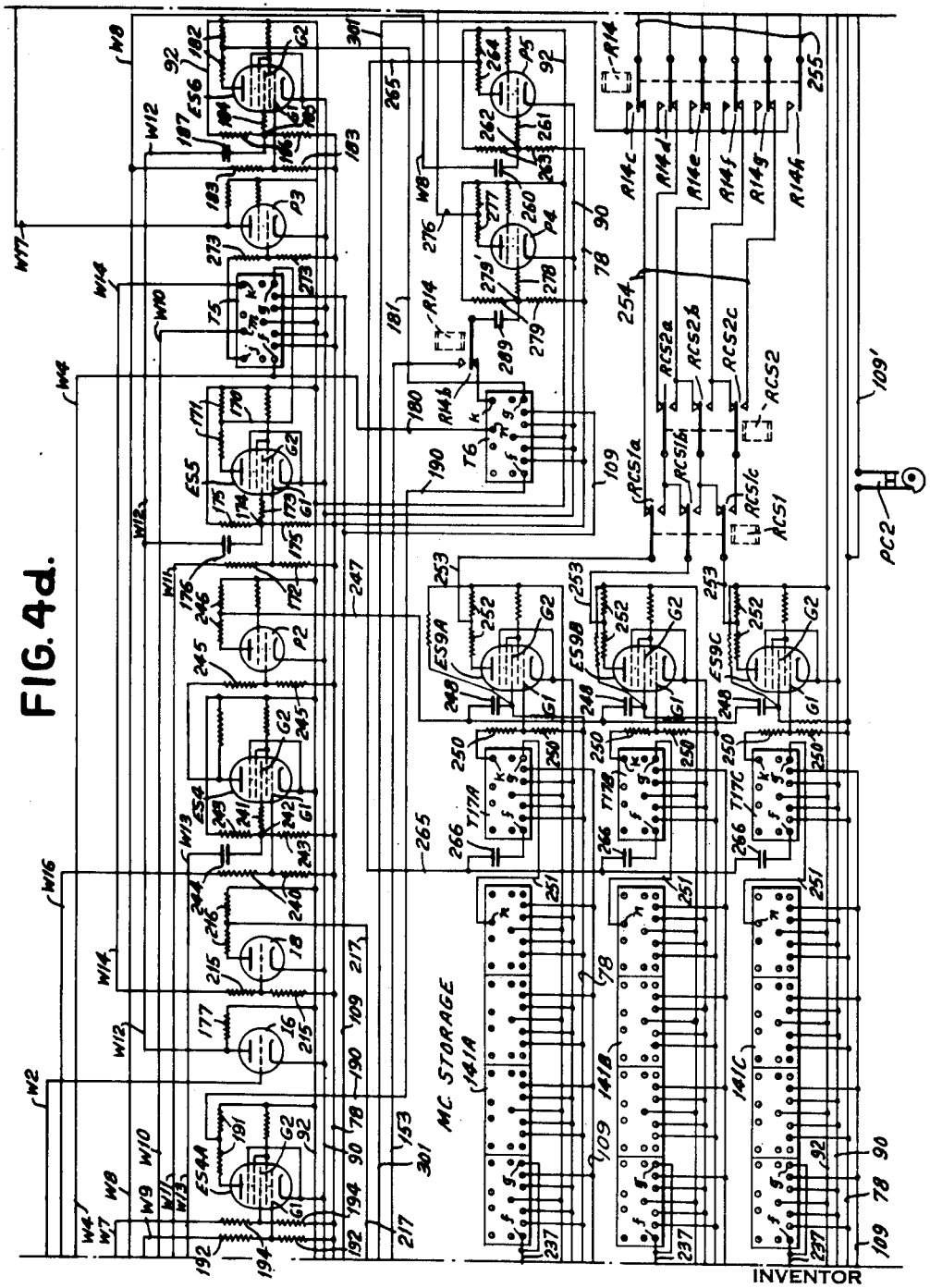

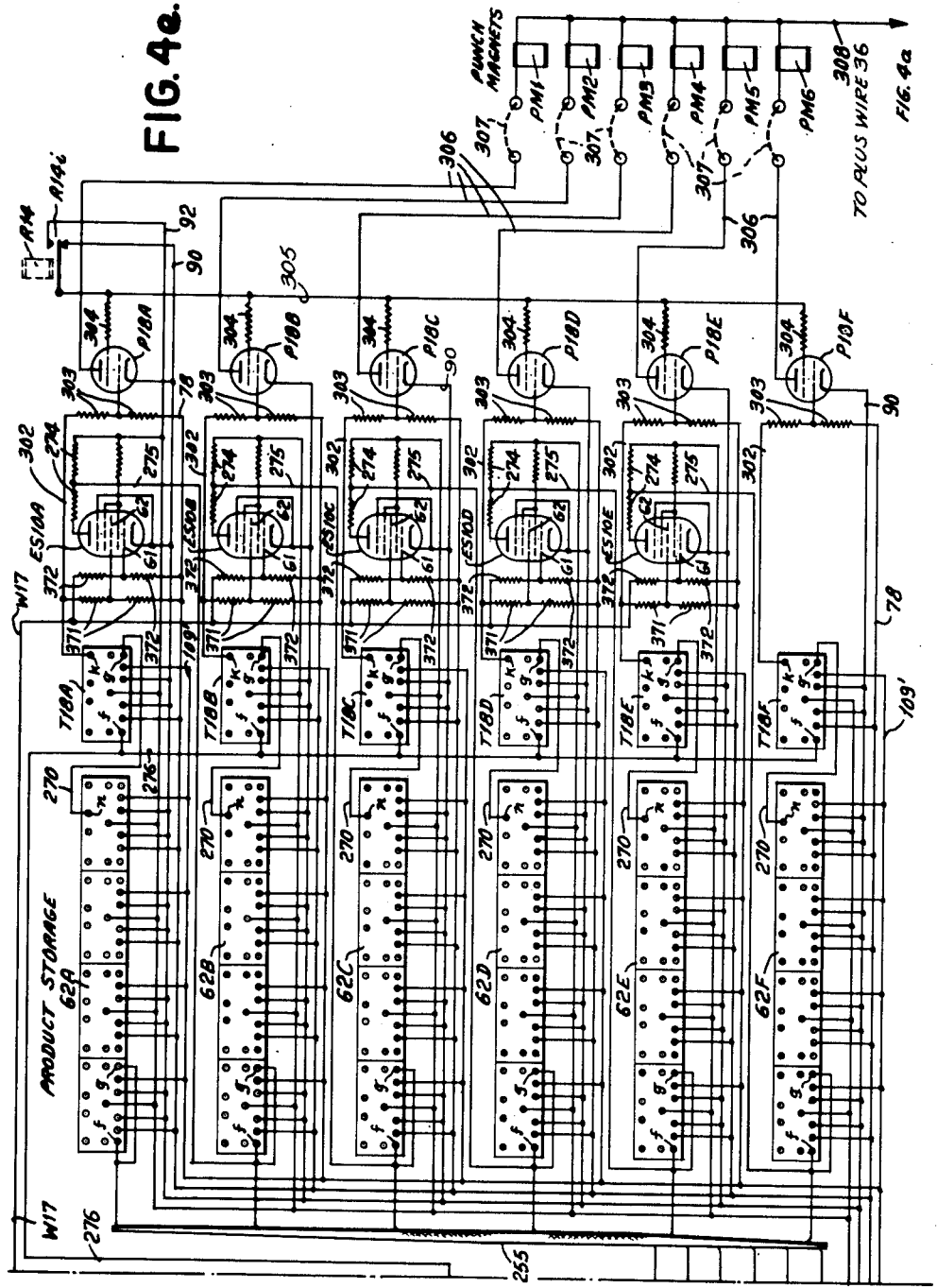

Jan. 6, 1953  B. E. PHELPS  2,624,507
ELECTRONIC CALCULATING MACHINE
Filed Sept. 27, 1945  23 Sheets-Sheet 7

INVENTOR
B.E.PHELPS
BY
ATTORNEY

Jan. 6, 1953   B. E. PHELPS   2,624,507
ELECTRONIC CALCULATING MACHINE
Filed Sept. 27, 1945   23 Sheets-Sheet 8

INVENTOR
B.E.PHELPS
BY
ATTORNEY

Jan. 6, 1953    B. E. PHELPS    2,624,507
ELECTRONIC CALCULATING MACHINE
Filed Sept. 27, 1945    23 Sheets-Sheet 11
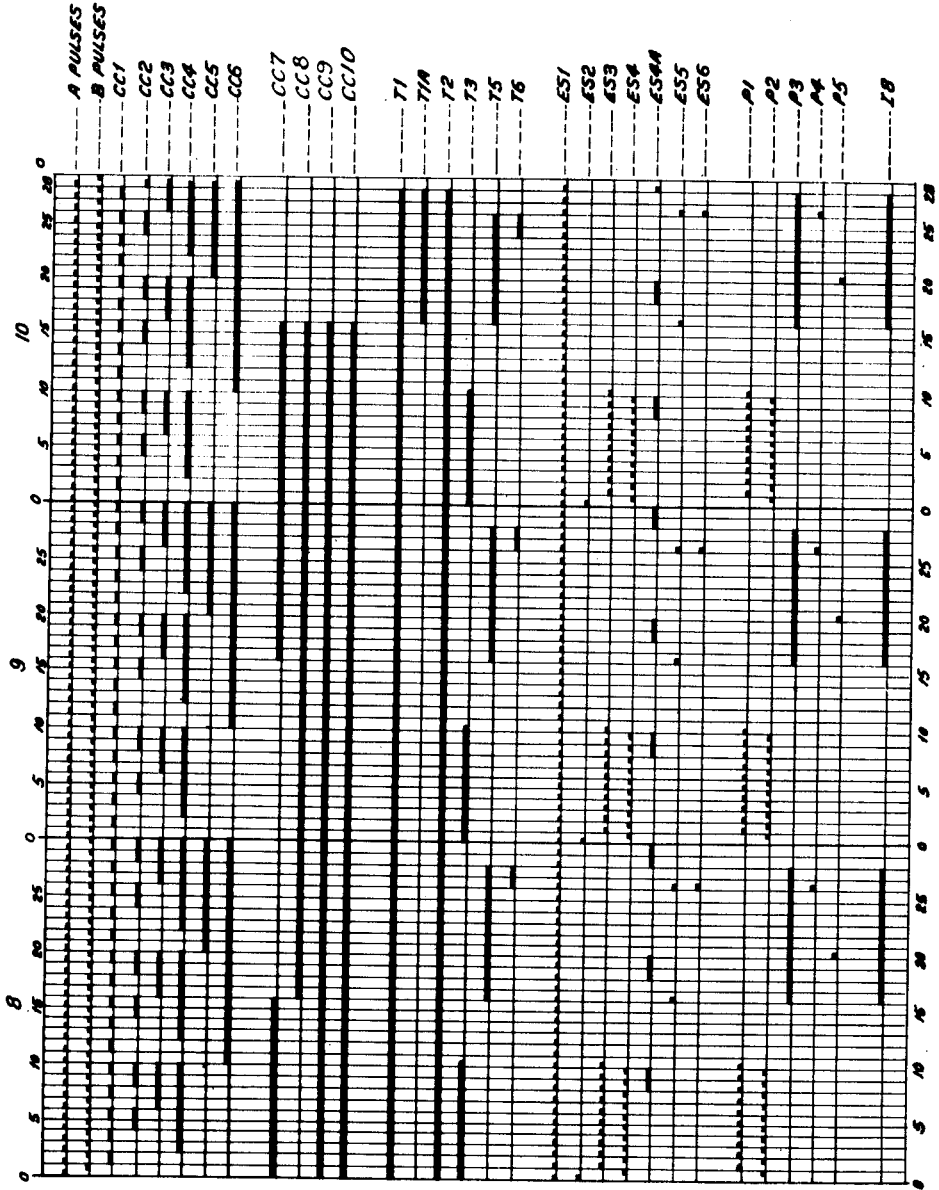
INVENTOR
B.E. PHELPS
BY
ATTORNEY Jan. 6, 1953  B. E. PHELPS  2,624,507
ELECTRONIC CALCULATING MACHINE
Filed Sept. 27, 1945  23 Sheets-Sheet 12
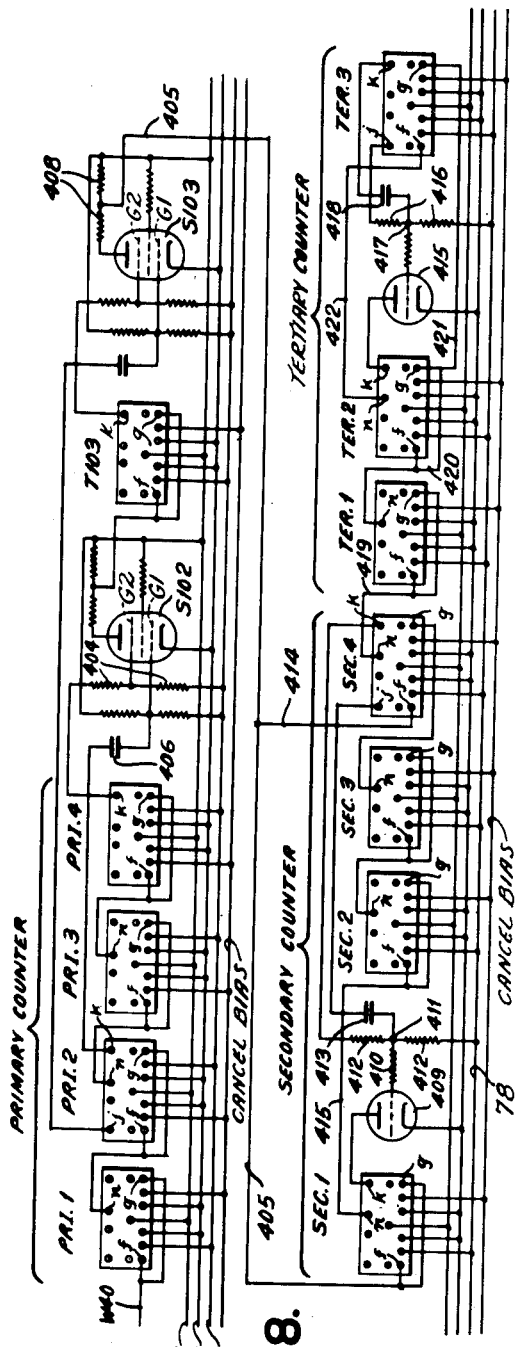
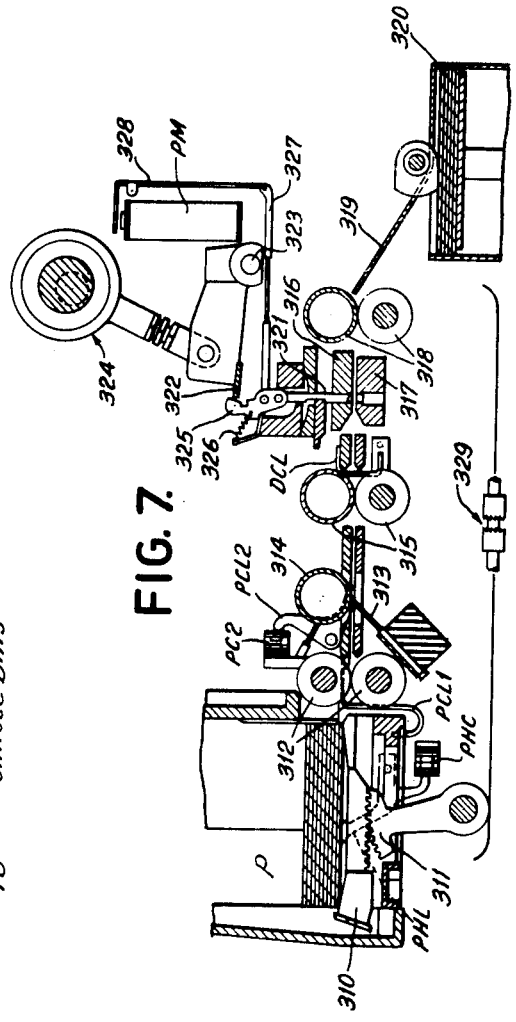
INVENTOR
B.E. PHELPS
BY
ATTORNEY

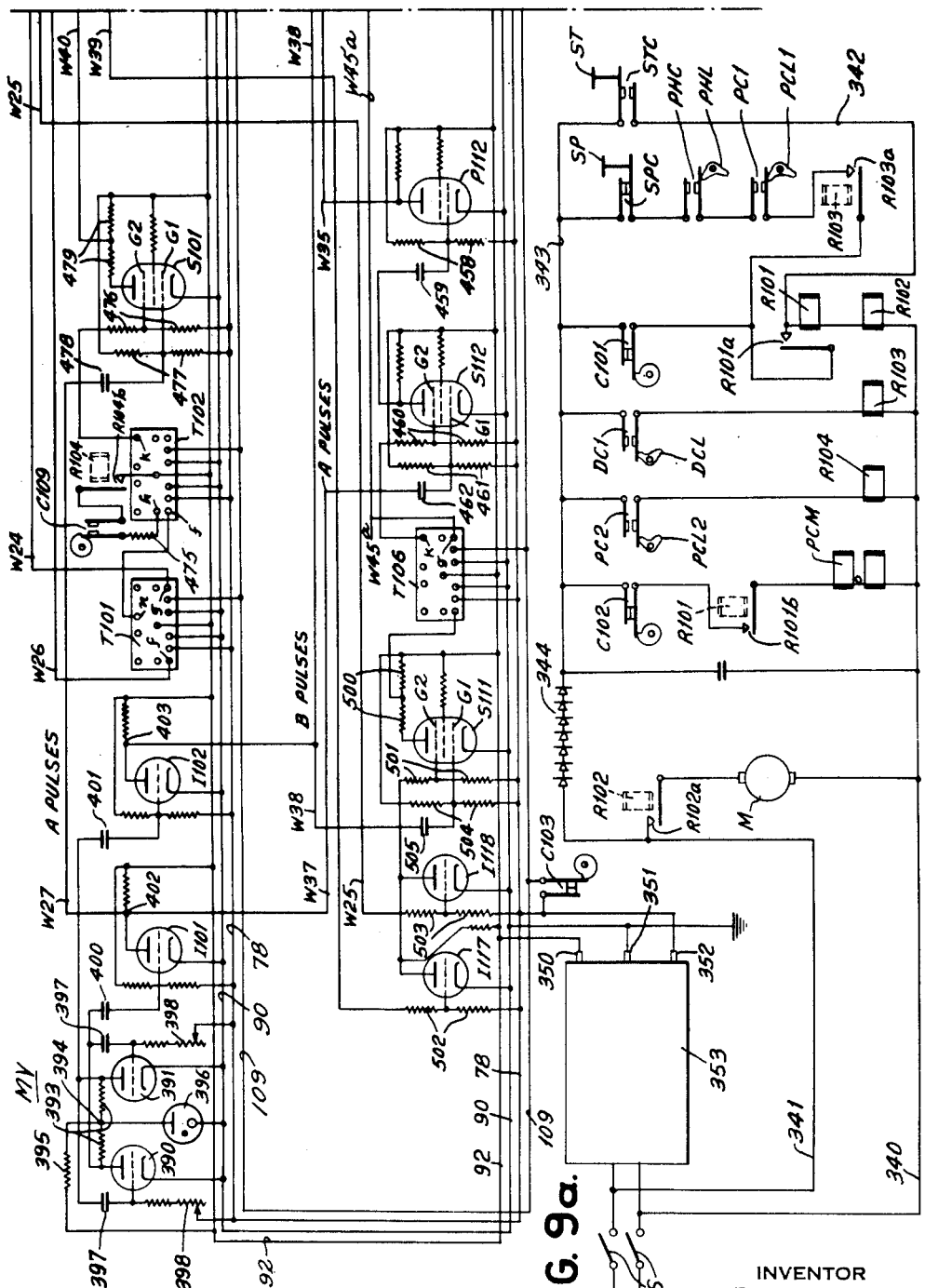

Jan. 6, 1953 — B. E. PHELPS — 2,624,507
ELECTRONIC CALCULATING MACHINE
Filed Sept. 27, 1945 — 23 Sheets-Sheet 15

INVENTOR
B.E. PHELPS

Jan. 6, 1953     B. E. PHELPS     2,624,507
ELECTRONIC CALCULATING MACHINE
Filed Sept. 27, 1945     23 Sheets-Sheet 16
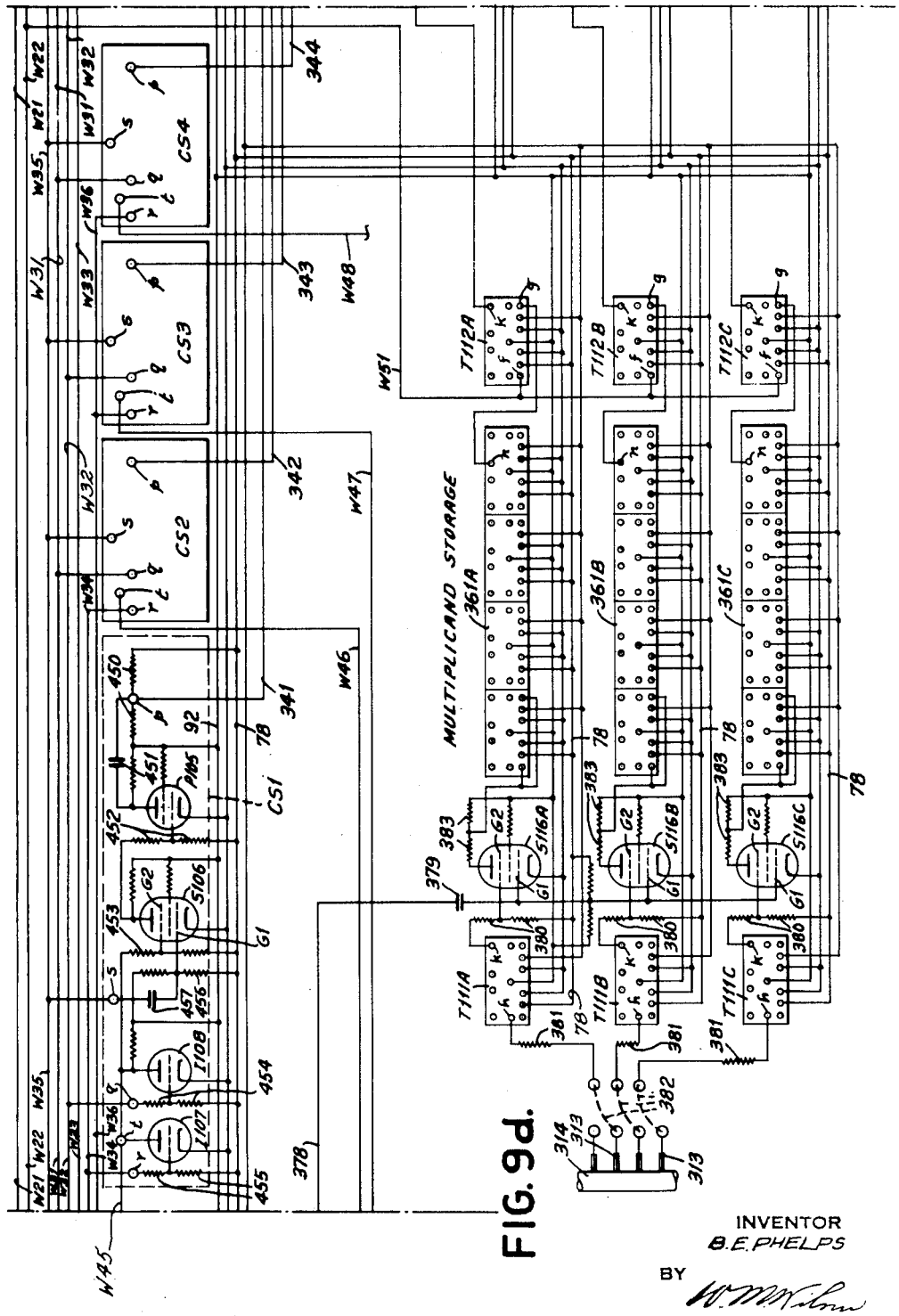

Jan. 6, 1953  B. E. PHELPS  2,624,507
ELECTRONIC CALCULATING MACHINE
Filed Sept. 27, 1945  23 Sheets-Sheet 17

INVENTOR
B. E. PHELPS
BY
[signature]
ATTORNEY

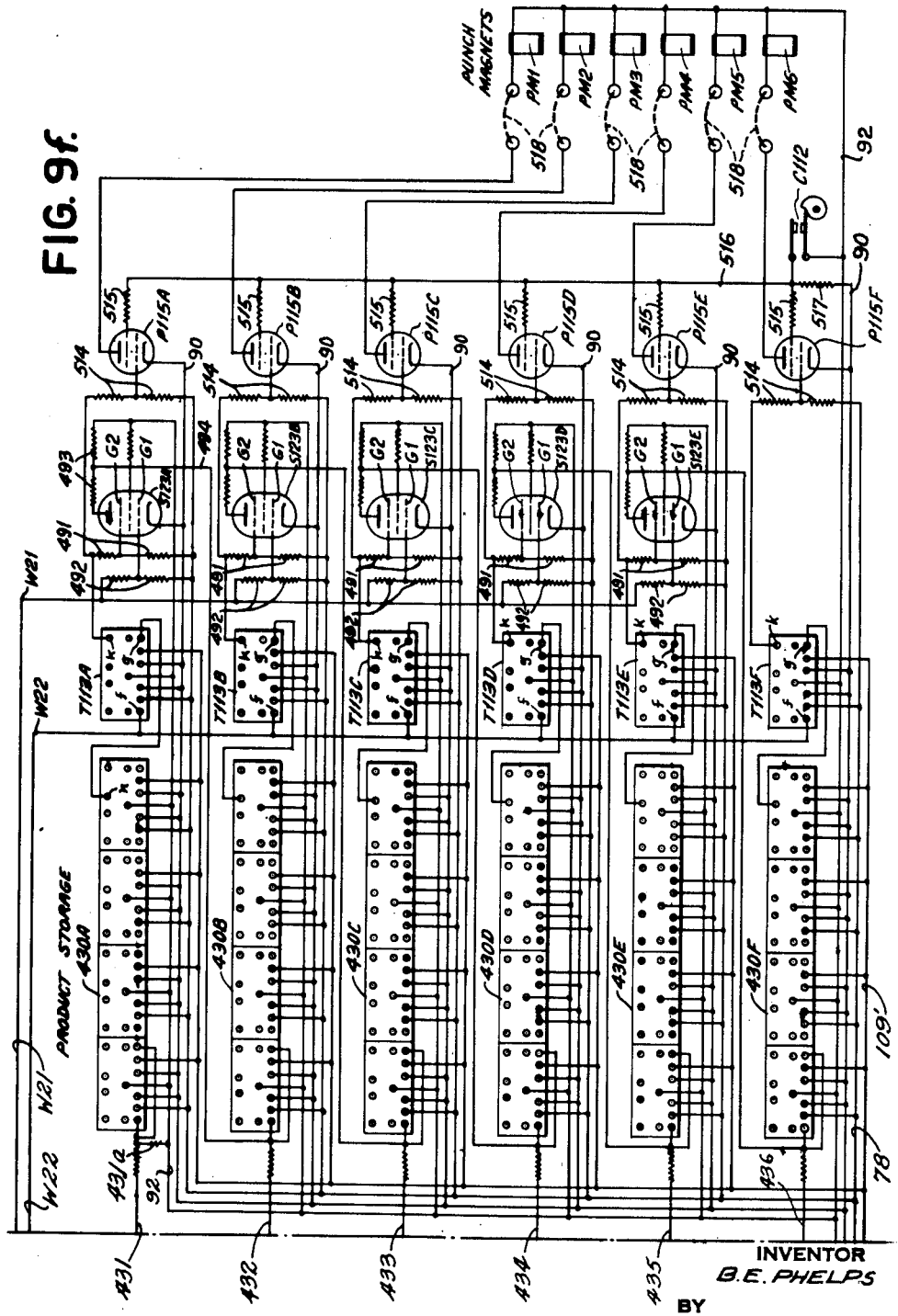

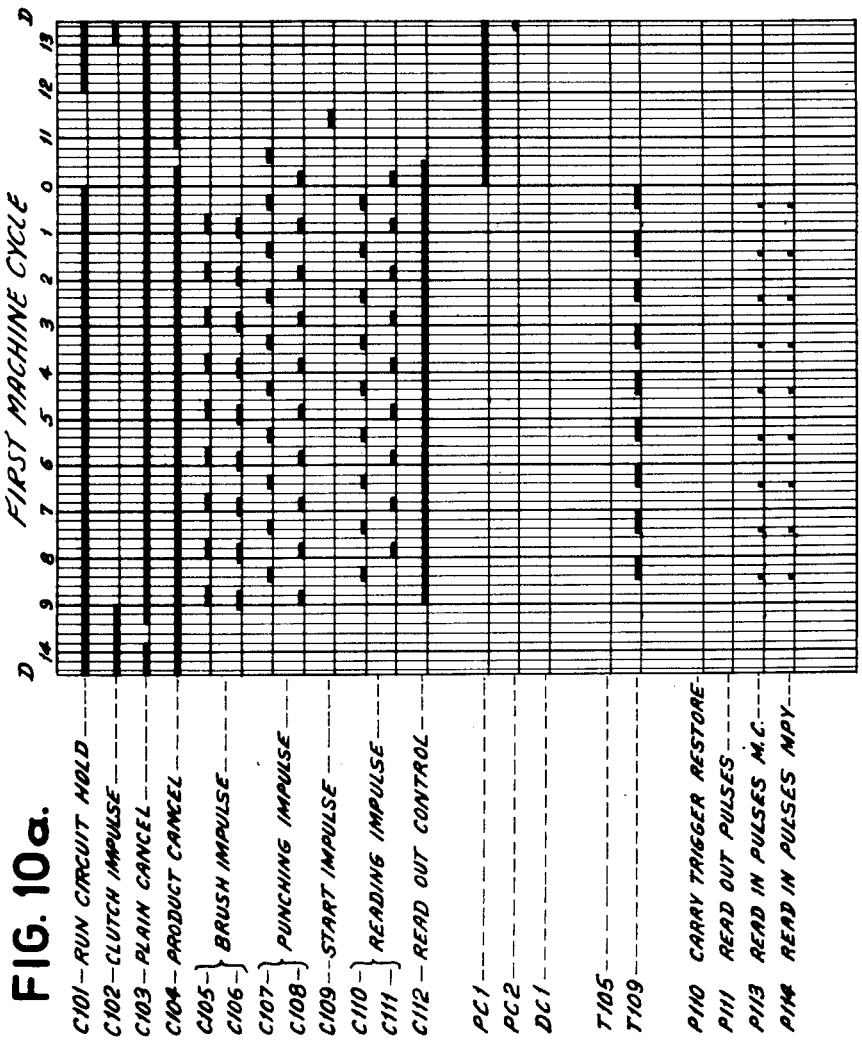

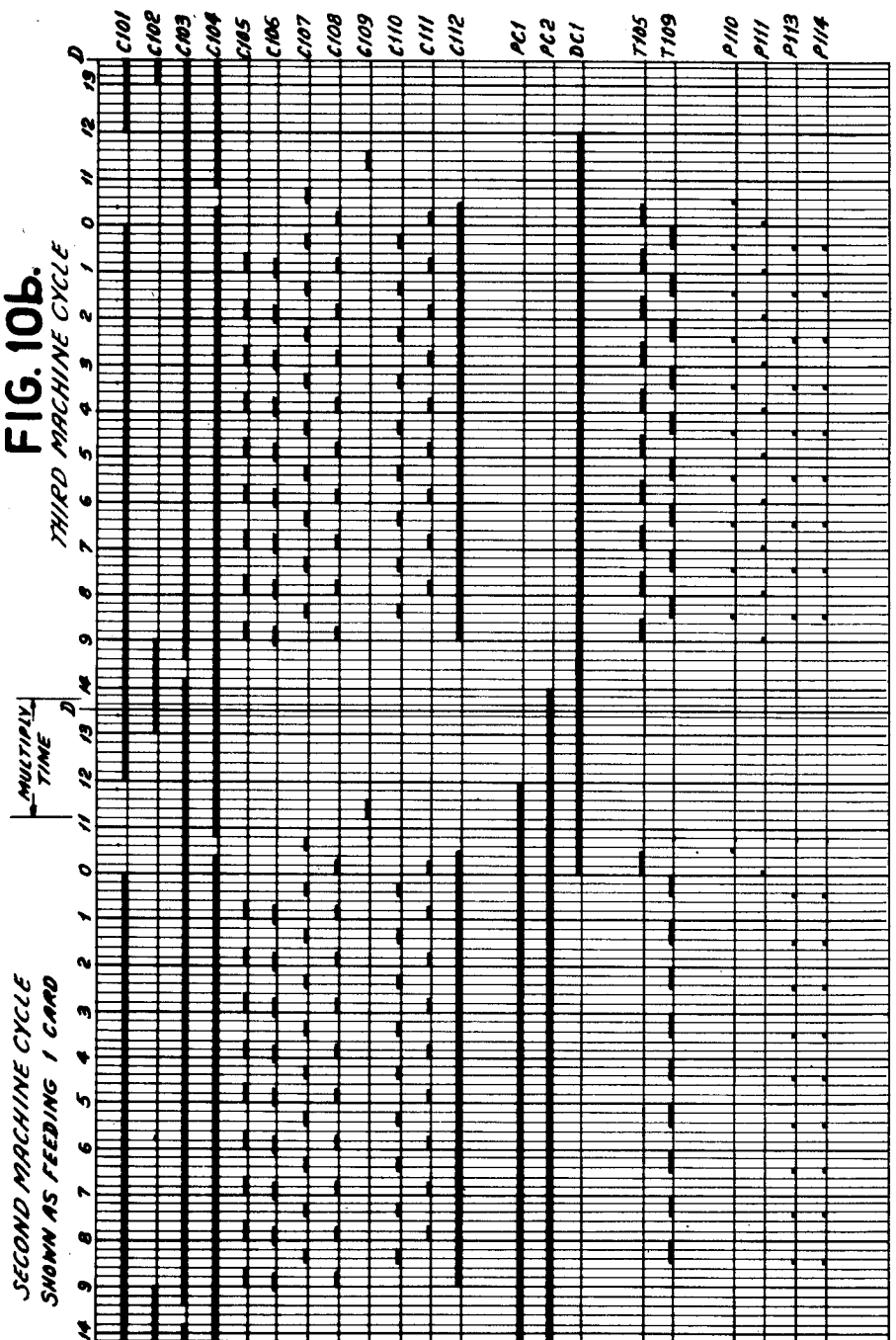

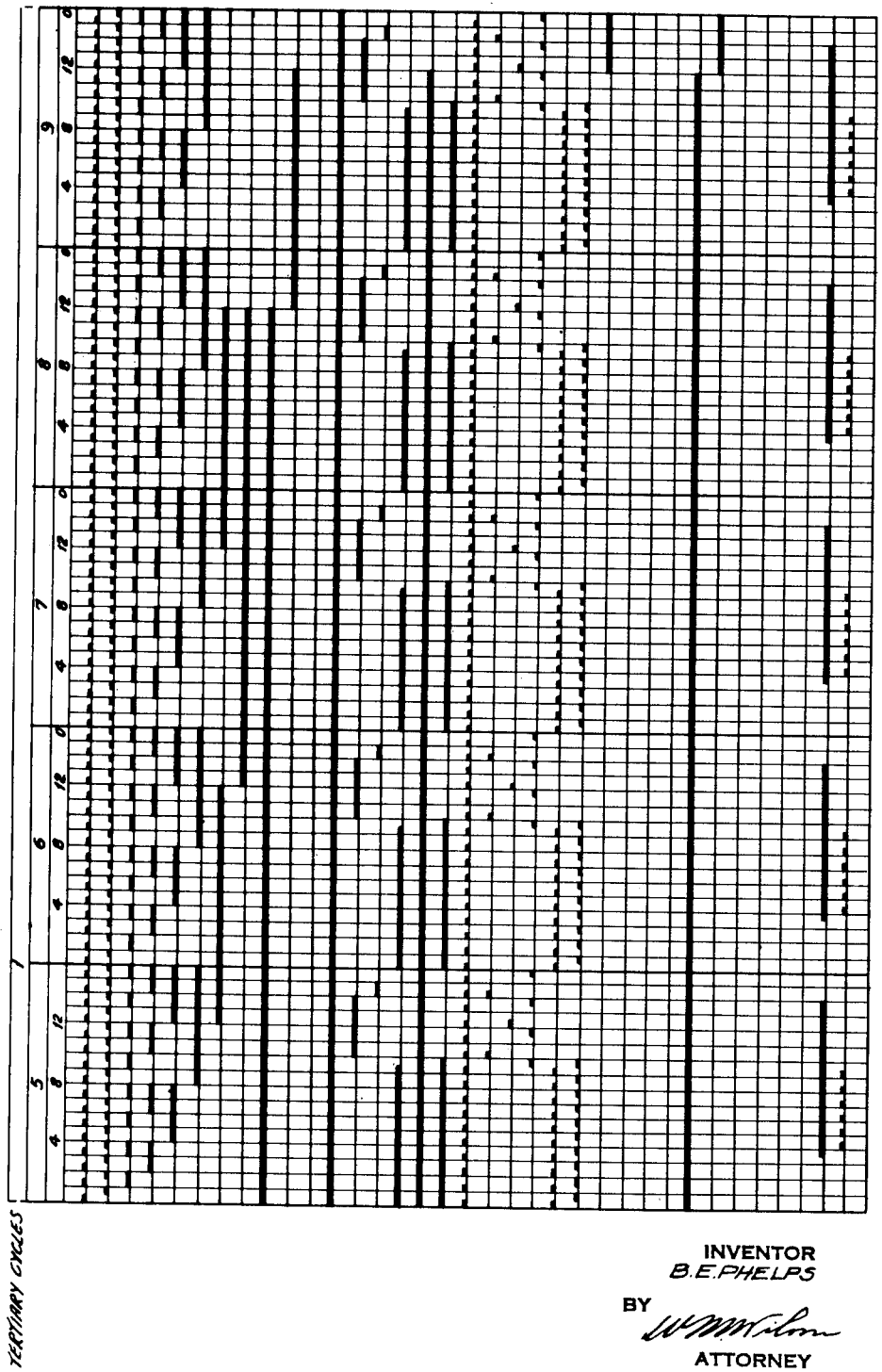

Jan. 6, 1953        B. E. PHELPS        2,624,507
ELECTRONIC CALCULATING MACHINE
Filed Sept. 27, 1945        23 Sheets-Sheet 23
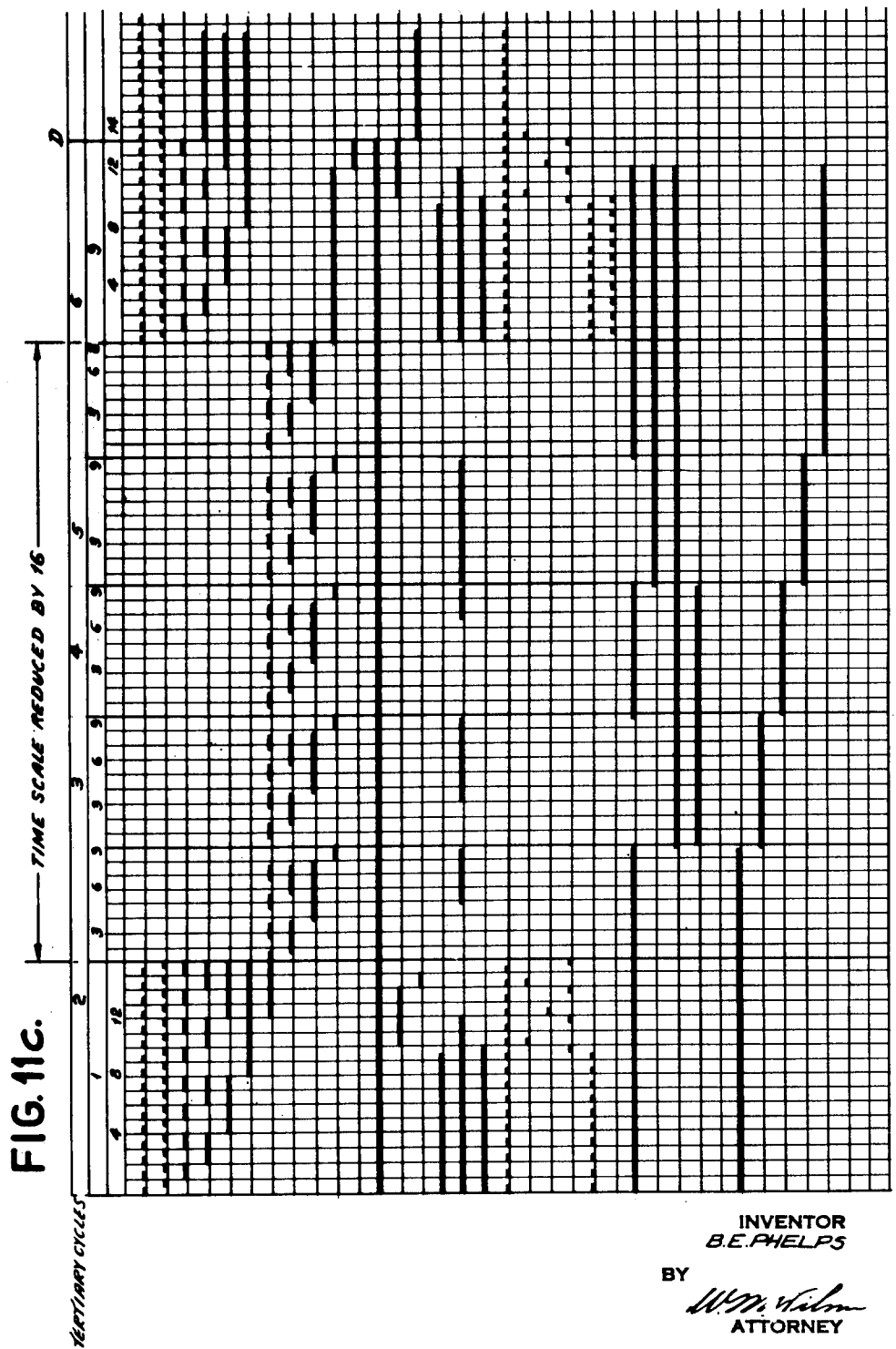
INVENTOR
*B.E. PHELPS*
BY
ATTORNEY Patented Jan. 6, 1953

2,624,507

UNITED STATES PATENT OFFICE 2,624,507

ELECTRONIC CALCULATING MACHINE

Byron E. Phelps, Chatham, N. J., assignor to International Business Machines Corporation, New York, N. Y., a corporation of New York Application September 27, 1945, Serial No. 618,881

42 Claims. (Cl. 235—61)

This invention relates to calculating machines and has for its primary object to provide a calculating machine of very high speed operation. While the detailed explanations are directed to multiplication, some features of the invention can be applied to dividing machines as well. Further, since the method of multiplication described herein comprises over and over addition, it is apparent that features of the present invention have utility in all accumulators.

In order to achieve extremely high speed the invention makes use of electronic counters. Electronic counters have come to be a recognized instrument for high speed counting (see, for example, Electrical Counting, by W. B. Lewis, 1943, chapter VIII). Though they vary considerably in construction they all have the common characteristic of relying upon the extreme rapidity of response of electronic tubes to electrical impulses, to secure a rapid change of an electrical circuit from one stable state to another. There may be by selection of the proper number and and arrangement of circuits as many different stable states as desired and the counter will pass through them all in sequence, in response to a corresponding number of impulses. Thus, if ten impulses will make the counter step through ten different stable states, returning to the original state on the tenth impulse, the counter is known as a "scale-of-ten" counter.

A particular object of the invention is to provide a record controlled calculating device capable of operation at such a high rate of speed that record cards can be fed at a rate comparable with that used in tabulating machines. For example, a multiplication of one six digit number by another six digit number can be completed in less than a tenth of a second. Record cards of the type used in International electric accounting machines can be fed on a fourteen point machine cycle through a reading station and a punching station in succession, at the rate of one hundred cards a minute, the multiplier and multiplicand sensed at the reading station and stored, the multiplication carried out during two and a half points of the machine cycle while the card is between the reading station and the punching station, and the product punched back into the same card at the punching station concurrently with the reading of the next card.

Another object is to provide a calculating device in which the operating force is derived exclusively from electrical impulses, preferably occurring at a rate of at least eight thousand per second.

As stated in the copending application of Palmer and Phelps, Serial No. 569,992, filed December 27, 1944, now Patent No. 2,536,955, issued January 2, 1951, binary systems, in their known forms, are not directly suited for decimal and other well known commercial systems of notation.

Further, in the employment of said binary systems, it is often claimed that such systems are particularly suited to electronic computers and that there ensues a great simplicity of operation and a large saving in the number of tubes over the requirements of a decimal system. Such statements require careful analysis. As long as such computations are performed within the binary system and the results are expressed as binary factors, such claims may be accepted as correct. However, it must be particularly pointed out, that in the employment of binary systems, such ease of operation and saving of tubes is largely illusory, if results are to be transposed from a binary to a decimal or other commercial system of notation.

It is, therefore, one of the objects of the present invention to provide an electronic computer, which retains many of the advantages of a binary system but which, by carrying on the computations in the decimal system, obviates the well known disadvantages of a binary system when employed in computations requiring the results to be expressed in a decimal or other commercial system of notation.

Another object is to provide a record controlled calculating device into which factors are read from one card during a part of one machine cycle and the calculating device then turned on, the calculating device then operating independently at a vastly higher rate and completing its calculation in a small fraction of a machine cycle, and the result of the calculation being finally recorded on the first card during the next machine cycle, concurrently with the reading of the next card.

Other objects of the invention will be pointed out in the following description and claims and illustrated in the accompanying drawings, which disclose, by way of examples, the principle of the invention and the best mode, which has been contemplated, of applying that principle.

In the drawings:

Figs. 1 to 6 pertain to the first embodiment.

Fig. 1 is a diagrammatic vertical section of the card feed mechanism.

Fig. 2 is a circuit diagram of the primary section of the cycle counter.

Fig. 3 is a circuit diagram illustrating the details of the trigger circuit.

Figs. 4a–4e are parts of a complete circuit diagram of a calculating device and are to be placed in line from left to right.

Figs. 6a–6c are parts of the timing diagram of the electronic cycle counter on a greatly enlarged scale with respect to the scale of Figs. 5a and 5b.

Figs. 7–11 show the second embodiment.

Fig. 7 is a diagrammatic vertical section of the card feed mechanism.

Fig. 8 is a circuit diagram of the cycle counter.

Figs. 9a–9f are parts of a complete circuit diagram of the calculating device and are to be placed in line from left to right.

Figs. 10a and 10b are parts of a timing diagram of the machine cycle.

Figs. 11a–11c are parts of a timing diagram of the electronic cycle counter on a greatly enlarged scale with respect to the scale of Figs. 10a and 10b.

Figure 4B:
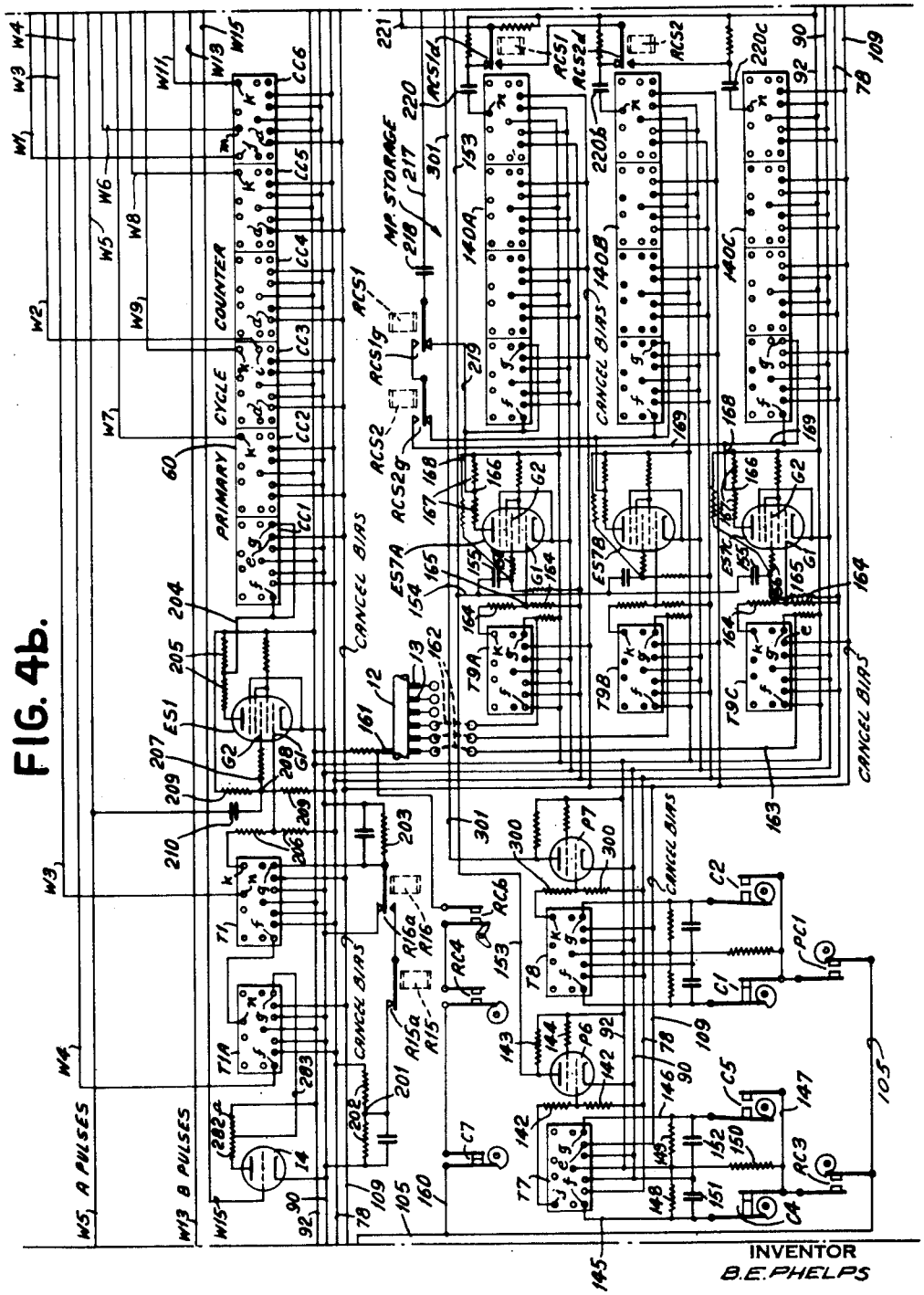

The machines shown in this application are multiplying machines, but as stated above some features of the invention can be applied to dividing machines, and all types of accumulating machines as well. The invention will be explained by reference to two illustrative embodiments. In the first embodiment the records, in the form of standard International tabulating cards, are handled in an International reproducing punch of the type disclosed in Reissue Patent No. 21,133. Fig. 1 is a diagrammatic vertical sectional view of this machine. For further details of construction not appearing in this figure reference may be had to said Reissue Patent No. 21,133. The machine comprises a record reading unit shown at the left and a recording unit at the right. The cards held in the record reading hopper R each have a multiplier factor punched in one field and a multiplicand factor punched in another, while the products are punched in blank cards fed from the hopper P. The cards in the hopper R will be referred to as the problem cards, while those in the hopper P will be called the product cards. The problem cards are fed from the bottom of the stack in the hopper R, one at a time, by a card picker 10, which feeds them to the first pair of feed rollers 11. From the latter they pass between a contact roller 12 and a set of brushes 13. Beyond the contact roller the card passes between the two additional pairs of feed rollers 14 and 15, under the eject roller 16, and into a stacker 17.

The product cards are fed from the bottom of the stack in the hopper P, one at a time, by a card picker 18, between a pair of feed rollers 19, between a die plate 20 and punch guide plate 21, between respective pairs of feed rollers 22 and 23 and under an eject roller 24 into a stacker 25. As explained in Reissue Patent No. 21,133, the drive of picker 10, the feed rollers 11, and the contact roller 12 of hopper R is controlled by a clutch (not shown) operated by a magnet RCM (Fig. 4a). Whenever this magnet is energized these parts operate continuously and on each machine cycle a card is fed from the hopper R. The drive of the feed rollers 14 and 15, eject roller 16, picker 18, feed rollers 19, 22, and 23, and eject roller 24 of hopper P is controlled by a clutch (not shown) operated by a magnet PCM (Fig. 4a). Whenever the latter magnet is energized all of the parts driven through the related clutch operate continuously, with an intermittent movement, and on each machine cycle except the first, a card is fed from the hopper P. The intermittent movement permits a dwell of the card as each index point position comes into punching position. The punch guide plate 21 has guide holes for a row of punches 26 distributed across the line of feed of the cards, so that there is one punch for each column of the cards. The top of each punch has pivoted to it a latch 27 normally held back by a spring 28 out of the path of a punch actuating bar 29, which is constantly oscillated by a rocking arm 30. The latch can be called into engagement by a related magnet PM, the crank shaped armature lever 31 of which is connected by a call rod 32 to the latch 27. The card feed mechanism feeds the cards the length of one index point position between dwells and the punch actuating bar swings down and up during each dwell, operating any punch whose latch is called into active position.

A card feeding out of the reading hopper R first depresses a card lever RCLa as it enters the sensing station (Fig. 5a) and its leading edge moves to a position just in front of the contact roller 12 at the end of a machine cycle. At the beginning of the second machine cycle the leading edge of the card lifts a card lever RCLb to close contact RCb, Figs. 1 and 4b, and passes between the feed roller 12 and the brushes 13. A card feeding out of the punch hopper P in the second machine cycle depresses a die card lever DCL and its leading edge moves to a position just in front of the punches at the end of a cycle. During the third machine cycle there is no card feed, as explained presently. During the fourth machine cycle the card feeds under the punches 26, during the fifth there is no card feed, and at the beginning of the following machine cycle its leading edge lifts a card lever PCL. The contacts operated by the card levers RCLb and PCL are shown at RCb (Figs. 1 and 4b) and PCa (Figs. 1 and 4a), respectively. The contacts operated by the card levers RCLa and DCL are not shown in Fig. 1, but will be referred to in the description of the wiring diagram. A contact RHC is closed by a hopper card lever RHL when cards are placed in the hopper R. A contact PHC is closed by a card lever PHL when cards are placed in the hopper P.

In the instant case the machine has C cam contacts, which operate whenever the machine is running, PC cam contacts, which operate when the punch section of the machine is running, and RC cam contacts, which operate when the reading section of the machine is running. They appear in the circuit diagram and their timing is shown in the machine cycle time chart, Figs. 5a and 5b.

Operation of card feeding mechanisms

Referring now to the circuit diagram, particularly Fig. 4a, and to the machine cycle time chart, Figs. 5a and 5b, the operation of the card handling machine will be described. Assume that a stack of problem cards has been placed in hopper R and a stack of blank cards in hopper P, also that the main switch 35 (Fig. 4a) has been closed. The hopper card lever contacts RHC and PHC (Figs. 1 and 4a) will be closed and relays R5 and R4 (Fig. 4a) energized, through circuits extending from the plus wire 36, through the respective relays R5 and R4, the respective card lever contacts RHC and PHC, to the negative wire 37. Contacts R5a, R4a, R5b, and R4c transfer and contacts R4b, R4d, and R5c close.

Now when the start key ST is depressed for the first machine cycle, a circuit extends from wire 36 through the motor relay MR, a relay R1, the start key contacts STC, transferred contacts R5b, R4c, and contacts SPC to the wire 37, energizing said relays. The contact MRa of the motor relay closes, completing a circuit from wire 36 through the motor, said contact MRa, to the negative wire 37, starting the motor. The contact R1a closes, extending a circuit from line 36, through the motor relay and the relay R1 through said contact and cam contact C9, when closed (Fig. 5a), to the wire 37. The contact R1b closes, completing a circuit from wire 36 through the reading clutch magnet RCM, normally closed contact R3a, transferred contacts R5a and R4a, normally closed contact R12c, said said contact R1b, and cam contact C10, when closed (Fig. 5a), to the wire 37, energizing the reading clutch magnet. The reading clutch engages and a card is fed out of the reading hopper R. As it enters the sensing station it depresses the card lever RCLa (Figs. 1 and 4a) closing the contact RCa (Fig. 4a), which completes a circuit from wire 36 through relay R6, said contact RCa, to wire 37, energizing said relay R6. Contacts R6a and R6d transfer and contacts R6b, R6c, and R6e close. During this first machine cycle the first card from the reading hopper feeds up to, but not under, the next card lever RCLb (Fig. 1). At the 13 point prior to the first machine cycle shown in Fig. 5a the contact C10 (Fig. 4a) was closed, completing, when the start key was depressed, the circuit previously traced through the reading clutch magnet RCM and also, after card lever RCLa is closed, as described above, a circuit is closed through the punch clutch magnet PCM by way of transferred contact R6a, normally closed contact R12c, contact R1b, now closed, cam contact C10 to wire 37. Thus the clutch magnet PCM is energized for the first time near the end of the first cycle and since RCM is also energized on the second machine cycle cards are fed both from the reading hopper R and the punch hopper P. During this second cycle, the first card in the reading unit continues its travel and is fed between the brushes 13 and contact roll 12, while the second card in the reading unit and the first card in the punch unit are fed to their respective preparatory positions. The second card of the reading unit moves to the card lever RCLa before the first card moves off of it, maintaining the relay R6 energized. The first card in the punching unit moves onto the card lever DCL, completing an obvious circuit through the relay R2, which becomes energized. Contact R2a opens and contact R2b closes. The latter completes a holding circuit through the motor relay MR and relay R1, contact R1a, the chain of contacts R5c, R4d, R6e, R2b, all now closed, and the stop key contact SPC, to the wire 37. The machine will now continue to feed cards without the start key being held down, until the stop key is pressed, or one of the four relays R4, R5, R6 or R2 becomes deenergized. The contact C9 opens at the 0 point in each cycle to test this holding circuit of the motor relay and the relay R1.

The manner in which the multiplier and multiplicand factors are read into storage from the card will be explained later. At the present time the additional machine control functions will be described. In this machine there are two card feed sections and it is necessary to insure that the feeding of cards in the two sections keeps in step. A failure to keep in step may be caused (after the first machine cycle) by a failure of a card to feed in one section when a card feeds in the other section. To correct this condition an automatic control stops the machine and sets up a circuit so that when the start key is pressed to start another machine cycle a card is fed in the section which failed to feed a card in the previous cycle, while card feed in the other section is interrupted. Exhaustion of the supply of cards in either hopper also stops the machine. If it is the punch hopper the machine cannot be started again without putting more cards in the hopper. If it is the reading hopper the machine can be made to execute one more cycle by pressing the start key, but then cannot be started again until more cards are put in the reading hopper. However, the machine can be made to run by holding down the start key if there are no cards in either hopper. To carry out these operations the following automatic controls are provided.

If a card fails to feed from the reading hopper the card lever contact RCa (Fig. 4a) will open, deenergizing relay R6. Contact R6e opens and when the contact C9 opens at the 0 point in the cycle the motor relay MR and the relay R1 drop out, stopping the machine. Also, the contact R6a returns to normal position. Now if the start key is depressed a circuit will be completed from wire 36 through motor relay MR, relay R1, start key contact STC, transferred contacts R5b and R4c, stop key contact SPC to wire 37, energizing said relays. Also, a circuit will be completed through the reading clutch magnet RCM as previously described, but not through the punch clutch magnet PCM, because the contacts R6a are in the normal position. Consequently, a card will be fed from the reading hopper, but not from the punch hopper during this cycle.

If a card fails to feed from the punch hopper during any cycle the card lever contacts DC1 will open and relay R2 will become deenergized. Contact R2b will open and the machine will stop at the end of the cycle. Contact R2a will close, completing a circuit from wire 36 through relay R3, contacts R4b and R6b, now closed, said contact R2a, contact PCa, held closed by the previous card under the card lever PCL, to wire 37, energizing said relay. Contact R3a opens. When the start key is now depressed, the machine will go through another cycle, but this time the circuit from the reading clutch magnet will be broken at the contact R3a and no card will feed from the reading hopper. The magnet PCM will be energized, however, and a card will feed from the hopper P.

If the supply of cards in the punch hopper becomes exhausted the contact PHC will open and relay R4 will become deenergized. Contact R4d opens and the machine stops at the end of the cycle. If the supply of cards in the punch hopper is renewed the machine can be set in operation again by depressing the start key. If the supply of cards in the reading hopper is exhausted the contact RHC will open and the relay R5 will become deenergized, allowing the contacts R5a and R5b to return to normal position and contact R5c to open. The latter causes the machine to stop at the end of the cycle. Now it is possible to put the machine through one additional cycle without supplying cards to the reading hopper. When the start key is depressed a circuit is completed from wire 36 through motor relay MR and relay R1, contact STC, normal contact R5b, transferred contacts R6d and R4c, contacts SPC, to wire 37, energizing said relays and starting another cycle. At the 12 point in this cycle, the card lever contact RCa will open and the relay R6 will become deenergized. Now it is not possible to start the machine again without supplying cards to the reading hopper, because the circuit through the motor relay MR and the relay R1 cannot be completed by depressing the start key.

In the normal operation of the machine, starting with the second machine cycle, the machine control is so arranged that there is one card feeding cycle, then a machine cycle in which cards are not fed, but during which the computation is carried out, in a manner to be described later. On the fourth machine cycle, cards are fed again in both the reading unit and the punch unit. To secure this alternate feeding and idle cycle of operation the following provision is made: After the relay R6 has become energized, which occurs at the 0 point (Fig. 5a) in the first cycle, the next following closure of contact PC3, which occurs at the 4 point (Fig. 5a) in the second machine cycle, completes a circuit from wire 36 through relay R12, contact R6c and contact PC3 to wire 37, energizing said relay. Contact R12a closes, completing a holding circuit for relay R12 through contact C11, which remains closed until the 6 point (Fig. 5b) in the third cycle. Contact R12c opens, disabling the circuits through the reading clutch magnet and the punch clutch magnet during the closure of the contact C10 at the end of the second cycle, thus preventing these clutch magnets from being energized during the third cycle. At the 6 point in the third cycle, contact C11 opens, dropping out the relay R12 and allowing the contact R12c to close. When the contact C10 closes near the end of the third cycle, the reading clutch magnet and the punch clutch magnet are energized and cards are fed during the fourth cycle.

When the main switch 35 was closed circuits were immediately completed from wire 36 through wire 38, normally closed contacts R13a and R13b, and relays R14 and R15, energizing said relays, the functions of which will be explained later. When relay R12 is energized by closure of cam contact PC3 at the 4 point in the second cycle (Fig. 5a) contact R12b (Fig. 4a) closes, completing a circuit from wire 36, through relay R13 and contact R12b to wire R37, energizing said relay. Contact R13a closes, completing a holding circuit for relay R13 through cam contact PC4 to wire 37. The next time PC4 opens is at the 3 point (Fig. 5b) in the fourth cycle, but by this time relay R12 has been energized again, therefore relay R13 is held continuously.

When relay R13 is energized contacts R13a and R13b are open and relay R14 will drop out when contact RC1 opens at the 12 point (Fig. 5a) in the second cycle, while relay R15 will drop out when contact RC2 opens at the half after 12 point in the second cycle. Relays R14 and R15 will be reenergized simultaneously when contact RC2 closes again at the 14 point in the fourth cycle.

*The electronic circuits*

Before proceeding with an explanation of the reading of the multiplier and multiplicand factors into storage, some parts of the electronic circuits will be individually described.

*The trigger circuit.*—The calculating device makes use of a number of trigger circuits. While various trigger circuits are known, I prefer to use one disclosed in the copending application of Palmer & Phelps, Serial No. 569,992, filed December 27, 1944. The theory of operation of this trigger circuit is fully explained in said application and will only be briefly reviewed here.

Fig. 3 shows the trigger circuit. Two tubes 40 and 41 or preferably two halves of a twin tube, such as a 12SN7, have cathodes 42 connected through terminals a and b to a zero potential supply wire, and plates 43 connected through load resistors 44, 45 and terminal c to a B+ potential supply wire. The plate 43 of the left hand tube is coupled through a wire 46 and a resistance 47, shunted by a condenser 48, to the grid of the right hand tube. The plate of the right hand tube is similarly coupled to the grid of the left hand tube. The grid of the left hand tube is connected through a resistance 50 and terminal d to a bias wire which has a potential considerably below zero. The grid of the right hand tube is similarly connected through a resistance 50 and terminal e to a cancel bias wire having the same negative potential as the bias wire. Impulses can be supplied to the grids through impulsing condensers 51 connected to respective terminals f and g. Condensers 48 should be larger than condensers 51.

The trigger circuit has two stable states. If the right hand tube is conducting which is designated as the normal, or switched right condition of an individual trigger the left hand tube is non-conducting. As explained in detail later, by means of the cancel bias line the triggers are restored, at a chosen time, to a condition in which the right hand tube is conducting, with the exception of certain triggers in the primary cycle counter and certain triggers specifically mentioned as otherwise restored. Assuming the trigger to be in this switched right state, a negative impulse is applied simultaneously to the terminals f and g, of sufficient amplitude to bias off the right hand tube. As explained in detail in copending application 569,992 both halves of the trigger circuit have the same time constant and their condensers will reach 90% discharge at the same time, but because tube 41, which was originally conductive, has been cut off by this negative impulse its plate potential jumps to a high value and causes the grid of tube 40 to rise much more rapidly than that of tube 41 and it rises above the cut off potential prior to the latter and tube 40 becomes conductive. The plate potential of tube 40 drops and the potential on the grid of tube 41 ceases to rise, being actually depressed considerably below the point at which the tube would be conductive. The trigger circuit will remain in this second stable state until another negative impulse is received, when the process will be reversed and the right hand tube made conductive while the left hand tube is cut off.

It is to be particularly noted at this time and as pointed out in detail in said copending application 569,992 that the trigger circuit does not respond to positive impulses applied through the impulsing condensers 51, of the same amplitude as the negative impulses used. For this reason, as a source of impulses, the impulsing condensers can be connected to a point, such as the plate of a tube, at which the potential alternately rises and falls, and the trigger will be switched by the falling potential but not by the rising potential.

To restore the trigger circuit of Fig. 3 to its normal state, in which the right hand tube is conducting, the negative potential is momentarily removed from the cancel bias wire conductively connected to the grid of 41 through terminal e, allowing the potential in the right hand grid to rise to a point which renders the right hand tube conductive to switch the trigger to the right and cuts off the left hand tube. If the connections to the terminals d and e are reversed, that is, if terminal d is connected to the cancel bias wire and terminal e to the bias wire as in all the triggers of the primary cycle counter (Fig. 4b) except trigger CC1 thereof, the left hand tube will be left conducting when the bias potential is removed from the cancel bias wire. It is also possible to switch the trigger by means of positive potentials (see T109, Fig. 9b) applied to terminals h or i which are connected conductively to the respective grids. This method of restoring the triggers to a chosen initial switched right or switched left condition is employed to produce the chosen initial state desired for any particular trigger, as pointed out later.

Potentials can be tapped off the trigger circuit through terminals j, k, m, and n, which are connected as shown, to the plates or to points between the two parts 44 and 45 of the load resistors. The entire trigger circuit diagram is enclosed in a rectangle 52 within which the terminals have certain positions. In the other circuit diagrams the trigger circuits are represented simply by rectangles having terminals therein as shown in Fig. 3.

*The cycle counter.*—The primary section of the cycle counter, designated as the primary counter hereinafter, is shown in Fig. 2. Its function is to count primary cycles, each consisting of a pulse and a space, and to execute certain control operations to be described. It comprises a combination of trigger circuits interconnected in a particular way, which after restoration to a chosen particular initial status will cause the counter to go through a sequence of a definite number of stable states in response to a definite number of impulses and to return to the chosen initial state in response to the last impulse. The electronic counter shown in Fig. 2 is a scale-of-30 counter. It consists of six trigger circuits CC1–CC6 and two locking tubes BL1 and BL2. The four trigger circuits CC1–CC4 and locking tube BL1 are interconnected in the same way as those constituting the counter disclosed in the above mentioned Palmer and Phelps application. This part of the circuit, is a scale-of-10 counter. Its output feeds into a scale-of-3 counter comprising the trigger circuits CC5 and CC6 and locking tube BL2, which multiples by 3 the capacity of the first four triggers and their locking tube BL1 and makes the whole counter a scale of 30.

Figure 6A:
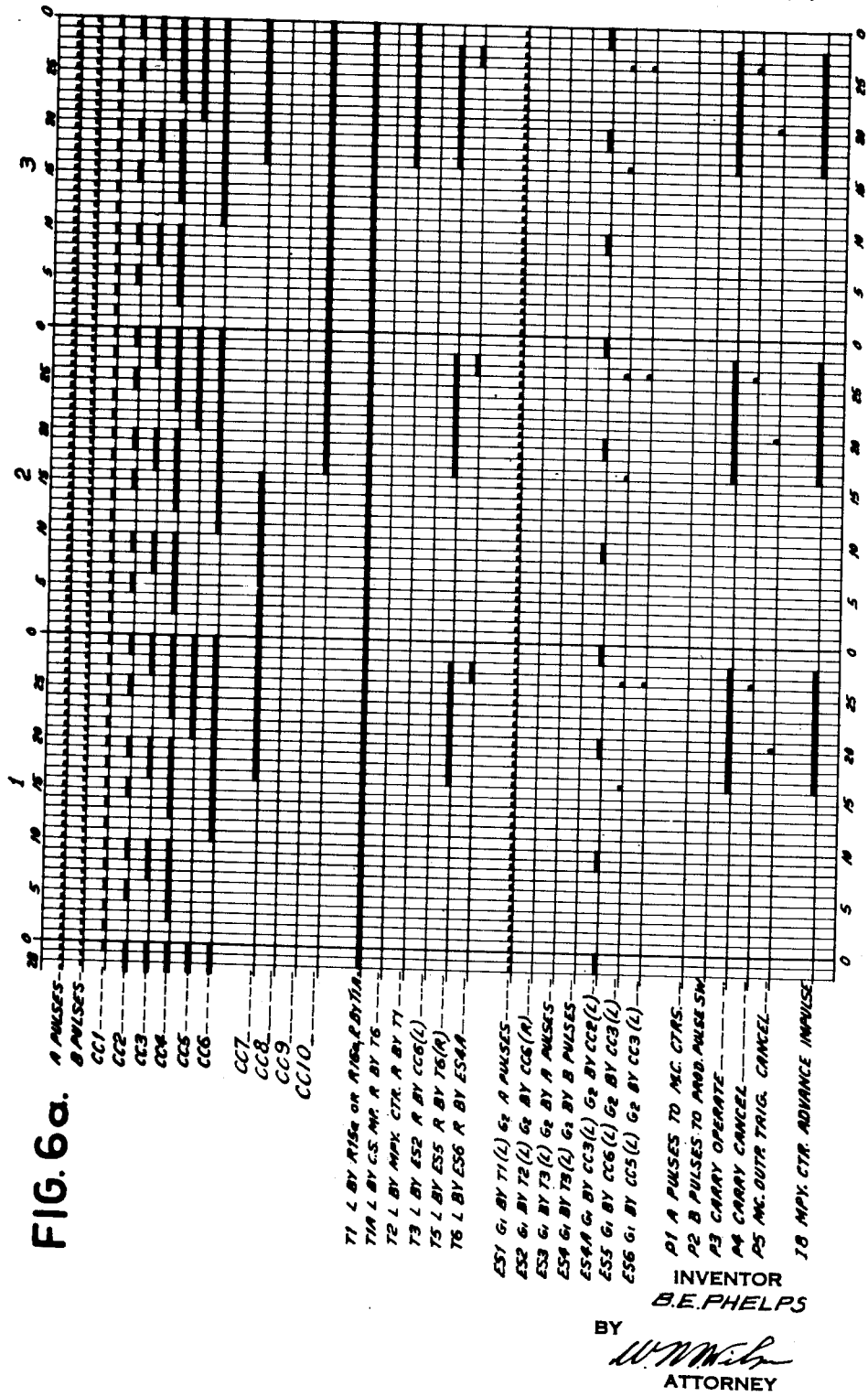
Figure 6B:
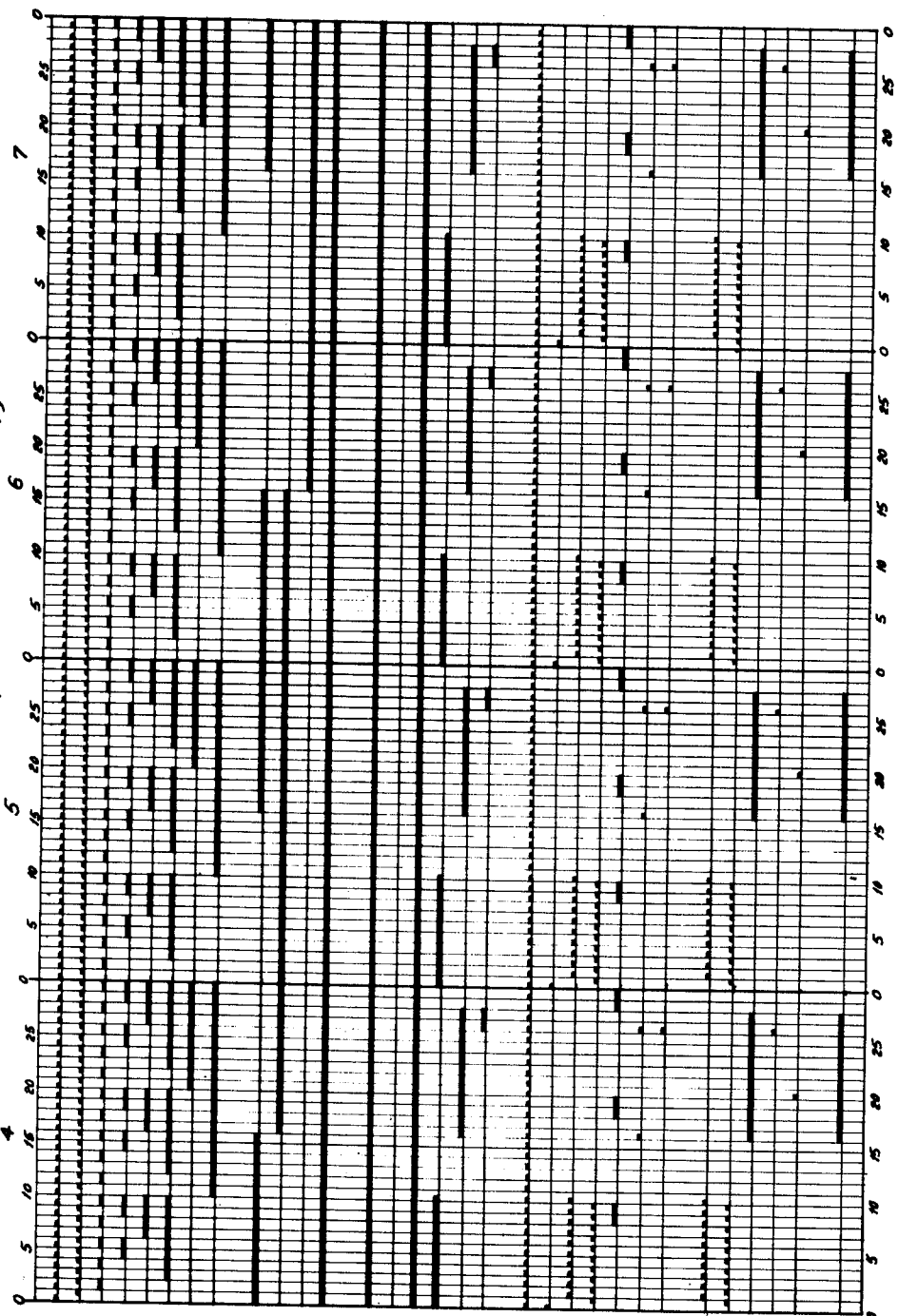

Pulses are applied concurrently to the terminals f and g of the trigger CC1 through an input lead 53. The various combinations of stable states assumed by the respective triggers of the counter are shown in the electronic timing diagram to which reference is made with regard to the particular state of any trigger and the combined states of all the triggers at any particular digit or value indication (Figs. 6a–6c). In the initial state, to which this cycle counter as a whole is returned by removing bias potential from the cancel bias wire, the trigger CC1 is switched or turned right since the cancel bias wire is connected to its terminal e and the triggers CC2–CC6 are all turned left since the cancel bias wire is connected to their respective terminals d. The zero point, however, of the cycle or zero indicating status of the counter as a whole is taken as the point at which all triggers are turned right, as shown at zero in Fig. 6a. Starting from the zero point, the first input pulse turns the trigger CC1 left as shown by the black dash line between points 1 and 2, Fig. 6a. When CC1 is turned left a plus pulse is produced at terminal n but, as pointed out previously, such a plus pulse has no effect on succeeding triggers.

The second input pulse turns the trigger CC1 right as designated by the space between points 2 and 3 Fig. 6a and causes a negative impulse to be transmitted from its terminal n to the terminals f and g of the trigger CC2 and also to the terminal g of the trigger CC4. At this time the trigger CC2 is locked in its right hand state (Fig. 6a) by the locking tube BL1. The grid of this tube is connected through a grid resistor 55 to a point 56 on a voltage divider 57, 58. The upper end of this voltage divider is connected to the terminal j of the trigger CC4, which, at the zero point of the cycle, is at high potential. In this condition, the grid of the tube BL1 is above the cut-off point and this tube is conducting. Its plate potential is therefore low and it prevents the potential on the plate of the right hand tube of trigger CC2 from rising when the grid of this right hand tube is depressed to a potential below the cut-off point by the first impulse transmitted from the trigger CC1. When the trigger CC4 is switched left by the effect produced on trigger CC1 by this second impulse, as shown at point 2 of Fig. 6a the potential at its terminal j drops and tends to depress the potential on the grid of the locking tube BL1. This action is temporarily restrained, however, by a positive impulse transmitted from the right hand plate terminal k of the trigger CC4, through a small condenser 59 to the point 56. The condenser 59 is of such size that the positive impulse slightly outlasts the negative impulse transmitted to CC2 from the trigger CC1, so that the trigger CC2 remains locked for the duration of this negative impulse and therefore remains switched right and the voltage of the grid of tube BL1 is then depressed since CC4 was switched left.

The third input pulse switches CC1 left as shown in Fig. 6a and the fourth switches it to the right once more. This time since locking tube BL1 is no longer effective an output impulse from its terminal n switches trigger CC2 to the left, see point 4, Fig. 6a. Further, output impulses from CC1 have no effect on CC4 for the time being since CC4 was previously switched left at point 2, Fig. 6a.

The fifth and sixth input pulses switch CC1 left and right once more as shown in Fig. 6a and another impulse is transmitted to CC2 which switches back to the right. This causes an output impulse to be transmitted from the terminal n of trigger CC2 to the terminals f and g of trigger CC3, switching the latter to the left as shown at point 6, Fig. 6a. The seventh, eighth, ninth and tenth pulses have a generally similar effect their respective effects being shown in detail in Fig. 6a, the last one as shown in Fig. 6a restoring all the triggers CC1 to CC4, inclusive to the right. When trigger CC4 swings right the potential of its terminal j rises and tends to raise the potential on the grid of the locking tube BL1. The rise of the potential on the grid of the tube BL1 is delayed momentarily by a negative impulse applied through the condenser 59 from the terminal k of the trigger CC4, but this delay is of no significance at this time, since BL1 was rendered ineffective, as described above, when CC4 was initially turned left, and remains ineffective as long as CC4 remains turned left, see Fig. 6a. After this momentary delay, tube BL1 resumes its locking condition until CC4 is again turned left.

When trigger CC4 switches to the right on the tenth input impulse, it transmits a negative impulse from its terminal n to the terminals f and g of trigger CC5 and the terminal g of trigger CC6. At this time the trigger CC5 is locked against response to this impulse by the locking tube BL2, which is controlled by the trigger CC6 in the same way as the tube BL1 is controlled by the trigger CC4. The only effect of this impulse from trigger CC4 is to switch the trigger CC6 to the left as shown at point 10 in Fig. 6a. This, after a temporary delay, as previously described, renders blocking tube BL2 ineffective and hence releases the trigger CC5 for response to the next impulse from trigger CC4 which occurs at the twentieth input impulse. The trigger CC5 is thereby switched to the left at the twentieth pulse (Fig. 6a) while the trigger CC6 which is already switched left is unaffected. At the 28 point, trigger CC1 is switched right (Fig. 6a) while all the other triggers CC2 to CC6, inclusive are switched left. This is the chosen initial condition to which the primary cycle counter, as wired in Fig. 4b, is returned, by cancel bias action. The thirtieth input impulse which switches CC4 to the right (Fig. 6a) causes an output from the trigger CC4 which switches trigger CC5 to the right and a resulting impulse from terminal n of trigger CC5 switches trigger CC6 to the right, restoring the entire counter to its zero state as shown at point 30, Fig. 6a, in which all triggers are switched right.

The primary cycle counter 60, in Fig. 4b, is illustrated in a simplified manner. In this view the six rectangles representing trigger circuits are drawn adjoining one another and the interconnecting wires and locking tubes are not shown.

One full operation of the primary cycle counter under control of thirty pulses, as just described constitutes a secondary cycle. The secondary cycles each of which comprises a full operation of the primary are counted by a secondary cycle counter shown at 61 in Fig. 4c. The secondary cycle counter is composed of four triggers CC7—CC10, and a locking tube (not shown) all interconnected in a manner identical to the triggers CC1–CC4 of the primary cycle counter. The trigger CC7 receives an impulse at the 16 point of a 30 point primary cycle. For this purpose there is provided a trigger T5 (Fig. 4d) which is normally in its right hand position to which it would be restored by cam contact RC5 (Fig. 4a) cancelling the bias from line 109, just prior to 14 of a machine cycle (Fig. 5a) if not already switched right and which is switched left at the 16 point as shown at point 16, Fig. 6a. When this occurs, a negative impulse is transmitted from terminal m of trigger T5 through wire W10 (Figs. 4d and 4c) to the terminals f and g of the trigger CC7 (Fig. 4c).

To switch trigger T5 left, a negative pulse is transmitted through wire 170 from an intermediate point on the plate resistor 171 of an electronic switch tube ES5. The tube ES5 is normally held non-conductive by the potential on its control grids G1 and G2. The control grid G1 is connected to an intermediate point on a voltage divider 172, the lower end of which is connected to the bias wire 78 and the upper end, through wire W11 (Figs. 4d, 4c and 4b), to the terminal k of the trigger CC6 of the primary cycle counter. When the latter trigger swings left at the 10 point, as shown in Fig. 6a, the potential on its terminal k rises, lifting the potential of the control grid G1 of tube ES5 to a point which renders the tube responsive to positive pulses applied to the control grid G2 between points 10 and 30 of a primary cycle.

The grid G2 is connected through a grid resistor 173 to an intermediate point 174 on a voltage divider 175, the lower end of which is connected to the bias wire 78 and the upper end to the B+ wire 92. The intermediate point 174 is coupled through a condenser 176 and wire W12 to the plate of an inverter tube I6. The latter plate is connected through a plate resistor 177 to the wire 92, while the cathode of the tube I6 is connected to the wire 90. The grid of this tube is conductively connected through wire W2 (Figs. 4d, 4c and 4b) to the terminal i of the trigger CC3 of the primary cycle counter. When the trigger CC3 is in its right hand position the potential at this terminal is such that the tube I6 is conductive. When the trigger CC3 switches left at the 16 point as shown in Fig. 6a a lower potential is applied from its terminal i, through wire W2 to the grid of tube I6, biasing off this tube. The potential on the plate of tube I6 rises and a positive pulse is transmitted at point 16 through wire W12 and condenser 176 to the grid G2 of tube ES5. This renders the tube conductive and causes a negative pulse to be transmitted at the 16 point through wire 170 to the terminal g of the trigger T5, switching this trigger to the left and producing the required negative pulse on wire W10 at the 16 point.

Trigger T5 is switched back to the right at the 28 point (Fig. 6a) by trigger T6 (Fig. 4d). This trigger is normally in its right hand position due to its cancel bias connection to its terminal e. At the 26 point (Fig. 6a), the trigger T6 is switched left, in a manner soon to be described, then switched back to the right at the 28 point. When it is switched to the right, a negative pulse is transmitted from its terminal n through wire 180 to the terminal f of trigger T5, switching the latter to the right.

The trigger T6 is switched left at the 26 point (Fig. 6a), by a negative pulse transmitted to its terminal g through a wire 181, from an intermediate point on a plate resistor 182, of an electronic switch tube ES6. This tube is normally held non-conductive by its two control grids G1 and G2. The grid G1 is connected to an intermediate point on a voltage divider 183, the lower end of which is connected to the bias wire 73 and the upper end, through wire W8 (Figs. 4d, 4c and 4b), to the terminal k of trigger CC5 of the primary cycle counter. When this trigger is switched left at the 20 point (Fig. 6a), the potential on the control grid G1 of tube ES6 is raised to a point which renders this tube responsive to positive impulses transmitted to its control grid G2. The latter is connected through a grid resistor 184 to an intermediate point 185 of a voltage divider 186, the lower end of which is connected to the bias wire 78 and the upper end to the wire 92. The intermediate point 185 is coupled through a condenser 187 and wire W12 to the plate of inverter tube I6. As previously stated, the tube I6, which is normally conductive, is rendered non-conductive each time the trigger CC3 of the primary cycle counter switches left. The first time this occurs after the trigger CC5 switches left to raise the voltage of grid G1 of tube ES6, as described above (at the 20 point) is at the 26 point (Fig. 6a). When inverter 16 is rendered non-conductive, a positive pulse is transmitted through wire W12 and condenser 187 to the grid G2 of the tube ES6, the latter tube becomes conductive and a negative pulse is transmitted from its plate resistor through wire 181, switching trigger T6 left at the 26 point.

The trigger T6 is switched right at the 28 point (Fig. 6a), by a negative pulse transmitted to its terminal f, through wire 190, from the plate resistor 191 of an electronic switch tube ES4A. The potentials of the grids G1 and G2 of this tube normally maintain the tube non-conductive. Grid G1 is connected to an intermediate point on a voltage divider 192, the lower end of which is connected to the bias wire 78 and the upper end, through wire W9 (Figs. 4d, 4c and 4b), to the terminal k of trigger CC3 of the primary cycle counter. When this trigger is switched left at the 26 point (Fig. 6a), the potential on its terminal k rises, lifting the potential on the grid G1 of the tube ES4A to a point which renders the tube responsive to positive pulses applied to its grid G2. The latter is connected to an intermediate point of a voltage divider 194, the lower end of which is connected to the wire 78 and the upper end, through wire W7 (Figs. 4d, 4c and 4b), to the terminal k of trigger CC2 of the primary cycle counter. When the latter trigger switches left at the 28 point (Fig. 6a), the potential on its terminal k rises, lifting the potential on the grid G2 of the tube ES4A and rendering the latter conductive. This causes a negative impulse to be transmitted through wire 190 to the terminal f of trigger T6, switching the latter to the right at 28 (Fig. 6a).

Thus, as just described, at the 16 point, once in each complete primary cycle, the trigger T5 switches left and transmits an impulse via W10 (Figs. 4d and 4c) to the secondary cycle counter 61 (Fig. 4c), and at the 28 point in each secondary cycle the trigger T5 is restored to its right hand position. This timing provided for the triggers CC7-CC10 is shown in Figs. 6a-6c. The function of the secondary cycle counter is to initiate a column shift at the end of each tenth cycle counted by the secondary counter. It is to be particularly noted that the secondary cycle counter is stepped one step ahead, once for each complete operation of the primary cycle counter, this step occurring at the 16 point of each primary cycle. During ten complete operations of the primary, the triggers CC7, CC8, CC9 and CC10 of the secondary, count ten, in the same manner as triggers CC1, CC2, CC3 and CC4 counted ten pulses. At the tenth cycle counted by the secondary counter (Fig. 6c), at the 16 point of a primary cycle, CC10 switches right to initiate a column shift operation, as described later.

*Power supply.*—Any suitable power supply may be used for the electronic circuits. In Fig. 4a, I have shown one designed for good voltage regulation, to insure reliable operation of the trigger circuits. 110 volt alternating current is supplied through wires 70 to the primary coils 71, 72 and 73 of a transformer. Secondary coil 74 supplies heater current for a tube 75, which may be a #83 rectifier tube and which rectifies current supplied from secondary winding 76 and establishes a negative voltage on wire 78 in relation to wire 77, across resistances 68 and 69 and normal contacts R20a. This voltage is smoothed by a filter 79.

Current flows through a high resistance 80, for instance, 50 megohms, into a condenser 81, causing the potential on the grid 82 of a cold cathode tube 83 (OA4G) to rise slowly. In approximately one minute an arc is struck between the grid 82 and the cathode 84 and the tube becomes conductive, energizing relay R20. Contacts R20a transfer, discharging condenser 81, so that the time delay circuit will be ready for another operation immediately if the current supply should stop.

A secondary winding 86 supplies heater current for a rectifier tube 87, for example, an EL-3C. This tube rectifies current supplied from a secondary winding 88, establishing a potential of +145 volts on wire 92 in relation to wire 90. When contact R20b and switch 91 are closed the positive potential is extended to wire 92. This is the B+ supply wire, the wire 90 being the B— or 0 potential wire. The voltage across these wires is smoothed by a filter 93.

For the purpose of regulating the potential on the bias wire 78 in relation to the wire 90, the wire 77 is electronically coupled through a pair of tubes 95, for example 50L6's to the wire 90 and the wires 90 and 78 are interconnected by a cathode resistor 96 shunted by a condenser 97. The screen grids of the tubes 95 are supplied from wire 92 through resistances 97'. The control grids of tubes 95 are connected through resistances 98 to an arm 99 of a potentiometer comprising three resistances 100, 101 and 102. If the B+ voltage on wire 92 drops, in relation to the zero wire 90 and the bias wire 78, the potential at the arm 99 is lowered and the current through the tubes 95 is reduced, which lowers the voltage drop across the cathode resistance 96 so that the relative voltage between 78 and 92 is maintained. The bias potential on wire 78 is normally maintained at —95 volts, in relation to the zero wire 90. If the voltage on the bias wire 78 tends to become less negative in relation to the wire 90, the voltage at the arm 99 rises and the tubes 95 conduct a larger current, which passes through the resistance 96 to increase the voltage drop across this resistance and maintain the bias voltage on 78 constant.

A potentiometer 103 supplies a potential of +120 volts to its arm 104, which is connected to a wire 105. A smoothing condenser 106 couples the wires 92 and 105.

The wire 37 is connected to the wire 90 by a wire 107 and the wire 90 is grounded at 108.

Through a cam contact RC5 the bias potential is extended from wire 78 to a cancel bias wire 109. This enables all of the trigger circuits, with an exception to be noted later, to be restored to chosen conditions at the one tenth before 14 point in each reading machine cycle.

*Pulse supply.*—Pulses for operating the electronic circuits may be derived from any suitable source, such as an oscillator, or a multi-vibrator. Fig. 4a shows an electron coupled oscillator comprising a tube 110, which may be a 6SK7, the cathode of which is connected to the bias wire 78 and the anode of which is supplied from the B+ wire 92 through a wire 111 and plate resistor 112. The screen grid 113 is connected to one end of a tank circuit comprising an inductance 114 and condenser 115. An intermediate point on the inductance is connected to the wire 90 and the opposite end of the tank circuit is coupled by condenser 116 to the control grid 117, which is connected to the bias wire 78 through a grid leak 118. The suppressor grid 119 is connected to the wire 90 and serves as a screen, rather than as a suppressor, being at a voltage intermediate to the plate and cathode voltages. Sustained oscillations of a frequency of about 8000 per second are generated by the circuit. The fluctuations of the plate potential of the tube 110 are transmitted through a condenser 120 and grid resistor 122 to the grid of an inverter tube I1, the plate of which is connected to the B+ wire 92 through wire 111 and a plate resistor 121, while the cathode is connected to the wire 90. The grid of the tube I1 is connected to a voltage divider 123 extending between the wires 111 and 78 and is normally about at cathode potential, rendering the tube conductive. Negative pulses from the plate of tube 110 drive the grid of the tube I1 far below cut off, producing a square wave output on the wire W13 connected to the plate of the tube I1. These waves will be referred to herein as B phased or B pulses; their rising side is used for operating some of the electronic circuits.

The oscillations from the plate of tube 110 are also transmitted through a condenser 124 and grid resistor 127 to the grid of an inverter tube I2, the plate of which is connected to the wire 92 through wire 125 and a plate resistor 126, the cathode being connected to the wire 90. The grid of the tube I2 is connected to a voltage divider 128, extending between the wires 92 and 78. The potential on the grid is normally such as to render the tube I2 conductive, but is driven far below cut off by negative pulses transmitted from the plate of tube 110. The resulting square wave output from plate of tube I2 which is B phased is transmitted through a coupling condenser 130 to the grid of a normally conductive inverter tube I3, which is connected to the supply wires in the same way as the tubes I1 and I2. The descending side of these square topped pulses produce output pulses of reverse phase which are tapped from the plate resistor 131 of tube I3 by a wire W5. These pulses, which will be referred to herein as A pulses, are 180° out of phase with the B pulses. In other words, their square waves are rising in value when the square waves of the B pulses are decreasing and vice versa, as clearly shown in Fig. 6a. Their rising side is used to operate other electronic circuits than those operated by the B pulses.

*Reading in the factors*

The digits of the multiplier are stored in an MP storage device comprising a group of counters 140A, 140B and 140C (Fig. 4b). Only three counters are shown, but any number may be used, depending upon the capacity desired. Each of these three counters comprises elements identical to circuits CC1 to CC4 and locking tube BL1 as shown in Fig. 2 and is therefore a scale-of-10 counter. However, the terminals e of all triggers of these counters are connected to the cancel bias wire 109 and the counters, therefore, cancel to the zero position, with all triggers turned to the right.

The digits of the multiplicand are stored in an MC storage device comprising a group of electronic counters 141A, 141B and 141C (Fig. 4d) which are identical to the counters of the multiplier storage device. Only three counters are shown but any number may be used, depending upon the number of digits of the multiplicand factors which are to be handled.

At the one tenth before 14 point in the second machine cycle the cam contact RC5 (Figs. 4a and 5a) opens, restoring all triggers, with the exception to be noted later, to a chosen normal condition. This positively insures that the counters of the multiplier and multiplicand storage devices will be returned to zero which is their chosen normal condition.

It will be assumed that the problem on the first card is 927×486. The number 927 designated as the MP will therefore be read from the multiplier field into the multiplier storage device and the number 486 designated as the MC from the multiplicand field into the multiplicand storage device.

Impulses for reading in numbers into the multiplier and multiplicand storage counters are supplied from a readin impulse device comprising a trigger T7 (Fig. 4b) and a power tube P6. T7 has its e terminal connected to the cancel bias line 109 and therefore is restored to its right hand normal condition at one tenth before 14 in each machine cycle in which cam contact RC5 (Fig. 4a) is opened. The trigger also has its terminal j connected to the top of a voltage divider 142, an intermediate point of which is connected to the control grid of the power tube P6. The cathode of the power tube is connected to the wire 90, while its plate and screen grid are connected to the B+ wire 92 through a plate resistor 143 and a screen grid resistor 144, respectively. The terminal f of the trigger T7 is connected by a wire 145 to one spring of a cam contact C4 while the terminal g is connected by a wire 146 to one spring of a cam contact C5. The other springs of the cam contacts C4 and C5 are connected by a common lead 147 to one spring of a cam contact RC3, the other spring of which is connected to wire 105. This wire has a potential 25 volts below that of wire 92. Bleeder resistances 148, 149 and 150 normally maintain the wires 145–147 at the potential of the wire 92, when contact RC3 is open. The timing of contacts RC3, C4 and C5 is shown in Figs. 5a and 5b. The condensers 151 and 152 connected between the 0 wire 90 and the wires 145 and 146 respectively filter out any transients which might affect the trigger T7.

The contact RC3 is closed (Fig. 5a) from the half after 9 index point position to the 0 index point position. During this time the contacts C5 and C4 (Fig. 5a) close alternately (Fig. 5a), switching the readin impulse trigger T7 to the left and then to the right, respectively, once for each index point position fed past the brushes 13. There are only nine effective pulses, however, because RC3 opens at a quarter after 0 (Fig. 5a) so that closure of C5 and C4 thereafter is ineffective. Each time the trigger switches to the left under control of C5, the potential at its j terminal drops and reduces the potential on the control grid of the power tube P6. This power tube is conductive when the trigger T7 is in its right hand position and is rendered non-conductive by the transfer of the trigger to its left hand position. The resultant rise of the plate potential of power tube P6 when rendered non-conductive is transmitted through wires 153 and 154 and through condensers 155 and grid resistors 156 to the control grids G2 of three electronic switch tubes ES7A, ES7B, ES7C. These tubes do not respond to such positive pulses until conditioned in a manner to be described presently. The positive pulses are also transmitted through wire 153 (Figs. 4b and 4c), transferred contact R14a (see R14, Figs. 5a and 5b), wire 157, and through condensers 158 and grid resistors 159 to the control grids G2 of electronic switch tubes ES8A, ES8B and ES8C. These tubes are likewise not affected by the positive impulses transmitted over wire 153 until conditioned, in a manner now to be described.

Figure 5A:
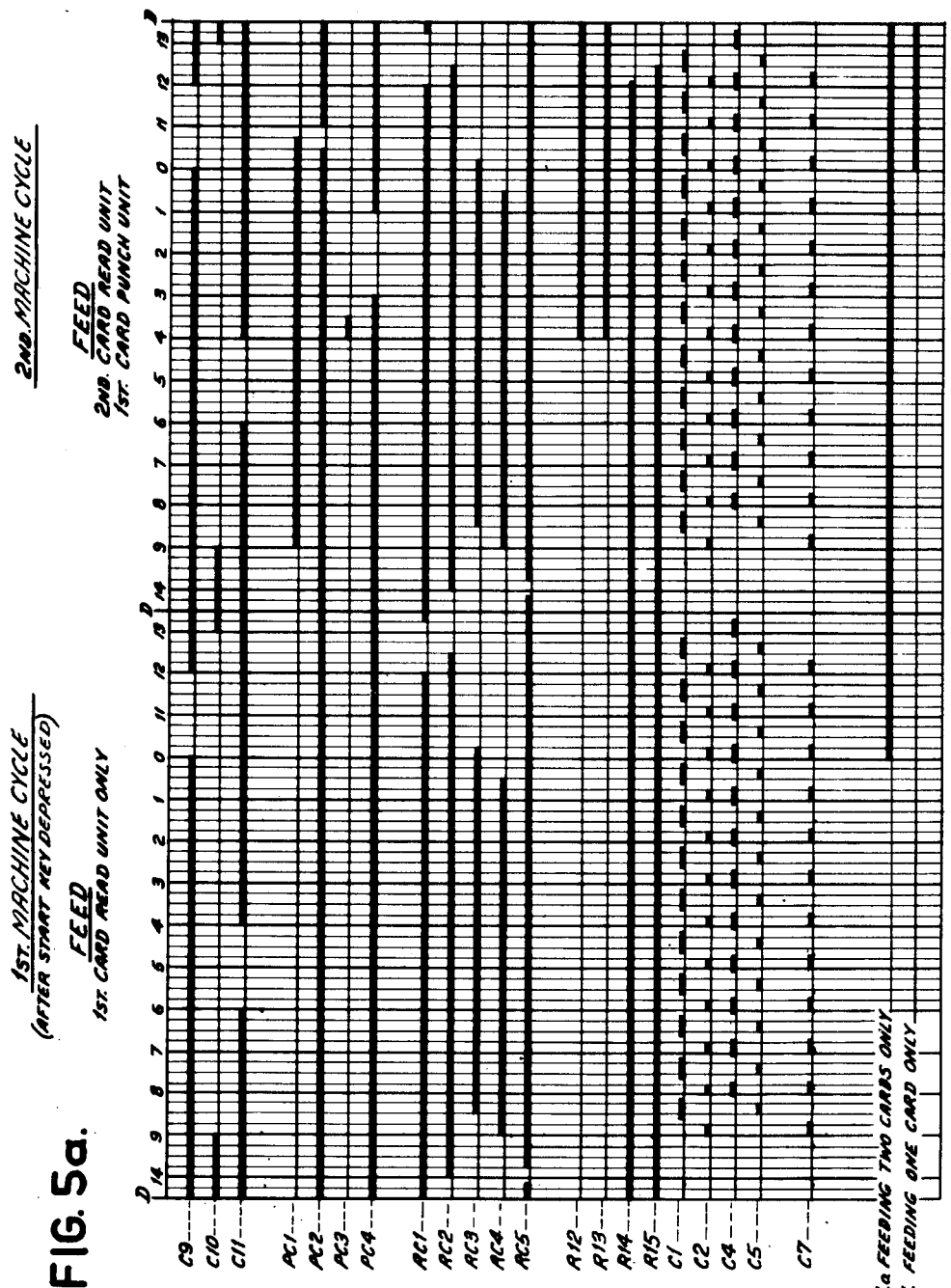
Figs. 5a and 5b are parts of the timing diagram of the machine cycle.

During the second machine cycle, for example, while the card is feeding between the contact roll 12 and the brushes 13, the card lever contact RCb (Fig. 4b) is closed (Fig. 5a). Also, the cam contact RC4 is closed from the 9 point to the half after 1 point. The cam contact C7 (Figs. 4b, 5a and 5b) closes at the beginning of each index point and opens before the next index point of the readin cycle and it extends the reduced potential of wire 105 in negative pulses through wire 160, said contacts C7, RC4 and RCb, to common brush 161 also connected by a resistor to the higher voltage of line 92 and contact roll 12. Cam contact C7 closes for a portion only of the time a hole is sensed to thereby apply the reduced voltage of lines 105 and 160 to a trigger as follows. The brush 13 pertaining to the hundreds digit of the multiplier will read a 9 hole, since the MP is 927 at the time the negatively pulsed potential is extended, by closure of C7 through wire 160 in the manner described and will extend this potential through the related plug wire 162 and wire 163 to the terminal g of the trigger T9C, switching this trigger to the left. As shown, triggers T9A, T9B and T9C are each connected by its terminal e to the cancel bias line 109 so that at one tenth before 14 they were switched right. When trigger T9C is switched left at the beginning of the 9 index point, the potential at the terminal k of trigger T9C rises. This terminal is connected to the top of a voltage divider 164 extending to wire 78. The midpoint 165 of this voltage divider is connected to the control grid G1 of switch tube ES7C. The normal voltage of the control grid G1 of this switch tube, when trigger T9C is in its right hand position, is such as to render the switch tube unresponsive to positive pulses applied to the control grid G2. When the trigger T9C switches left, the high potential on its terminal k causes the potential on the control grid G1 to rise to a point which renders the tube ES7C responsive to such pulses. This tube, therefore, is made conductive for each of the nine and nine only, as previously described, positive pulses transmitted to its control grid G2 from wire 153 when T9C is switched left by the reading of a 9 hole. Each time the tube ES7C becomes conductive, a negative pulse is transmitted from an intermediate point 166 of its plate resistor 167, through wires 168, 169 to the terminals f and g of the left hand trigger of counter 140C. This counter is thereby advanced to a condition representing the number 9. As previously explained, all MP counters were returned to zero at one tenth before point 14.

Similarly, the brush 13 reading the units column of the multiplier field will sense a 7 hole since the MP is 927, switching the trigger T9A to the left at this time and rendering the switch tube ES7A responsive to each of the subsequent seven pulses transmitted through wire 153. The units order counter 140A will thereby be advanced to a condition representing the number 7. In the same way the tens order counter 140B will store a 2.

When the brush 13 reading the tens order of the multiplicand field senses an 8 hole, since the MC is 486, a negative impulse is transmitted (as explained in connection with MP sensing) through the related plug wire 170 (Fig. 4c) and wire 171, to the terminal g of the trigger T16B, switching this trigger to the left. This conditions the grid G1 of switch tube ES8B at such a time as to make the tube responsive to 8 only of the 9 pulses available on grid G2 through wire 153 since T16B is switched only after the first of these 9 pulses has occurred. During the readin time, relay R14 is energized (Fig. 5a) so that contacts R14a are reversed from the position shown, to connect line 153 and grids G2. As each pulse is applied to the grid G2 of the tube ES8B, its plate potential dips and a negative pulse is transmitted from its plate resistor 236 through the related wire 237 (Figs. 4c and 4d) to the terminals f and g of the left hand trigger of the MC storage counter 141B, causing an 8 to be stored in this counter. In a similar manner a 6 and a 4 are stored in the units and hundreds counters 141A and 141C, respectively.

At the 4 point in the second machine cycle (Fig. 5a), the contact PC3 (Fig. 4a) closes and the relay R12 is picked up, to be held by C11 until the 6 point (Fig. 5b) in the third machine cycle. Its contact R12c (Fig. 4a) is therefore open when the contact C10 closes near the end of the second cycle (Fig. 5a) so that neither of the clutch magnets RCM or PCM is energized. The card feed of both the reading unit and the punch unit remain idle during the third machine cycle labelled "Multiply" in Fig. 5b.

Figure 5B:
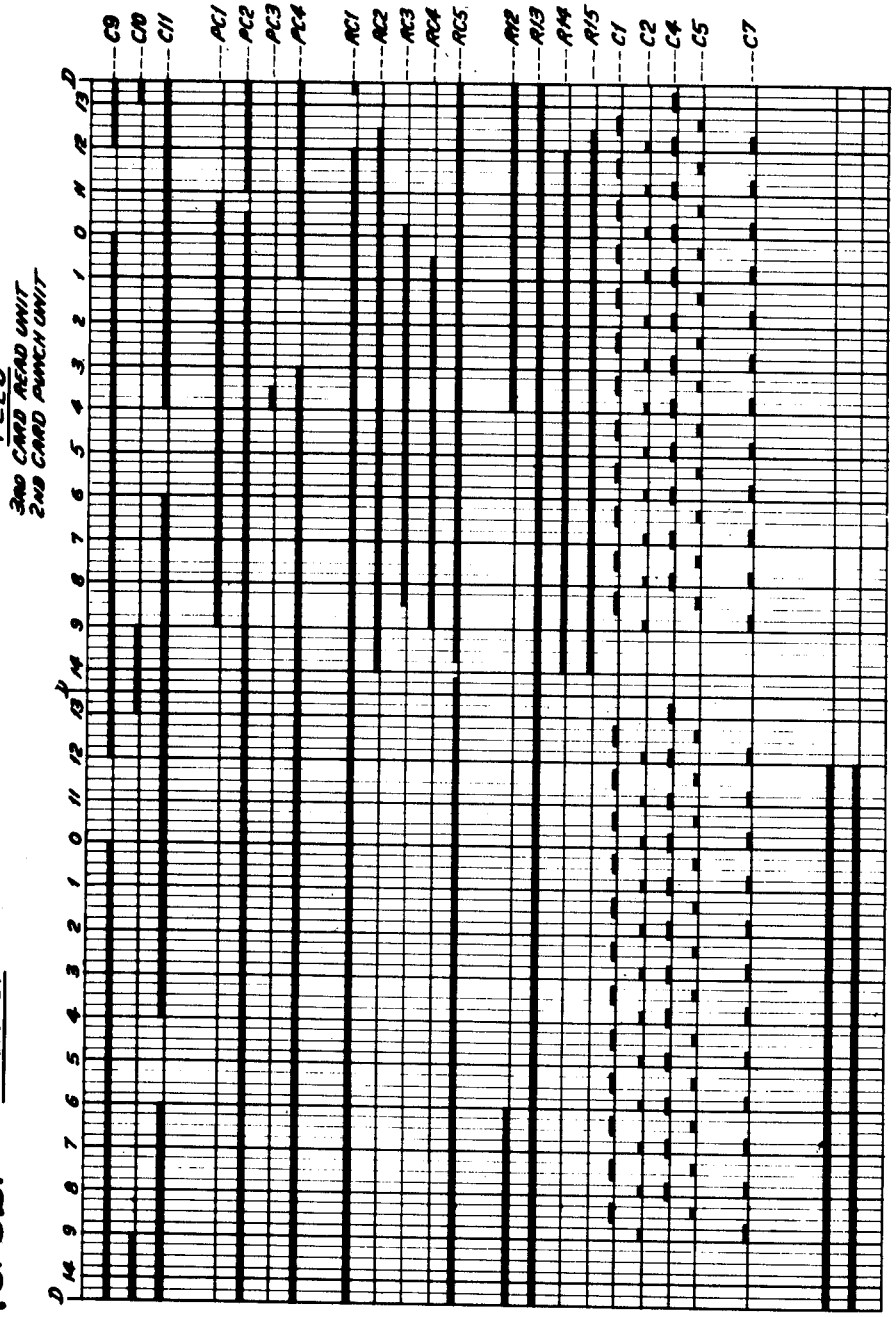

As is seen from Fig. 5b, cam contact RC5 does not open during this particular machine cycle so that no triggers are reset thereby during this cycle. Also cam contacts RC3 are open during the entire third machine cycle (Fig. 5b) so that no further pulses are transmitted to the MP or MC storage devices under control of RC3.

*Multiplying cycle*

At the quarter after 0 point in the second machine cycle, the multiplier and multiplicand have been read into the respective storage devices, see RC3 (Fig. 5a). At the following 12 point, the cam contact RC1 (Figs. 4a and 5a) opens, dropping out the relay R14. The contacts of this relay transfer to their normal position and, in particular, the contacts R14a (Fig. 4c) transfer from the readin wire 153 to a wire 200, through which readout impulses instead of readin impulses are now to be transmitted to the multiplicand counters during the multiplying cycle, in a manner to be described.

It is to be noted that at one-tenth before 14 in the second machine cycle, the primary counter was restored to 28 by RC5 (Figs 4a and 5a) and the secondary cycle counter was restored to zero. All individual triggers except T18A to T18F, inclusive (Fig. 4e) were restored right thus ensuring that relays RCS1 and RCS2, described later, are deenergized and that relay R16, described later, is energized. Also PC2 (Figs. 4d and 5a) opens at a half after 0 to restore the product storage counters to zero and to trip triggers T18A to T18F inclusive to the right. The MC and the MP factors have been read into the respective counters and were now ready to multiply.

At the half after 12 point of this second machine cycle the cam contact RC2 (Figs. 4a and 5a) opens, dropping out the relay R15. This starts the multiplying operation. The contact R15a (Fig. 4b) closes, completing a circuit from an intermediate point 201 on a voltage divider 202 extending between the wires 90 and 78, through the contacts R15a, transferred contacts R16a, the relay R16 to be referred to later being energized at this time, to the terminal $g$ of trigger T1. This terminal, which has been conditioned by its connection through resistance 203 to wire 90, now receives a drop in potential when the contact R15a closes, and this negative pulse switches the trigger T1 to the left.

The effect of switching trigger T1 left is to start the transmission of A phased pulses applied to a grid G2 of tube ES1 and through this tube to the primary cycle counter 60. The terminals $f$ and $g$ of the primary cycle counter trigger CC1 are connected by wire 204 to an intermediate point on the plate resistor 205 of the electronic switch tube ES1. This tube is normally held non-conductive by the potential on its control grids G1 and G2. The grid G1 is connected to an intermediate point on a voltage divider 206, the bottom of which is connected to the wire 78 and the top to the terminal $k$ of the trigger T1. When the trigger T1 is switched left as described above, the potential on the grid G1 rises to a point which renders the tube responsive to the positive A pulses applied to the grid G2. The grid G2 is connected through a grid resistor 207 to an intermediate point 208 on a voltage divider 209, the lower end of which is connected to the wire 78 and the upper end to the wire 92. The point 208 is coupled through a condenser 210 to the wire W5, over which A pulses are transmitted from the pulse generator in the manner previously described under the title "Pulse Supply."

Thus, as soon as the trigger T1 switches left at one half after 12, the primary cycle counter starts to count A pulses. Up to this time, the operation has been progressing at the relatively slow rate of the machine cycle. When the multiplying cycle begins the operation proceeds at a vastly increased rate.

The multiplying operation consists in storing up in a product storage device pulses metered into the product storage device under control of the cycle counter, the multiplier counters, and the multiplicand counters. The product storage device is shown in Fig. 4e. It comprises six electronic counters 62A–62F, conforming to the capacity of the multiplier and multiplicand storage devices. The number will be varied in accordance with the capacity desired.

The pulses are metered into the product storage device in groups, the number of pulses in each group being determined by the multiplicand storage device and the number of groups being determined by the multiplier storage device. The different counters of the multiplier storage device take control of the pulse transmission in succession, beginning with the units order counter, 140A. Each of these multiplier counters controls the pulse transmission during ten secondary cycles. During these ten secondary cycles a readout pulse is transmitted to the units order counter of the multiplier storage device once for each of said ten secondary cycles. If a 7 is stored in this units counter with MP 927, it will pass to zero in response to the third readout pulse. When it does so, it turns on a metering device, which thereupon meters out a group of ten multiplicand readout pulses and a group of ten product pulses during each of the remaining 7 secondary cycles of the control by the units multiplier counter.

The groups of ten multiplicand readout pulses cause all of the multiplicand storage counters 141A, 141B and 141C (Fig. 4d) to cycle once during each secondary cycle; that is, they cause each of said counters to pass through zero and back to the respective values stored in them. The groups of ten product pulses are transmitted to product pulse switches controlled, respectively, by the different counters of the multiplicand storage device. These switches are normally open or inoperative and are closed or rendered operative by their respective multiplicand counters when the latter pass to zero at differential times, depending upon the numbers stored in them. The multiplicand readout pulses are A pulses while the product pulses are B pulses and are interspersed with the former so that each multiplicand readout pulse, except the last one in each group, is followed by a product pulse. Thus, if a 6 with MC 486 is stored in the first counter of the multiplicand storage device, the fourth A pulse transmitted to it in each secondary cycle will make it pass to zero and close the product pulse switch. There will follow in each secondary cycle six B pulses which will be transmitted to the first counter of the product storage device. The product pulse switches are opened again in each secondary cycle, after the metered numbers of pulses have been transmitted through them, and remain open until the differential times in the next secondary cycle when their respective counters of the multiplicand storage device close them.

At the end of ten secondary cycles there is a column shift operation and the control is switched to the tens order counter of the multiplier storage device. Another column shift occurs at the end of the 20th secondary cycle, at which time the control is switched to the hundreds order counter of the multiplier storage device.

*MP readout pulses.*—The multiplier readout pulses are transmitted at the 16th point in each secondary cycle and are accordingly controlled by the trigger T5 (Fig. 4d), which switches to the left at this time (Fig. 6a). The terminal $k$ of trigger T5 is connected by wire W14 to the top of a voltage divider 215, the bottom end of which is connected to bias wire 78. An intermediate point of this voltage divider is connected to the grid of an inverter tube I8. An intermediate point of the plate resistor 216 of tube I8 is coupled by wire 217 (Figs. 4d, 4c and 4b), condenser 218 (Fig. 4b), contacts RCS1g in their normal position and wire 219 to the terminals $f$ and $g$ of the left hand trigger of the units counter 140A of the multiplier storage device. When the trigger T5 switches left at the 16th point in the cycle, the potential on its terminal $k$ rises, lifting the potential of the grid of tube I8 to a point which renders this normally non-conductive tube conductive. This causes a negative impulse to be transmitted over the circuit just traced to the terminals $f$ and $g$ of the left hand trigger of the counter 140A. This counter is advanced by 1 by each impulse so transmitted.

*MC readout pulses.*—In the example given the units MP storage counter 140A has a 7 stored in it since MP is 927. Accordingly, the impulses transmitted to it in the first, second and third secondary cycles will advance this counter to 8, 9 and 0, respectively. When the counter advances to zero, its right hand trigger switches to the right, causing the potential on its terminal $n$ to be depressed. A negative pulse is transmitted from this terminal through condenser 220, contact RCS1d, and wire 221 (Figs. 4b and 4c), to the terminal $g$ of trigger T2 (Fig. 4c), switching this trigger to the left. T2 was switched right at one tenth before 14 in the second machine cycle when RC5 (Figs. 4a and 5a) opened. The terminal k of trigger T2 is connected to the top of a voltage divider 222, the lower end of which is connected to the wire 78 and an intermediate point of which is connected to the grid G1 of an electronic switch tube ES2. This tube is normally non-conductive, but the change in potential on its grid G1 when the trigger T2 switches left conditions it to respond to positive pulses applied to its grid G2. The latter grid is connected by a grid resistor 223 to an intermediate point of a voltage divider 227, the top of which is connected to the wire 92 and the bottom to wire 78. The intermediate point of voltage divider 227 is coupled by a condenser 224, and wire W1 (Figs. 4c and 4b) to the terminal j of trigger CC6 of the primary cycle counter.

When the trigger CC6 switches right at the zero point at the beginning of the fourth secondary cycle (Fig. 6a), a positive pulse is transmitted to the grid G2 of the tube ES2, and since its grid G1 was raised in voltage by T2 being switched left for the first time in the third secondary cycle when the units MP storage counter advanced to zero this tube is rendered conductive and causes a negative pulse to be transmitted from an intermediate point on its plate resistor 225, through wire 226 to the terminal g of a trigger T3, switching this trigger to the left. As explained presently, the above-mentioned multiplicand readout pulses and product pulses will be metered out by the trigger T3. Ten A pulses and ten B pulses will be metered out in each of the 4th to 10th secondary cycles (see Figs. 6b and 6c, ES3 and ES4). The metering of the A pulses is controlled by the electronic switch tube ES3. The grid G1 of this tube is connected to an intermediate point on a voltage divider 230, the lower end of which is connected to the wire 78 and the upper end to the terminal k of trigger T3.

When trigger T3 switches left, as described above, the potential on the grid G1 of tube ES3, which is normally such as to render the tube non-conductive, conditions the tube for response to positive pulses applied to its grid G2. This grid is connected through a grid resistor 231 to an intermediate point of a voltage divider 228 extending between the wires 92 and 78. The intermediate point of voltage divider 228 is coupled by a condenser 232 to wire W5, through which A pulses are transmitted from the pulse generator. Each A pulse applied to the grid G2 of ES3 after its grid G1 is conditioned, as just described, renders the tube conductive and causes the plate potential to be reduced. The reduced plate potential is transmitted through wire 233 and voltage divider 234 to the control grid of a power tube P1. This power tube is normally conductive and is cut off by this reduced voltage on its control grid. A positive pulse is thereby transmitted from an intermediate point on its plate resistor 235, through wire 200, normal contact R14a, wire 157, condensers 158, and grid resistors 159, to each of the grids G2 of the tubes ES8A, ES8B and ES8C. At this time the potential on the grids G1 of these tubes is high, since the triggers T16A-T16C remain left, once they are switched by the readin pulse as described above under the title "Reading In the Factors," and the tubes are made conductive by each positive pulse transmitted from tube P1. Accordingly, negative pulses are transmitted from the plate resistor 236 of each tube, through the related wire 237 (Figs. 4c and 4d) to the terminals f and g of the left hand triggers of the MC storage counters 141A to 141C.

At the 10 point in the fourth secondary cycle, the trigger CC6 (Fig. 4b) switches left (Fig. 6b). Thereby a drop in potential is transmitted from its terminal m through wire W6 (Figs. 4b and 4c), to the terminal f of the trigger T3, switching this trigger to the right. This reduces the potential on the grid G1 of tube ES3 and cuts off the A pulses from the counters of the multiplicand storage device. These counters have received ten A pulses during the fourth secondary cycle. At the start of the fifth secondary cycle the trigger T3 is switched left (Fig. 6b) again by an impulse transmitted from tube ES2 in response to a positive pulse transmitted through wire W1 from the terminal j of trigger CC6. At the 10 point in the fifth secondary cycle, the trigger T3 is switched right again by an impulse transmitted through wire W6 from the terminal m of trigger CC6. During the time the trigger T3 was left, another ten A pulses were transmitted to the counters of the multiplicand storage device. In this way in each secondary cycle, after the output pulse from the multiplier storage counter, ten pulses are metered into each multiplicand storage counter.

*Product pulses.*—In the same way the trigger T3 meters B pulses to the product pulse switches. The terminal k of trigger T3 is connected by wire W16 (Figs. 4c and 4d) to the upper end of a voltage divider 240 (Fig. 4d), an intermediate point of which is connected to the grid G1 of an electronic switch tube ES4. When the trigger T3 is in its right hand position, the potential on grid G1 of tube ES4 is such as to render the tube non-conductive. When the trigger T3 is switched left, the tube ES4 becomes responsive to B pulses applied to its grid G2. This grid is connected by a grid resistor 241 to an intermediate point 242 of a voltage divider 243, the lower end of which is connected to wire 78, and the upper end to wire 92. The intermediate point 242 is coupled by a condenser 244 to wire W13, through which B pulses are transmitted from the pulse generator. When the tube ES4 is conditioned for response to B pulses, each B pulse renders the tube conductive and lowers the plate potential. The plate of tube ES4 is connected to a voltage divider 245, an intermediate point of which is connected to the control grid of a power tube P2. An intermediatie point of the plate resistor 246 of this tube is coupled by a wire 247 and condensers 248 to the grids G2 of the product pulse switch tubes ES9A-ES9C. The latter tubes are normally conditioned not to respond to the B pulses, by potentials applied to their grids G1.

Each grid G1 is connected to an intermediate point of a voltage divider 250, the lower end of which is connected to wire 78 and the upper end to the terminal k of a trigger T17A, T17B or T17C. When these triggers are in their normal right hand positions, the potential on the grids G1 of the tubes ES9A-ES9C renders these tubes non-responsive to B pulses. As each counter 141A-141C (Fig. 4d) passes to zero condition, its right hand trigger switches right and a negative impulse is transmitted from its terminal n through the related wire 251 to the terminal g of the related trigger T17A-T17C, switching the latter trigger to the left. The resulting rise of potential at the terminal k of the trigger T17A-T17C lifts the potential on the grid G1 of the related tube ES9A-ES9C and allows the B pulses to be transmitted through the tube. Each of the tubes ES9A–ES9C has a plate resistor 252, from an intermediate point of which leads off a wire 253. When the tube ES9B, for example, is made conductive by a B pulse transmitted to its grid G2, its plate potential drops and a voltage dip is transmitted through the related wire 253, normal contacts RCS1b and RCS2a, the related wire 254, normal contact R14d, the related wire 255 (Figs. 4d and 4e), to the terminals f and g of the left hand trigger of the product counter 62B.

At the 20 point in each secondary cycle the triggers T17A–T17C are simultaneously restored to their right hand positions, dropping the potentials on the grids G1 of product pulse switch tubes ES9A–ES9C and thereby "opening" these switches, so that they cannot transmit B pulses applied to their grids G2. A negative restoring pulse is transmitted to the terminal f of each trigger T17A–T17C through a related condenser 266 and a common wire 265, from a plate resistor 264 of a power tube P5. The grid of this tube is connected through a grid resistor 261 to an intermediate point 262 of a voltage divider 263 extending between wires 92 and 78. The point 262 is coupled by a condenser 260 and wire W8 (Figs. 4d, 4c and 4b) to the terminal k of trigger CC5 (Fig. 4b). When the latter trigger switches left at the 20 point (Fig. 6b) of each secondary cycle, a positive pulse is transmitted from its terminal k to the grid of normally non-conductive tube P5, which becomes conductive. A negative pulse is transmitted via wire 265 from the plate resistor 264 to the terminal f of each trigger T17A–T17C, switching the latter to the right.

In the chosen example, during the first ten secondary cycles the number 486, stored in the multiplicand storage device, is to be multiplied by 7, stored in the units counter of the multiplier storage device. During the first three secondary cycles, the A and B pulses are not transmitted through the tubes ES3 and ES4, because until the 16 point in the third secondary cycle, the trigger T2 is in its right hand position. At the 16 point in the third secondary cycle, the trigger T2 is switched left by an output pulse from the units counter 140A of the multiplier storage device and at the following zero point, that is, at the beginning of the fourth secondary cycle, the trigger T3 is switched to the left. From this point on ten A pulses and ten B pulses are metered through the tubes ES3 and ES4 during each of the 4th to 10th secondary cycles.

In the fourth secondary cycle the multiplicand counter 141B (Fig. 4d) passes to zero in response to the second A pulse, since an 8 is stored in this counter. An output pulse is thereon transmitted through the related wire 251 to the trigger T17B, switching this trigger to the left and rendering the tube ES9B responsive to each of the eight following B pulses applied to its grid G2. Accordingly, eight pulses are transmitted from the plate resistor 252 of the tube ES9B, through the previously traced circuit to the counter 62B of the product storage device. In this same fourth secondary cycle the multiplicand counters 141A and 141C pass to zero in response to the fourth and sixth A pulses, respectively; consequently their related product pulse switch tubes ES9A and ES9C transmit 6 and 4 B pulses through the column shift circuits to the respective counters 62A and 62C of the product storage device. At the 20 point in the fourth secondary cycle the triggers T17A–T17C are restored to their right hand positions, in the manner described.

In each of the following secondary cycles, 5–10, the same process is repeated, with the result that 4, 8 and 6 are added seven times in the respective counters 62C, 62B, and 62A of the product storage device.

*Carry.*—Returning for a moment to the beginning of the fifth cycle, at this time the counters 62A–62C contain the numbers 6, 8, and 4, respectively. In the fifth cycle six impulses are transmitted to the counter 62A (Fig. 4e), causing it to pass through zero and to stop at 2. When it passes to zero its right hand trigger switches right and a negative pulse is transmitted from its terminal n through wire 270 to the terminal g of a trigger T18A, switching this trigger to the left. The terminal k of trigger T18A is connected to the top of a voltage divider 371, an intermediate point of which is connected to the grid G2 of an electronic switch tube ES10A. The grid G1 of this tube is connected to an intermediate point on a voltage divider 372, the lower end of which is connected to wire 78 and the upper end through a wire W17 to the plate of a power tube P3 (Fig. 14d). The control grid of the power tube P3 is connected to an intermediate point of a voltage divider 273 whose upper end is connected to the terminal j of the trigger T5. The power tube P3 is conductive when the trigger T5 is in its normal right hand position. This trigger switches left at the 16 point, depressing the potential on the control grid of the tube P3 and causing the plate potential of the latter to rise. The rise in potential is transmitted through wire W17 to the grid G1 of the tube ES10A. The potential of the grid G2 of this tube is high, because the trigger T18A switched left when counter 62A passed to zero; therefore the tube ES10A becomes conductive at the 16 point. An intermediate point on its plate resistor 274 is connected by a wire 275 to the input wire 255 of the counter 62B. When the tube ES10A becomes conductive a dip in voltage is transmitted through wire 275 to the input side of the counter 62B. This counter has received eight pulses during the fifth cycle and has therefore passed through zero and stopped at 6. The carry pulse advances it to 7.

At the 26 point in each secondary cycle any triggers T18A–T18F which have been switched left by an output pulse from the related counters are restored to their normal right hand position. The terminals f of these triggers are connected by a wire 276 (Figs. 4e and 4d) to the plate resistor 277 of a power tube P4 (Fig. 4d). The grid of this tube is connected through a grid resistor 278 to an intermediate point 279' of a voltage divider 279 extending between the wires 92 and 78. The point 279' is coupled through condenser 289 and at this time (Fig. 5b, third cycle for R14) normal contact R14b to the terminal k of trigger T6. When this trigger is in its right hand position, tube P4 is non-conductive. When T6 switches left at the 26 point, tube P4 is made conductive and a negative pulse is transmitted to the terminals f of triggers T18A–T18F, restoring any that have been switched left to the right.

*Carry on Carry.*—At the end of the ninth secondary cycle, the product storage device has stored in its four counters 62D–62A the number 2916. In the tenth secondary cycle the counter 62B receives eight impulses and advances to 9. At the carry time a pulse is transmitted from the counter 62A, which has passed from 6 to 2. This pulse advances the counter 62B from 9 to 0. The control grid G1 of the tube ES10B is still at high potential at this time, since it is controlled by the power tube P9, the plate of which remains at high potential from the 16 point until the 28 point in the cycle (see Figs. 6a–6c). Accordingly, when the counter 62B passes to zero and switches its output trigger T10B to the left, the resulting rise in voltage transmitted to the grid G2 of the tube ES10B causes the latter to transmit an impulse through the related wire 275 to the input side of the counter 62C.

*Column shift.*—At the 16 point of the tenth secondary cycle the trigger CC10 of the secondary cycle counter 61 (Fig. 4c) switches right (Fig. 6c). A positive pulse is transmitted from its terminal *j* through wire 280, condenser 281, grid resistor 282 and wire W15 (Figs. 4c and 4b) to the grid of an inverter tube I4 (Fig. 4b), which is normally non-conductive. The positive pulse renders this tube conductive and causes a negative pulse to be transmitted from its plate resistor 282a through wire 283 to the terminal *g* of the trigger T1A, switching the latter to the left (Fig. 6c). At the 28 point in the same cycle the trigger T6 (Fig. 4d), switches right as previously described, causing a negative pulse to be transmitted from its terminal *n* through wires 180 and W4 (Figs. 4d, 4c and 4b) to the terminal *j* of trigger T1A, switching the latter to the right (Fig. 6c). When this occurs, a negative pulse is transmitted from the terminal *n* of trigger T1A to the terminal *j* of trigger T1, switching it to the right (Fig. 6c). This depresses the potential on the grid G1 of the tube ES1 and at the 28 point cuts off the supply of A pulses to the primary cycle counter.

The same positive pulse produced at the 16 point by trigger CC10 when it switches right is transmitted from trigger CC10 terminal *j*, wire 280 through condenser 281 and grid resistor 282 and lifts the potential of the grid of a normally non-conductive inverter tube I5 and renders this tube conductive at 16. Thereby a negative pulse is transmitted from the plate resistor 285 of the tube I5, through wire 286, to the terminal *g* of trigger T15, switching this trigger to the left. A column shift interlock relay R16 is connected in the plate circuit of a power tube P15, which has a control grid connected to a voltage divider 287, the lower end of which is connected to wire 78 and the upper end to the terminal *j* of trigger T15. When the trigger T15 is in its right hand position, the tube P15 is conductive and the relay R16 is energized. When the trigger T15 switches left as just described, the tube P15 is rendered non-conductive and the relay R16 is deenergized. Its contact R16a (Fig. 4b), previously mentioned, transfers back to the normal position shown in Fig. 4b, which ensures T1 will not be switched left to start pulses to primary until the column shift is completed.

The same negative pulse transmitted at the 16 point from the plate resistor of inverter tube I5 (Fig. 4c) to trigger T15, as just described is also transmitted from wire 286, through normal contact RCS1e and wire 290 to the terminal *g* of trigger T10, switching the latter to the left. The terminal *k* of trigger T10 is connected to the top of a voltage divider 291, an intermediate point of which is connected to the control grid of a power tube P10. Relay RCS1 is serially connected in the plate circuit of the tube P10.

When the trigger T10 is in its right hand position, the tube P10 is non-conductive and relay RCS1 is deenergized. When the trigger T10 is switched left at the 16 point, as just described, the potential of the control grid of tube P10 is raised and the tube becomes conductive, causing the relay RCS1 to become energized. The contacts RCS1a–RCS1c (Fig. 4d) transfer, connecting the wires 253 through said contacts, normal contacts RCS2a–RCS2c, the related wires 254, normal contacts R14d–R14f, the related wires 255 (Figs. 4d and 4e), to the input terminals of counters 62B–62D, respectively, counter 62A, by this column shift, being disconnected from the metered B pulses.

When relay RCS1 is energized, as just described, the contact RCS1g (Fig. 4b) transfers, so that the multiplier readout pulses will be transmitted to counter 140B of the multiplier storage device, instead of to the counter 140A. The contact RCS1d (Fig. 4b) transfers, so that the wire 221 which conducts the multiplier output impulse to switch the trigger T2 (Fig. 4c) will be coupled through said contact in transferred position, normal contact RCS2d (Fig. 4b), condenser 220b to the terminal *n* of the right hand trigger of the counter 140B of the multiplier storage device. The contact RCS1f (Fig. 4c) transfers, transmitting a negative pulse from a point 292 on a voltage divider 293 connected between the wires 90 and 92, through normal contact RCS2f, transferred contact RCS1f to the terminal *f* of trigger T15, switching this trigger to the right. This renders the tube P15 conductive and causes the relay R16 to be reenergized. The relay R16 constitutes an interlock which, by releasing its contact R16a (Fig. 4b) ensures that no pulses will go to the primary cycle counter until R16 is reenergized after this column shift is completed.

Upon such reenergization of relay R16 contact R16a (Fig. 4b) transfers and a negative pulse is transmitted from point 201 on voltage divider 202, through normal contact R15a, transferred contact R16a, to the terminal *g* of trigger T1, switching this trigger to the left. This begins for another series the transmission of A pulses to the primary cycle counter. During the 11th to 20th secondary cycles, since a 2 is stored in the tens multiplier counter 140B, the MC 486 is entered twice in the second, third and fourth orders of the product accumulator in the same manner as entries were made, in the proper orders during the 1st to 10th secondary cycles, it being noted that the tens counter 140B of the multiplier storage device controls during the 11th to 20th secondary cycles instead of the units order 140A which controlled during the first ten secondary cycles.

At the 16 point in the 20th secondary cycle T1A (Fig. 4b) is switched left, as before, and at the 28 point it is tripped right and A pulses are again cut off from the primary cycle counter by an impulse transmitted from the trigger T1A (Fig. 4b) to trigger T1. Also, at the 16 point a negative impulse is transmitted from the tube I5 (Fig. 4c), through wire 286 to the trigger T15, switching this trigger to the left and causing the column shift interlock relay R16 to be deenergized, as previously described. Also, at this time the contact RCS1e (Fig. 4c) is in its transferred position and the negative impulse through wire 286 is now transmitted through this contact in transferred position and wire 295 to the terminal *g* of trigger T11, switching this trigger to the left. The terminal *k* of trigger T11 is connected to a voltage divider 296, an intermediate point 297 of which is connected to the control grid of a power tube P11. A relay RCS2 is serially connected in the plate circuit of this tube. The tube P11 is non-conductive when the trigger T11 is in its right hand position and the relay RCS2 is then deenergized.

When the trigger T11 switches left, as just described, the tube becomes conductive and the relay RCS2 is energized. The contacts RCS2a–RCS2c (Fig. 4d) transfer so that the wires 253 are then connected through previously transferred contacts RCS1a–RCS1c and presently transferred contacts RCS2a–RCS2c, wires 254, normal contacts 14e–14g, wires 255, to the counters 62C–62E (Fig. 4e) of the product storage device. The contacts RCS2g and RCS2d (Fig. 4b) also transfer, shifting the control from the counter 140B to the counter 140C of the multiplier storage device.

When relay RCS2 is energized, as just described, contact RCS2f (Fig. 4c) transfers, causing a negative pulse to be transmitted from wire 90 through transferred contacts RCS2f and RCS1f, to the terminal f of trigger T15, switching this trigger back to the right. This renders the power tube P15 conductive and causes the relay R16 to be reenergized. The contact R16a (Fig. 4b) transfers and a negative pulse is transmitted to the terminal g of trigger T1, switching this trigger to the left and starting the transmission of A pulses to the primary cycle counter.

In the 21st–30th secondary cycles the MC 486 is added 9 times in the counters 62E–62C of the product storage device since MP is 927. This produces a total of 450522 in the product storage device, which is the product of 927×486.

The number of pulses in each group of multiplicand readout pulses supplied by ES3 (Figs. 6b and 6c), is equal to the base number of the system of notation for which the apparatus is designed. In the apparatus just described, which is designed for the decimal system of notation, there are ten multiplicand readout pulses in each group.

Also in the embodiment just described, there are ten product pulses supplied by ES4 (Figs. 6b and 6c) in each secondary cycle but the first pulse is always thrown away, because it occurs before the first multiplicand readout pulse see ES4 (Fig. 6b.) This leaves nine potentially effective product pulses, one less than the base number of the system of notation used.

The number of multiplier readout pulses supplied by 18 (Fig. 4d) at 16 of each secondary cycle is always dependent upon the base number of the system of notation used. In the embodiment just described, there are ten multiplier readout pulses see 18 (Figs. 6a, 6b and 6c), but only nine of them are effective, because the last one (18, Fig. 6c, tenth secondary cycle) occurs after the multiplicand readout pulses (ES3, Fig. 6) and product pulses (ES4, Fig. 6) in the last cycle of each group of 10 secondary cycles. The number of effective multiplier readout pulses is therefore one less than the base number of the system of notation used.

*Punching the product*

After the thirtieth secondary cycle the multiplication is completed and the multiplying apparatus remains in static condition until a product readout cycle is initiated by the machine. At the six point in the third machine cycle, the contact C11 (Figs. 4a and 5b) opens, dropping out the relay R12 (Figs. 4a and 5b). Thereupon the contact R12C closes and when the contact C10 closes at the thirteen point in the third machine cycle (Figs. 4a and 5b) the magnets RCM and PCM pick up, again setting in operation the card feed mechanism of the reading unit and the punch unit. During the fourth machine cycle, the second problem card will be fed past the reading brushes 13 (Fig. 1) and the first product card will be fed past the punches 26 concurrently.

Early in the fourth machine cycle, just before the 14 point, the contact RC5 opens (Figs. 4a and 5b), removing bias potential from the cancel bias wire 109 and restoring to a chosen status all of the triggers, except those of the product storage device which are restored as described later. This restores the primary cycle counter to 28 while the multiplier and multiplicant storage devices are returned to zero condition, in preparation for the storage of the new factors to be read from the second problem card during the fourth machine cycle. Also, since triggers T10 and T11 (Fig. 4c) are restored to the right, relays RCS1 and RCS2 are deenergized, releasing their contacts (Fig. 4d) to normal positions. Trigger T15 is restored to the right thereby energizing relay R16 to transfer its contact R16a (Fig. 4b).

At the fourteen point in the fourth machine cycle the contact RC2 (Figs. 4a and 5b) closes, picking up the relays R14 and R15. The contacts R14a (Fig. 4c), R14b (Fig. 4d), the series of contacts R14c–R14h (Fig. 4d), and the contact R14i (Fig. 4e) all transfer. Also, the contact R15a (Fig. 4b) opens, allowing the terminal g of the trigger T1 to assume the potential of the zero wire 90.

The contact PC1 which controls production of product readout pulses (Figs. 4b and 5b) is closed from 9 to a quarter before 11 in the fourth cycle. During this time the contacts C2 and C1 close alternately respectively. These contacts switch a trigger T8 back and forth, operating through circuits identical to those which control the trigger T7. The terminal k of the trigger T8 is connected to the top of a voltage divider 300, the lower end of which is connected to wire 18. An intermediate point of this voltage divider is connected to the control grid of a power tube P7, which is normally conductive. Each time the contact C1 closes, the trigger T8 switches right and the tube P7 is cut off. Each time C2 closes, at each index point of a machine cycle (Fig. 5b). T8 switches left and tube P7 conducts, causing a negative pulse to be transmitted through wire 301 (Figs. 4b, 4c and 4d), transferred contacts R14c–R14h (Fig. 4d), wires 255 (Figs. 4d and 4e), to the terminals f and g of the left hand triggers of each of the product storage counters 62A–62F. These counters accordingly advance one step for each product readout pulse transmitted from the tube P7. At the end of the multiplying operation the product storage counters had stored in them the number 450522. Accordingly, the counters 62E and 62C will each pass to zero on the fifth product readout pulse at the 5th machine cycle index point. When this occurs their output triggers T18E and T18C switch left. Considering, for example, the effect of the switching of trigger T18C, the potential on the terminal k of this trigger rises and a voltage rise is transmitted through wire 302 and voltage divider 303 to the control grid of a power tube P18C. During a multiplying cycle, when the contacts (Fig. 4e) R14i are normal, the screen grid of this tube is at zero potential, being connected through a resistor 304, wire 305, normal contact R14i to the zero wire 90, and the tube is non-conductive. However, during a product readout cycle the relay contact R14i is transferred (see 4th machine cycle, R14, Fig. 5b) and the screen grid is connected to the B+ wire 92, rendering the tube susceptible to control by voltage changes on its control grid. When the potential on the control grid rises, in the manner described, the tube P18C becomes conductive and a circuit is completed from the zero wire 90 through the tube P18C, a related wire 306 leading from its plate, a plug wire 307, a punch magnet PM3, and wire 308, to the plus wire 36 (Fig. 4a), energizing said magnet. The magnet PM3 is energized at the time when #5 index point of the product card is below the punches 26, consequently, a hole is punched in #5 index point position of the column of the product card pertaining to the hundreds order of the product. In the same way a hole is punched in the #5 index point position of the column of the product field pertaining to the tens of thousands of the product.

In the 4th machine cycle in the second half of the fifth index point position a plus pulse is transmitted on closure of cam contact C5 (Figs. 4b and 5b) from power tube P6 (Fig. 4b) through wire 153 (Figs. 4b, 4c and 4d), transferred contact R14b (Fig. 4d), condenser 289, grid resistor 278, to the control grid of power tube P4, rendering this power tube conductive. A negative pulse is thereby transmitted from the plate resistor 277 of this tube, through wire 276, to the terminals f of all the triggers T18A-T18F. The triggers T18C and T18E are thereby restored to their normal right hand positions. When this occurs the potentials on the control grids of the tubes P18C and P18E are reduced, rendering these tubes non-conductive and deenergizing the punch magnets PM3 and PM5.

In the same way, when #4 index point position is under the punches a hole will be punched in the hundreds of thousands column of the product field, and when index point position 2 is under the punches, holes will be punched in the units and tens columns of the product field. When the zero index point position is under the punches the product counter 62D, which stood at zero at the beginning of the readout operation, will have received ten readout pulses and will have been restored to zero, transferring its output trigger T18D to the left. A hole is accordingly punched in the zero index point position of the thousands column of the product field.

At the one half after 0 point of the fourth machine cycle, the contact PC2 (Fig. 5b) opens, removing bias potential from the cancel bias wire 199' and cancelling all of the trigger circuits in the product storage device.

Second embodiment

The second embodiment of the invention shown in Figs. 7 to 11c is adapted for a higher speed of operation than the first embodiment. The higher speed is achieved primarily by substituting an electronic column shift for the relay column shift of the first embodiment, and by reducing the extent of the secondary cycle from a 30 point primary cycle to 16. The speed of the multiplication is such that cards, punched with a six digit multiplier and six digit multiplicand, can be fed continuously at 100 cards a minute directly from a reading station to a punching station on a 14 point machine cycle, and the product punched back on the same card. The punching section of a high speed reproducer of the type shown in Patent 2,372,909 can be used to handle the cards. For details of construction of this machine, reference may be made to said patent.

Fig. 7 is a semi-diagrammatic vertical section of the punching section of this machine. A stack of cards is held in a card hopper P. These cards are punched with multiplier and multiplicand in different fields. The cards are fed from the bottom of the stack, one at a time, by a card picker 310 operated by a rocking section 311 and passed directly into a pair of feed rolls 312. From the feed rolls the card passes between brushes 313 and a contact roll 314, there being one brush for each column of the card. The card passes on through feed rolls 315 and between a punch guide plate 316 and punch die plate 317, thence through feed rolls 318 and under a guide plate 319 to a stacker 320. In the punch guide plate 316 are mounted a row of punches 321, one punch for each card column. Above the row of punches is a punch operating bar 322 pivoted at 323 and oscillated vertically by an eccentric drive 324. The top of each punch has pivoted to it a latch 325, normally held out of the path of the bar 322 by a related spring 326, but adapted to be rocked into the path of the bar by a call rod 327 pulled to the right by the armature lever 328 of a punch magnet PM.

On moving out of the hopper P, the card depresses card lever PCL1. On moving under the contact roller it rocks a card lever PCL2, closing contact PC2. On approaching the punch die plate, the card rocks a card lever DCL, closing a contact not shown in Fig. 7. The stack of cards in the hopper depresses a hopper lever PHL, closing a contact PHC.

The driving mechanism of the card picker and feed rollers is not shown in Fig. 7 but includes a clutch represented diagrammatically at 329, which is engaged in a manner to be described presently and sets in operation all the card feed mechanism shown in Fig. 7 at once. The card picker operates with a steady reciprocating motion while the feed rollers rotate with an intermittent motion, as described in said Patent 2,372,909. As each index point position of the card comes under the punches, there is a dwell in the card feed. At this time the punch operating bar 322 rocks down and forces through the card any punches whose related punch magnets have been energized.

*Operation.*—The operation of the card feed mechanism will now be described, assuming a single card to be fed, and referring particularly to the wiring diagram (Fig. 9a) and to the machine cycle timing diagram (Figs. 10a, 10b). After the main switch MS has been closed, and voltage extended to wires 340 and 341, when the start key ST is depressed and contact STC closed, a circuit is completed from wire 340, through relays R102 and R101, wire 342, contact STC, wire 343, rectifier 344, to wire 341 energizing said relays. The contact R102a closes, starting the motor M. The contact R101b closes (Fig. 10a), and when cam contact C102 closes a circuit is completed from wire 340, through punch clutch magnet PCM, contact R101b, and contact C102 to wire 343, energizing said magnet. The clutch 329 (Fig. 7) engages and the card feed mechanism begins to operate. At the zero point in the first cycle (see Fig. 10a), the card lever PCL1 is operated, closing contact PC1. The contact PHC was closed from the beginning, due to the presence of the stack of cards in the hopper. Shortly before the end of the first machine cycle, the card lifts the card lever PCL2, closing the contact PC2 (Fig. 10a), completing a circuit from wire 340, through relay R104 and contact PC2 to wire 343, energizing said relay and contacts R104a (Fig. 9b) and R104b (Fig. 9a) close.

Between the 9 and 0 points of the second machine cycle (Fig. 10b) the card is sensed by the brushes 313 and the multiplier and multiplicand are stored, in a manner to be described presently. At the zero point in the second cycle (Fig. 10b), the card lever DCL closes the contact DC1 and relay R103 is energized. Contact R103a closes, completing a holding circuit for relays R101 and R102, through contacts R101a, R103a, PC1, PHC and SPC, to wire 343. This circuit is tested by the opening of contact C101 (Fig. 10b) between the zero and the 12 points of each cycle. In the example given, since only one card is fed, contact PC1 opens at the 12 point in the second cycle (Fig. 10b) and when contact C101 opens at the 0 point in the third cycle the relays R101 and R102 drop out contact R102a opens and the motor M stops.

The electronic circuits are supplied through a cable of four wires, which are again, as in the first embodiment, designated (see Fig. 9a), 92, 90, 78 and 109, respectively. The first three are connected directly to terminals 350, 351, and 352 of a power supply 353, which is identical to the one shown in the first embodiment (Fig. 4a). The cancel bias wire 109 is connected to wire 78 through cam contact C103, which opens shortly after the 14 point (Figs. 10a and 10b) of each machine cycle, to cancel all the triggers, except those of the product accumulator as pointed out later.

*Reading in factors.*—The multiplier storage device consists of a group of electronic counters 360A–360C (Fig. 9c), three being shown as representative. These are scale-of-ten counters identical to those of the first embodiment. The multiplicand storage device is represented by three electronic counters 361A–361C (Fig. 9d) identical to those of the multiplier storage device.

Figure 9B:
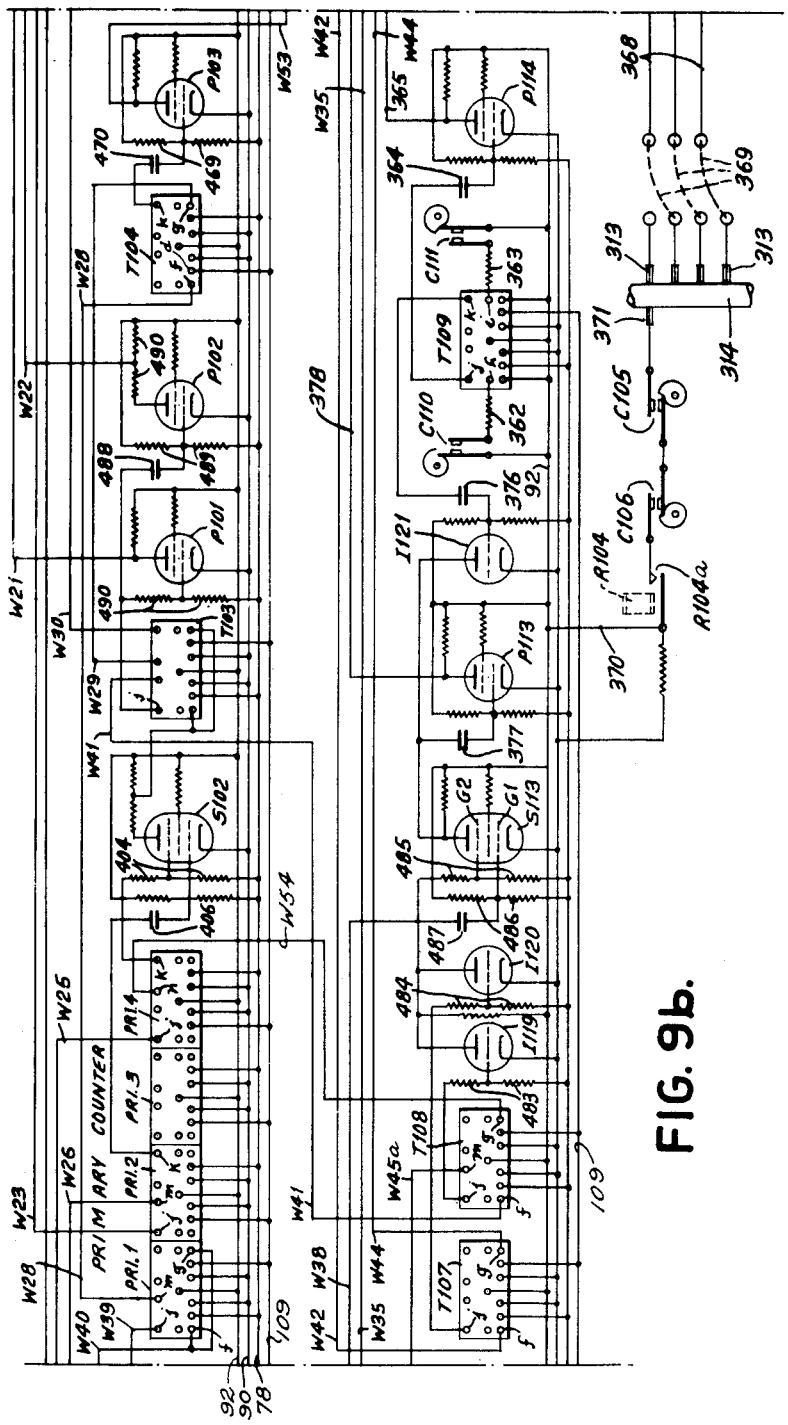

Values are read into these storage devices from the cards in a manner similar to the first embodiment. Readin impulses are supplied from a trigger T109 (Fig. 9b). Reference to Figs. 10a, 10b shows that the contact C110 closes during the last half of each index point position from 9 to 1, while the contact C111 closes in the first half of each point from 8 to 0. When contact C110 closes, the positive wire 92 is connected through said contact and resistance 362 to the terminal h of the trigger T109 which terminal, as shown in Fig. 3, is conductively connected to a control grid, switching this trigger to the left (Figs. 10a and 10b). When the contact C111 closes, the positive wire is connected through said contact and resistance 363 to the terminal i (Figs. 3 and 9b) of the trigger T109, switching the trigger back to the right. This switching of the trigger T109 is used to supply readin pulses for reading the multiplier and multiplicand values into the multiplier storage counters and the multiplicand storage counters respectively.

When the trigger T109 swings left, the potential of the left plate terminal j is depressed and a negative pulse is transmitted through condenser 364 to the control grid of a power tube P114. This tube is normally conducting and the negative pulse biases it off, causing the potential of its plate to rise and transmitting a positive pulse through wire 365 and condenser 365a (Fig. 9c) to control grid G1 of each of the switch tubes S114A–S114C. Normally the potential on the control grids G2 of the tubes S114A–S114C renders the tubes non-responsive to the positive pulses applied to the grids G1. The grids G2 are connected to intermediate points of related voltage dividers 366, the lower ends of which are connected to the wire 78 and the upper ends to the terminals k of respective triggers T110A–T110C, which are normally in the right hand position. The triggers T110A–T110C are switched left at differential times by impulses from the reading brushes. The terminal h of each trigger is connected through a grid resistor 367, a wire 368 (Figs. 9c and 9b), and a plug wire 369 to a related brush 313. When a brush reads a hole in the card a circuit is completed from the wire 92 through wire 370, contact R104a, closed, as previously described whenever a card is passing over the brushes, contacts C106 and C105 in series, which are both closed at the beginning of each index point position from 9 to 1 (Figs. 10a and 10b), common brush 371, contact roll 314, hole in the card, brush 313, plug wire 369, wire 368, resistor 367, to the terminal h (Figs. 3 and 9c) of the related trigger T110A–T110C. The potential on the grid of the left hand tube of the trigger rises and the trigger switches left.

In accordance with the example chosen, the MP 927 times the MC 486, the first two positive pulses from the tube P114 (Fig. 9b) via line 365 and condenser 365a will not change the conductivity of the switch tube S114A controlling the readin to the MP counter 360A because this tube is biased off by the potential applied to its control grid G2. When the 7 hole, in the units position of the multiplier field of the card, feeds under a related brush 313 and when the circuit breakers C105 and C106 are both closed, the previously traced circuit is completed and the trigger T110A is switched left. The potential on its terminal k rises, and the potential on the control grid G2 of the switch tube S114A is lifted. Thereafter, as long as T110A remains switched left the tube is rendered conductive by each pulse applied to its control grid G1 from the power tube P114.

Reference to C110 Fig. 10b, second machine cycle, shows that there will be seven positive pulses transmitted from the power tube P114 after the trigger T110A is switched left at 7. Each time the switching tube S114A is rendered conductive by one of these positive pulses, a negative pulse is transmitted from a point 373 (Fig. 9c) on a voltage divider composed of resistances 374 and 375, to the terminals f and g of the first stage of the units multiplier storage counter 360A. The seven pulses transmitted to this first stage will cause the counter to advance to a state representing the number 7.

In a similar manner, since MP is 927, the tens order multiplier storage counter 360B will be impulsed to represent the number 2, after the related brush reads a 2 hole in the card, while the hundreds order counter will receive all nine pulses from the power tube P114 and will advance to 9.

Each time the trigger T109 (Fig. 9b) switches left, the potential of the right hand plate terminal k rises and a positive pulse is transmitted through condenser 376 to the grid of tube I121 rendering this tube conductive. The potential of the plate of tube I121 is reduced and a negative pulse is transmitted through condenser 377 to the control grid of normally conductive power tube P113. The potential of the plate of this tube rises when the tube is biased off, transmitting a positive pulse through wire 378 (Figs. 9b, 9c and 9d) and condenser 379 to the control grids G1 of the switch tubes S116A–S116C controlling readin to the multiplicand storage counters.

These switch tubes are normally non-responsive to such positive pulses applied to their grids G1, due to the bias potential on their control grids G2. The latter are connected to intermediate points on related voltage dividers 380, the lower ends of which are connected to the wire 78 and the upper ends to terminals k of respective triggers T111A-T111C. These triggers are normally in their right hand positions. The terminals h of each one is connected through a grid resistor 381 and plug wire 382 to a related brush 313. When a brush 313 senses a hole in the MP field of the card, a circuit is completed from wire 92 (Fig. 9b), wire 370, through contacts R104a, C106, and C105, common brush 371, contact roll 314, hole in the card, brush 313 (Fig. 9d), plug wire 382, resistor 381, to the terminal h of the related trigger T111A-T111C. The potential on the latter terminal is lifted and the trigger switches left. When this occurs, the potential on the grid G2 of the related switch tube S116A-S116C rises and the tube becomes responsive to positive pulses applied to its grid G1. Each time the switch tube is made conductive by such a positive pulse, its plate potential drops and a negative pulse is transmitted from a point on its plate resistor 383 to the terminals f and g of the first stage of the related counter 361A-361C of the multiplicand storage device.

In accordance with the chosen example wherein MC is 486, the first three positive pulses applied to the grid G1 of the switch tube S116A will be disregarded. When the units order brush 313 of the multiplicand field reads the 6 hole, the previously traced circuit is completed, which switches the trigger T111A to the left. Thereafter, six positive pulses will be transmitted by the tube S116A to the units order counter which will be advanced to represent the number 6 in the manner previously described. In a similar way the tens order counter will be advanced to represent the number 8 and the hundreds order counter to represent the number 4.

*Pulse generator.*—In the second embodiment pulses for operating the multiplying circuits are generated by a multivibrator MV (Fig. 9a). This comprises a pair of triodes 390 and 391 having their cathodes connected to the wire 90 and their plates connected through plate resistors 393 to a terminal 394. The terminal 394 is connected through a resistor 395 to the B+ wire 92 and through a voltage regulator tube 396 to wire 90. The plates of the tubes 390 and 391 are cross coupled by condensers 397 to the opposite grids, which are connected through rheostats 398 to the wire 78. It is well known that in such a circuit the tubes will become conductive alternately, and that the period of alternation can be controlled by varying the rheostats 398. A frequency of 8000 c. p. s. is suitable for the present purpose, but this can be varied considerably, depending upon the speed of the trigger circuits used.

The plate of the tube 390 is coupled by a condenser 400 to the grid of a pulse shaping tube I101, while the plate of tube 391 is coupled by a condenser 401 to the grid of a pulse shaping tube I102. The tubes I101 and I102 are overdriven to produce, at their plate terminals 402 and 403, squares waves 180° out of phase. The rising side of the waves at terminal 402 will be referred to as A pulses and the rising side of those at 403 as B pulses.

Figure 11A:
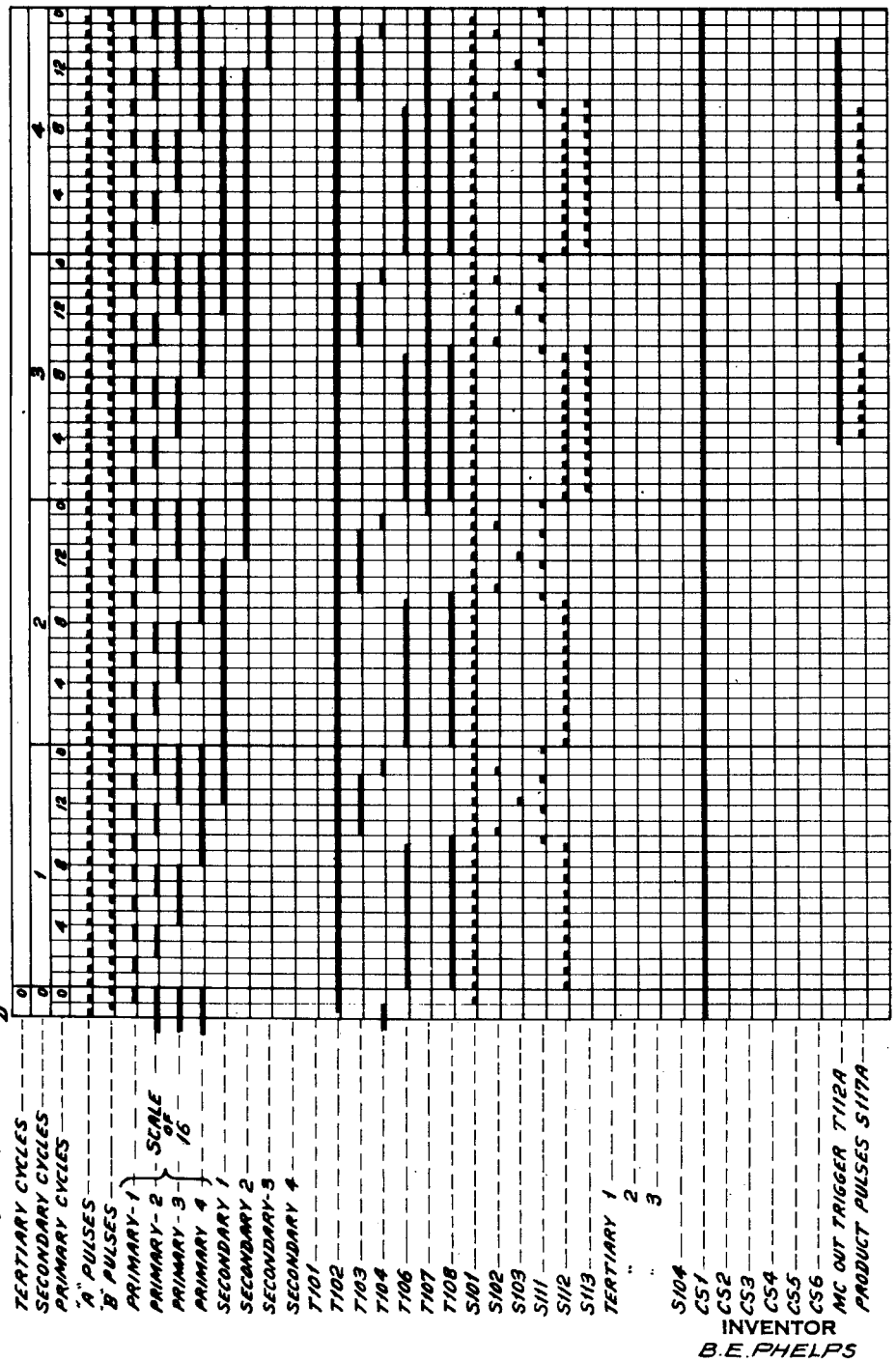

*Electronic timing.*—The timing of the multiplying operation is controlled by a group of three electronic counters shown particularly in Fig. 8. They are identified respectively as the Primary Counter, the Secondary Counter, and the Tertiary Counter. The primary counter counts primary cycles, each consisting of an A pulse and a space. It comprises four standard trigger circuits identified, respectively, as PRI.1, PRI.2, PRI.3 and PRI.4. These trigger circuits are coupled together in a straight binary system to form a scale-of-sixteen counter. They are operated by negative impulses supplied to wire W40 and derived from the A pulses in a manner to be described presently. As shown in Fig. 11a, PRI.1 switches at each input impulse, PRI.2 switches at every second input impulse, PRI.3 switches at every fourth input impulse and PRI.4 switches at every eighth input impulse. Thus, if the counter starts with all four trigger circuits in the right hand position, as represented at 0 of Fig. 11a, fifteen input impulses will advance the counter to fifteen different conditions, and the sixteenth impulse will restore it to the zero condition. This sequence of conditions of the primary counter comprising one complete operation of the primary will be referred to as a one secondary cycle, and the different conditions will be referred to as points in a secondary cycle.

The primary counter trigger circuits are connected to the voltage supply cable in such a way that, when the contact C103 (Fig. 9a) is opened to remove bias potential from the cancel bias wire 109, the primary counter will be restored to the condition in which PRI.1 is switched right, while PRI.2, PRI.3 and PRI.4 are each switched left, as can be seen from the connections in Fig. 8. This is the condition corresponding to the fourteenth point of the secondary cycle (Fig. 11a). Accordingly, when pulses to the primary counter begin, after the contact C103 has been opened as described above and closed again, the primary counter first goes through two changes before reaching the zero point.

The secondary counter is a scale-of-9 counter. It comprises four trigger circuits identified, respectively as SEC. 1, SEC. 2, SEC. 3 and SEC. 4 (Fig. 8). These are coupled to the voltage input cable in such a way that, upon cancellation, all of the trigger circuits of the secondary counter are switched right. Negative pulses are transmitted over wire 405 (Fig. 8) to the secondary counter from a switch tube S103 controlled from the primary counter in a manner which will now be described.

The terminal k of PRI. 4 is coupled by a voltage divider 404 to the grid G2 of a switch tube S102. At point 8 of the secondary cycle PRI. 4 switches left (Fig. 11a), the potential of its terminal k rises, lifting the potential on the control grid G2 of switch tube S102, to render this tube responsive to pulses transmitted to its control grid G1. Such a pulse occurs at the 10 point of the secondary cycle when PRI. 2 swings left, the next time (Fig. 11a). The potential on the terminal k of PRI. 2 rises and a positive pulse is transmitted through condenser 406 to control grid G1 of switch tube S102, rendering this tube conductive. A negative pulse is thereby applied to the terminals f and g of a trigger T103, switching this trigger to the left. The potential on terminal k of trigger 103, T103 rises, lifting the potential of control grid G2 of switch tube S103 and preparing this tube to be rendered conductive by a positive pulse applied to its control grid G1. This positive pulse occurs when PRI. 2 swings right at the 12 point (Fig. 11a), and the potential on its terminal f rises, the positive impulse being transmitted to grid G1 through condenser 407. The tube S103 is rendered conductive by this positive pulse and a negative pulse is transmitted from a point on its plate resistor 408 through wire 405 to the secondary counter. Thus, the secondary counter receives an impulse at the 12 point in each complete operation of the primary. As explained above, the 13th pulse applied to the primary counter switches PRI. 1 left, PRI. 2 remains right, PRI. 3 remains left and PRI. 4 remains left (Fig. 11a). The operation at the 14th and 15th pulses is obvious from Fig. 10a. At the 16th pulse, as stated above, PRI. 1, PRI. 2, PRI. 3 and PRI. 4 are all switched right and the primary stands at 0.

The secondary counter includes a locking tube 409, which is a triode having its plate connected to the terminal *k* of SEC. 1. Its grid is connected through a grid resistor 410 to a point 411 on a voltage divider 412 connected between the terminal *k* of SEC. 4 and the bias wire 78. When SEC. 4 is in its right hand position and the potential on its right hand plate is low, the grid of the locking tube is biased below the cut-off point. In this condition the locking tube is without influence on SEC. 1. When SEC. 4 turns left in response to an impulse from the terminal *n* of SEC. 3, the potential at the terminal *k* of SEC. 4 rises and tends to lift the grid potential of the locking tube. The rise is delayed by a negative pulse transmitted to the point 411 through a small condenser 413 from the terminal *j* of SEC. 4, at which the potential drops when SEC. 4 turns left. The delay prevents the locking tube from interfering with the response of SEC. 1 to the same pulse which switches SEC. 4 to the left.

When SEC. 4 switches right in response to a pulse transmitted from wire 405 through wire 414 to its terminal *f*, the potential on the right hand plate terminal of SEC. 4 drops and tends to depress the potential of the grid of the locking tube below cut-off. At this time potential at the terminal *j* of SEC. 4 rises, transmitted a positive pulse through condenser 413 to the grid of the locking tube, which maintains the locking tube in a conductive condition until after the pulse in wire 405 has stopped. This prevents SEC. 1 from responding to the same pulse which turns SEC. 4 to the right.

The first pulse transmitted from tube S103 at 12 through wire 405 to the secondary counter swings SEC. 1 to the left (Fig. 11a) but has no influence on SEC 4 (Fig. 11a), since it can only turn SEC. 4 to the right and this trigger is already in its right hand position. SEC. 1 is able to respond to this pulse because the locking tube is biased off. The second pulse at 12 swings SEC. 1 to the right (Fig. 11a) and a pulse is transmitted through wire 415 to terminals *f* and *g* of SEC. 2, swinging the latter to the left (Fig. 11a). The third pulse at 12 swings SEC. 1 to the left (Fig. 11a) and the fourth swings it back to the right, switching SEC. 2 to the right and causing a pulse to be transmitted to SEC. 3, which switches to the left (Fig. 11a). The fifth pulse at 12 switches SEC. 1 to the left (Fig. 11b) and the sixth switches it to the right and causes a pulse to be transmitted to SEC. 2, switching the latter to the left (Fig. 11b). The seventh and eighth pulses switch SEC. 1 to the left, then to the right, respectively, and SEC. 2 and SEC. 3 switch back to the right at the eighth pulse (Fig. 11b).

From the terminal *n* of SEC. 3 at said eighth pulse a pulse is transmitted to the terminal *g* of SEC. 4, switching the latter to the left (Fig. 11b). This renders the locking tube conductive which locks SEC. 1 against response to the ninth pulse (Fig. 11b). Accordingly, the ninth pulse, transmitted through wires 405 and 414, only swings SEC. 4 back to the right, restoring the secondary counter to zero condition.

The tertiary counter is a scale-of-6 counter comprising three triggers (Fig. 8), TER. 1, TER. 2 and TER. 3 and a locking tube 415. The locking tube is interposed between TER. 2 and TER. 3 and operates in a manner similar to the locking tube of the secondary counter, except that the voltage divider 416 is connected between the terminal *j* of TER. 3 and the bias wire 78, while the point 417 of the voltage divider is coupled through condenser 418 to the terminal *k* of TER. 3. Due to these connections the locking tube is normally conductive and TER. 2 is locked against response to pulses transmitted from TER. 1. Negative operating pulses are transmitted to the terminals *f* and *g* of TER. 1 through wire 419 from the terminal *n* of SEC. 4 when SEC. 4 switches right. The first such operating pulse at 12 of the primary swings TER. 1 left (Fig. 11b) and the second such pulse at 9 of the secondary swings it right (Fig. 11c). When TER. 1 swings right, a pulse is transmitted through wires 420 and 421 to the terminal *g* of TER. 3, swinging the latter left (Fig. 11c). TER. 2 does not respond because it is locked by the locking tube, when this pulse is transmitted over wire 420 to TER. 2 from TER. 1. However, switching of TER. 3 to the left releases the locking tube, leaving TER. 2 free to respond to the next pulse transmitted over wire 420 when TER. 1 switches right. The third and fourth such negative operating pulses switch TER. 1 to the left and then to the right (Fig. 11c). When TER. 1 switches right, a pulse is transmitted through wire 420 to TER. 2, switching it to the left (Fig. 11c), but this pulse has no influence on TER. 3 which remains switched left. The fifth and sixth such negative operating pulses switch TER. 1 to the left and then to the right respectively and at the sixth a pulse is transmitted to TER. 2, switching it to the right. When TER. 2 swings right a pulse is transmitted through wire 422 to the terminal *f* of TER. 3, switching the latter to the right and restoring the tertiary counter to zero condition on the sixth pulse (Fig. 11c).

The function of the tertiary counter is to control the column shift, as will be seen later. The tertiary counter shown is a scale-of-six because the illustrative machine has a capacity for six digit multipliers (though only three of the multiplier storage counters are shown). In other words, the scale of the tertiary counter will always be equal to the maximum number of multiplier digits.

Product storage

The product storage device comprises a number of scale-of-ten electronic counters 430A–430F (Fig. 9f) identical to the multiplier storage counters. The first stage of each product storage counter is connected by a related wire 431–436 to an electronic column shift device to be described presently. Six product storage counters are shown, a sufficient number to take care of the three orders of multiplier and multiplicant storage devices, but the number may be increased as required.

The product storage counters are connected to a four wire supply cable including a B+ wire 92, a zero wire 90, a bias wire 78, and a cancel bias wire 109'. The latter is connected to the wire 78 by a cam contact C104, which opens after the zero time (Figs. 10a and 10b) in each machine cycle, to cancel the product counters.

Column shift

Figure 9C:
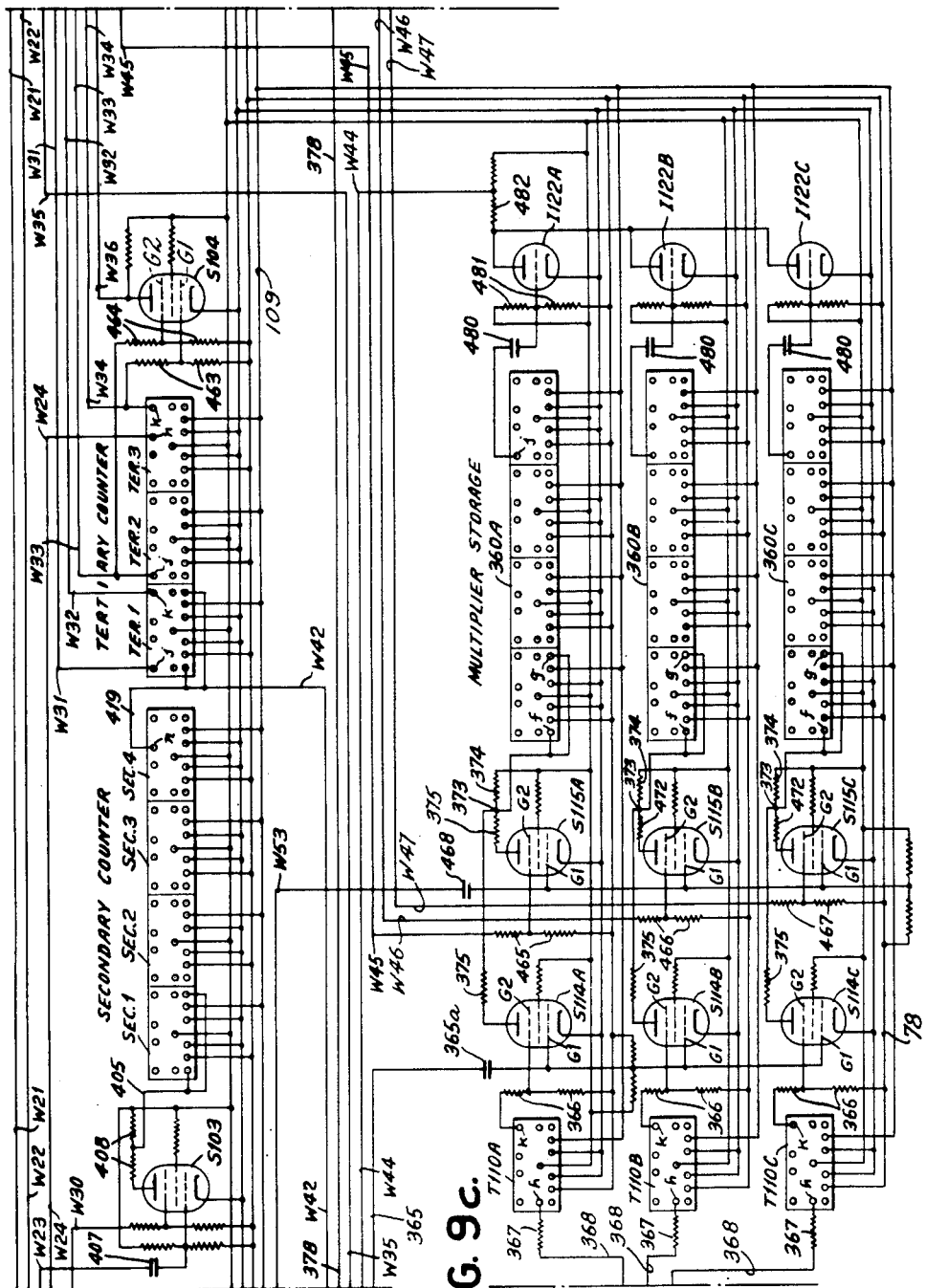
Figure 9E:
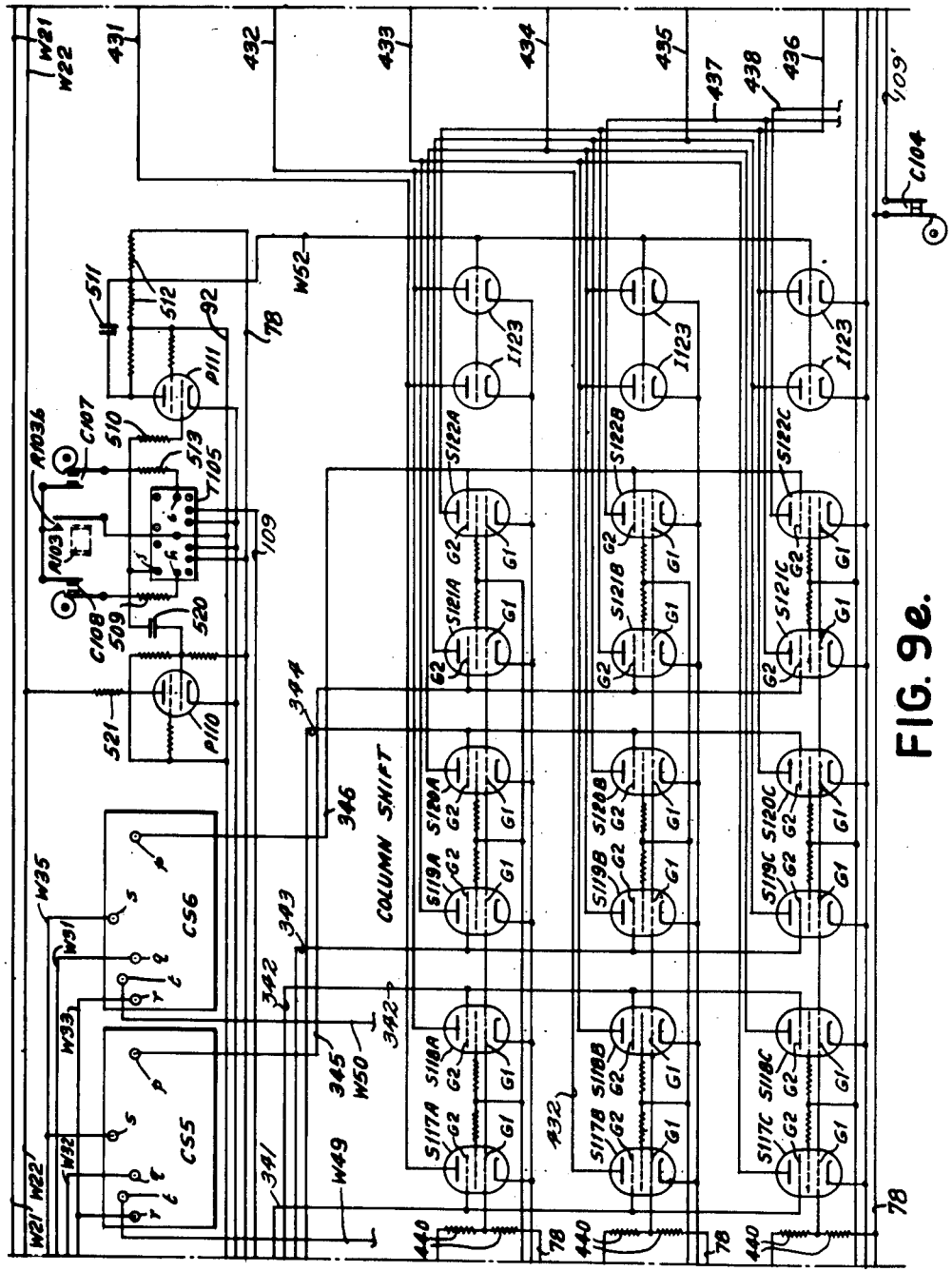

Column shift is controlled by an array of product pulse tubes S117A–S122A, S117B–S122B, S117C–S122C (see Fig. 9e). These tubes are arranged, in the diagram, in three horizontal sets and six vertical groups. The six vertical groups provide for six column shifts, but only three of the six horizontal sets required for this capacity are shown. The six wires 431–436 are connected, respectively, to the plates of the six tubes S117A–S122A. Wire 431 (Figs. 9e and 9f) is connected to wire 92 via a resistor 431a (Fig. 9f). Wire 432 is connected to wire 92 via wire 494 and the right hand resistor 493 and wires 433–436 are similarly connected to wire 92. The five wires 432–436 are also connected, respectively, to the plates of the five tubes S117B–S121B; and the four wires 433–436 are also connected, respectively, to the plates of the four tubes S117C–S120C. There are also shown a wire 437 connected to the plates of the tubes S122B and S121C, and a wire 438 connected to the plate of the tube S122C. These would lead to the 7th and 8th product storage counters, respectively. In other words, the connections of the different sets of column shift tubes are staggered in relation to the counters of the product storage device.

The control grids G1 of all of the product pulse tubes in a single horizontal set are joined together and are connected to an intermediate point of a related voltage divider 440. The lower end of each voltage divider is connected to the wire 78 and the upper end to the terminal $k$ of a related trigger T112A–T112C (Fig. 9d). The triggers are normally in their right hand position and so impose a potential on the grids G1 of the column shift tubes which makes these tubes non-responsive to positive pulses applied to their grids G2. The triggers are switched left at differential times by negative pulses transmitted to their terminals $g$ from the terminals $n$ of the last stages of the respective multiplicand storage counters 361A–361C. These negative pulses occur when the respective multiplicand counters pass to zero.

The control grids G2 of all the column shift tubes in each vertical group are joined together, and the groups are connected by respective wires 341–346 to terminals $p$ of respective column switch circuits CS1–CS6 (Figs. 9d and 9e). These column switch circuits are identical and only the circuit CS1 is shown in detail, the others being represented by rectangles with distinctively located terminals. The terminal $p$ is connected to an intermediate point of a voltage divider 450 extending between wires 92 and 78, its normal potential being such as to render the tubes S117A–S117C, to whose grids G2 it is connected, non-conductive. The terminal $p$ is coupled by a condenser 451 to the plate of a normally conductive power tube P105. The control grid of this power tube is coupled by a voltage divider 452 to the plate of an electronic switch tube S106. The grid G2 of the tube S106 is coupled by a voltage divider 453 to the plates of two triodes I108 and I107. The grids of the triodes are connected to intermediate points of respective voltage dividers 454 and 455, the upper ends of which are connected to respective terminals $q$ and $r$ of the column switch circuit CS1. These tubes I108 and I107 are respectively non-conductive when the triggers of TER. 1 and TER. 3 are switched right. These terminals are connected by the wires W32 and W34 to the terminals $k$ of the triggers TER. 1 and TER. 3 (Fig. 9c) of the tertiary cycle counter. In the normal condition of the tertiary cycle counter the triggers TER. 1 and TER. 3 are in their right hand position (see Figs. 11a, 11b) and the potential on their terminals $k$ is low and the triodes I107 and I108 are both non-conductive as stated above. The potential on the grid G2 of tube S106 is therefore high and this tube is responsive to positive pulses applied to its grid G1. When only one triode is non-conductive, tube S106 is not responsive to such pulses. The grid G1 is connected to an intermediate point of a voltage divider 456 extending between the wires 92 and 78. The normal potential on the grid G1 renders the tube S106 non-conductive. The intermediate point of voltage divider 456 is coupled by a condenser 457 to a terminal $s$. This terminal is connected by a wire W35 to the plate of a power tube P112 (Fig. 9a). The control grid of the tube P112 is connected to an intermediate point of a voltage divider 458 extending between wires 92 and 78 and its potential is normally such as to render the tube conductive. The intermediate point of voltage divider 458 is coupled by a condenser 459 to the plate of an electronic switch tube S112. The grid G2 of the latter is coupled by a voltage divider 460 to the terminal $k$ of a trigger T106. When the trigger T106 is in its right hand position tube S112 is non-conductive. When the trigger switches left the tube S112 is responsive to positive pulses applied to its grid G1. The latter grid is connected to an intermediate point of a voltage divider 461 extending between wires 92 and 78 and its potential is normally such as to render the tube S112 non-conductive. The intermediate point of voltage divider 461 is coupled by a condenser 462 and wire W37 to the A pulse terminal 402.

As shown in Figs. 11a, 11b, trigger T106 is switched left from the zero point to the half after 9 point in each secondary cycle, by means to be described presently. During this time, 10 A pulses are transmitted through tubes S112, P112, and wire W35, to the terminals $s$ of all of the column switch circuits CS1–CS6. Initially, during this same time in the first tertiary cycle, with TER. 3 switched right and TER. 1 switched right (Figs. 11a and 11b) tubes I107 and I108 of CS1 are both non-conductive and only the circuit CS1 is conditioned to transmit the pulses. Through the tubes S106, P105, terminal $p$, and wire 341, 10 A pulses in each secondary cycle are impressed upon the grids G2 of the first vertical group of product pulse tubes S117A–S117C. The numbers of these pulses transmitted by the tubes S117A–S117C to the product storage counters 430A–430C is dependent upon the times of conditioning of the grids G1 of said tubes, as will be described presently.

The column switch circuits are conditioned in succession to transmit A pulses applied to their terminals $s$, the change taking place in response to changes in the condition of the tertiary counter occurring at the 12th point of every 9th secondary cycle. The terminals $r$ and $q$ of CS2 are connected by wires W34 and W31 to the terminals $k$ and $j$ of the triggers TER. 3 and TER. 1 respectively, hence CS2 is exclusively conditioned for transmission when TER. 3 is right and TER. 1 is left. This occurs during the second tertiary cycle (Fig. 11b).

The terminals $r$ of CS3 and CS4 are connected by wire W36 to the plate of an electronic switch tube S104 (Fig. 9c), whose grids G1 and G2 are coupled by voltage dividers 463 and 464, respectively, to the terminals k and j of triggers TER. 3 and TER. 2, respectively. When trigger TER. 3 is left and trigger TER. 2 is right, during both the 3rd and 4th tertiary cycles, tube S104 is conductive and the potential on terminals r of CS3 and CS4 is low, partially conditioning these column switch circuits for transmission. The trigger TER. 1 is used to discriminate between the 3rd and 4th tertiary cycles. The terminals q of CS3 and CS4 (Fig. 9d) are connected by wires W32 and W31 respectively, to the terminals k and j, respectively, of TER. 1 (Fig. 9c). When the latter trigger is right, during the third tertiary cycle (Fig. 11c), CS3 is exclusively conditioned for transmission; when TER. 1 is left, during the fourth tertiary cycle, CS4 is exclusively conditioned for transmission.

The terminals r and q of CS5 (Fig. 9e) are connected by wires W33 and W32, respectively, to terminal j of TER. 2 and k of TER. 1, respectively. Accordingly CS5 is exclusively conditioned for transmission of pulses during the fifth tertiary cycle when TER. 2 is left and TER. 1, is right (Fig. 11c). The terminals r and q of CS6 are connected by wires W33 and W31, respectively, to terminals j of TER. 2 and TER. 1, respectively. Consequently CS6 is exusively conditioned for transmission of pulses during the sixth tertiary cycle when both TER. 2 and TER. 1 are left (Fig. 11c).

As the column switch circuits CS2–CS6 are successively conditioned for transmission, A pulses are passed in succession to the grids G2 of the vertical groups of tubes S118A–S118C, S119A–S119C, etc., during the second, third, etc., tertiary cycles, respectively.

The plates of the tubes I107 and I108 are connected to a terminal t, which is coupled by a wire W45 and voltage divider 465 (Fig. 9c) to the grid G2 of a tube S115A. When the potential at terminal t is high, which occurs only during the first tertiary cycle, the potential on grid G2 of tube S115A is sufficiently high to allow the tube to respond to positive pulses applied to its grid G1. The terminals t of column switch circuits CS2 and CS3 are similarly coupled by wires W46 and W47, and voltage dividers 466 and 467, to the grids G2 of the tubes S115B and S115C, respectively. These tubes are consequently made responsive to pulses applied to their grids G1 during the second and third tertiary cycles, respectively. Wires W48 (Fig. 9d), W49 (Fig. 9c), and W50 (Fig. 9e) would lead to corresponding tubes of the 4th, 5th, and 6th order counters (not shown) of the multiplier storage device. The grids G1 of the tubes S115A–S115C (Fig. 9c) are all joined together and coupled through a condenser 468 and wire W53 to the plate of a power tube P103 (Fig. 9b). The control grid of tube P103 is connected to an intermediate point of a voltage divider 469 extending between wires 92 and 78 and is coupled by a condenser 470 to the terminal k of a trigger T104. As shown in Figs. 11a, 11b trigger T104 switches left at the 14th point and right at the 15th point of each secondary cycle. The tube P103 is normally conductive, but a negative pulse transmitted from the terminal k of trigger T104 when the latter switches right (Figs. 11a–11c) at the 15 point of each secondary cycle, as described presently, renders the tube P103 non-conductive, causing a positive pulse to be transmitted to the grids G1 of the tubes S115A–S115C. Pulses transmitted during the first tertiary cycle render the tube S115A conductive, those during the second tertiary cycle render the tube S115B conductive, etc. Each time one of these tubes becomes conductive a negative pulse is transmitted from the point 373 on its plate resistor 374, 472 to the first stage of the related counter 360A–360C of the multiplier storage device.

The terminal g of trigger T104 is connected by wire W29 to terminal n of trigger T103. It was explained in the description of the cycle counters how the trigger T103 is switched left at the 10 point in each secondary cycle (Figs. 11a–11c) by an impulse from tube S102, the control grids of which are conditioned by the terminals k of PRI.4 and PRI.2. When PRI.2 switches left again at the 14 point, T103 receives another pulse from tube S102, which switches it back to the right (Figs. 11a–11c). The potential at terminal n of trigger T103 drops and a negative pulse is transmitted through wire W29 to the terminal g of trigger T104, switching the latter to the left at 14. At the 15 point PRI.1 switches left and a negative pulse is transmitted from its terminal m through wire W28 to terminal f of T104, switching the latter to the right at the 15 point of each secondary cycle.

*Multiplication*

Multiplication is carried out by the second embodiment in accordance with the same principle followed in the first embodiment. Nine pulses are first applied to the units multiplier counter, which according to the present example in which MP is 927 has stored in it the number 7. The third pulse causes the units counter to pass an output pulse, which it utilizes to turn on a metering device to meter groups of pulses to all of the multiplicand counters. For each pulse applied to the units multiplier counter, except the two preceding the output pulse, ten pulses are applied to the multiplicand counters. Since the units multiplicand counter with MC 486 contains a 6, the fourth pulse of each group of ten applied to the multiplicand counters will cause the units multiplicand counter to pass an output pulse. The latter output pulses are used to turn on a product pulse tube which transmits 6 pulses to the units counter of a product storage device for each group of pulses applied to the multiplicand counter. There will, therefore, be transmitted to the units order of the product storage device seven times six pulses, corresponding to the product of the units digit of the multiplier and the units digit of the multiplicand.

Multiplication is begun, after cancellation of the product storage counters by the opening shortly after 0 (Fig. 10b) of the cam contact C104 (Fig. 9e), by closure of contact C109 (Fig. 9a) shortly after the 11 point (Fig. 10b) in the second machine cycle. At this time the relay R104 (Fig. 9a) is energized since PC2 (Figs. 9a and 10b) is closed and contacts R104b (Fig. 9a) are closed. The closure of contacts C109 switches trigger T102 to the left, since it connects the positive wire 92, through contacts R104b, C109, resistance 475, to the terminal h of trigger T102. The terminal k of this trigger is coupled by a voltage divider 476 to the grid G2 of a switch tube S101. When the trigger T102 switches left, the potential on the grid G2 of tube S101 is raised to a point which renders the tube responsive to positive pulses applied to its grid G1. This grid is connected to an intermediate point of a voltage divider 477 extending between the wires 92 and 78. The intermediate point is coupled by a condenser 478 and wire W27 to the A pulse terminal 402. Each time the tube S101 is rendered conductive by an A pulse, a negative pulse is transmitted from its plate resistor 479 through wire W40 to the terminals f and g of PRI.1 (Fig. 9b). Thus, the A pulses are counted by the primary cycle counter.

As shown in Fig. 10b, the primary cycle counter due to the respective connections of its triggers to the cancel bias line and as previously explained was restored to 14, at a quarter after 14 of the second machine cycle by opening of the contact C103. By the same means the trigger T104 (Fig. 9b) due to connection of its terminal d to the cancel bias line is brought to its left hand position. The first A pulse from tube S101 via wire W40 switches PRI.1 to the left (Fig. 11a), causing a negative pulse to be transmitted from its terminal m through wire W28 to the terminal f of trigger T104, switching the latter to the right. A negative pulse from the terminal k of trigger T104 renders tube P103 non-conductive and causes a positive pulse to be transmitted from its plate through wire W53 (Figs. 9b and 9c) and thence through condenser 468 to the grids G1 of the tubes S115A-S115C. At this time the tertiary cycle counter is in the position it holds through the first tertiary cycle, the column switch circuit (Fig. 9d) is conditioned for transmission, and only the tube S115A is conditioned via W45 to respond to the impulses. A negative pulse is transmitted from its plate resistor to the multiplier counter 360A, advancing the same from 7 to 8 (a 7 had been stored in this counter).

The terminal n of PRI.4 is connected by a wire W54 to the terminal g of trigger T108. When PRI.4 switches right at the 0 point (Fig. 11a) of the first secondary cycle, a negative pulse is transmitted from its terminal n through wire W54 to the terminal g of the trigger T108, switching this trigger to the left. A negative pulse is thereby transmitted from the terminal m of trigger T108, through wire W45a to the terminal g of trigger T106 (Fig. 9a), switching the latter to the left. The potential on terminal k of T106 rises, conditioning the tube S112 for response to A pulses. The A pulses are transmitted from tube S112, in the manner previously described, through power tube P112, wire W35 (Figs. 9a, 9b, 9c, and 9d), to terminal s of column switch circuit CS1 (Fig. 9d), thence through tubes S106 and P105, terminal p and wire 341 to the grids G2 of the group of tubes S117A-S117C. These tubes are not yet conditioned for response to the pulses.

At the half after 9 (Fig. 11a), the trigger T106 (Fig. 9a) is switched back to the right. For this purpose its terminal f is connected to an intermediate point on a plate resistor 500 of a switch tube S111. The grid G2 of this tube is coupled by a voltage divider 501 to the plates of two triodes I117 and I118, which have their grids coupled through voltage dividers 502 and 503 and wires W39 and W25 to the terminals j of PRI.1 and PRI.4 (Fig. 9b), respectively. PRI.4 switches left at the 8 time cutting off the tube I118, and PRI.1 switches left next at the 9 time, cutting off the tube I117. The potential on the grid G2 of tube S111 rises to a point which makes the tube responsive to a positive pulse applied to its grid G1. The latter grid is connected to an intermediate point of a voltage divider 504 and is coupled by a condenser 505 and wire W38 to the B pulse terminal 403. The B pulse in the 9th point of the secondary cycle makes tube S111 conductive (Fig. 11a) and a negative pulse is transmitted at the half after 9 point from its plate resistor 500 to the terminal f of trigger T106, switching the latter to the right and terminating the group of A pulses transmitted through tube S112 (Figs. 11a-11c).

At the 10 point the trigger T108 (Fig. 9b) is switched right by a pulse transmitted to its terminal f through wire W41 from terminal m of trigger T103. The triggers T108 and T106 continue to switch left and right once in each secondary cycle, the trigger T106 metering ten A pulses through the tube S112 and tube P112 in each cycle.

At the 15 point in each secondary cycle the trigger T104 (Fig. 9b) causes a positive pulse to be transmitted from power tube P103 through wire W53 (Figs. 9b and 9c) through the tube S115A to the multiplier counter 360A. As previously described, this counter was advanced from 7 to 8 and as pulses continue to be supplied over wire W53 they advance this counter successively to 9 and 0. When the counter advances to 0, a positive pulse is transmitted from the terminal j of its right hand trigger, through condenser 480 to the grid of a triode I122A. This grid is connected to an intermediate point of a voltage divider 481, extending between the wires 92 and 78, which normally maintains it at a potential rendering the tube I122A non-conductive. The positive pulse transmitted through condenser 480 makes the tube conductive and causes a negative pulse to be transmitted from an intermediate point of its plate resistor 482, through wire W44 (Figs. 9c and 9b) to the terminal g (Fig. 9b) of trigger T107, switching this trigger to the left. The terminals j of triggers T108 and T107, respectively, are coupled by voltage dividers 483 and 484 to the grids of two triodes I119 and I120. The plates of these triodes are coupled by a voltage divider 485 to the control grid G2 of a switch tube S113. When the trigger T107 switches left as MP goes to zero at "15," the triode I120 is biased off when the trigger T108 is thereafter switched left at the zero point of the third secondary cycle the triode I119 is also biased off. The potential on the grid G2 of tube S113 rises, rendering this tube responsive to positive pulses applied to its control grid G1. The latter is connected to an intermediate point on a voltage divider 486 extending between the wires 92 and 78 and is coupled by a condenser 487 and wire W38 to the B pulse terminal 403 (Fig. 9a). Thus, starting with the 0 point of the third secondary cycle (Fig. 11a), negative B pulses are transmitted by tube S113, through condenser 377 to the control grid of power tube P113 and positive B pulses are transmitted from the latter tube through wire 378 (Figs. 9b, 9c and 9d) and condenser 379 (Fig. 9d) to the control grids G1 of the switch tubes S116A-S116C. Negative B pulses are transmitted by these tubes to the respective multiplicand counters 361A-361C. In the third secondary cycle ten B pulses are transmitted to the multiplicand counters, the tenth one occurring at the last half of the ninth point of the cycle (Fig. 11a). At the tenth point of the cycle the trigger T108 switches right, cutting off the switch tube S113.

In the same way in each of the fourth to ninth secondary cycles ten B pulses are metered by the trigger T108 through the tube S113 to the multiplicand storage counters (see Figs. 11a and 11b). Concurrently, ten A pulses are being metered through the tube S112 (Fig. 9a) by the trigger T106 in each secondary cycle (see Figs. 11a, 11b). There is an A pulse following each B pulse, except the last one in each group. The first A pulse is never used.

All of the multiplicand storage counters are made to cycle once in each secondary cycle, beginning with the third in the instant example, by the ten B pulses transmitted to them; that is to say, these counters all pass through zero and back to the settings originally stored in them. The second B pulse causes the counter 361B, which originally was set to 8, to pass to zero. This means that its right hand stage switches to the right and a negative pulse is transmitted from its terminal n to the terminal g of the output trigger T112B, switching the latter to the left. The potential on the grid G1 of the product pulse tube S117B (Fig. 9e), which is at this time receiving A pulses on its grid G2, is lifted to a point which allows the tube S117B to respond to the eight A pulses following the passage of the counter 361B to 0. These eight A pulses are transmitted from the tube S117B through the wire 432 to the product storage counter 430B (Fig. 9f).

The fourth B pulse transmitted to the multiplicand storage counters causes the counter 361A (Fig. 9d) to pass to zero. The related output trigger T112A switches left and the tube S117A (Fig. 9e) is conditioned for transmission of the remaining six A pulses through wire 431 to the product storage counter 430A (Fig. 9f). Similarly, the multiplicand counter 361C passes to zero in response to the sixth B pulse, switching its output trigger T112C and conditioning the tube S117C to transmit the remaining four A pulses through wire 433 to the product storage counter 430C.

At the 14 point in the third secondary cycle (Fig. 11a), the trigger T103 (Fig. 9b) switches right. The terminal j of this trigger is coupled through a condenser 488 to the control grid of a power tube P102, which control grid is connected to an intermediate point of a voltage divider 489 extending between the wires 92 and 78 and is normally at a potential which cuts off the tube P102. When the trigger T103 so switches right, a positive pulse is transmitted to the control grid of tube P102 which is rendered conductive, causing a negative pulse to be transmitted from its plate resistor 490, through wires W22 (Figs. 9b, 9c, 9d) and W51 (Fig. 9d) to the terminals f of all of the multiplicand output triggers T112A–T112C. This pulse at the 14 time in each secondary cycle restores the triggers to their normal right hand position and conditions the related product pulse tubes S117A–S117C (Fig. 9e) to be non-responsive to A pulses applied to their grids G2.

In each secondary cycle from the third to the ninth, the multiplicand output triggers T112A–T112C are switched left at the respective differential times 4, 2, 6 and their related product pulse switch tubes S117A–S117C are respectively conditioned to transmit 6, 8, and 4 A pulses to the product storage counters 430A, 430B and 430C. In Figs. 11a, 11b the line "Product pulses S117A" shows the A pulses fed to the product counter 430A. At the 10 time in the ninth secondary cycle the number 486 has been added in the first three product storage counters seven times.

*Carry.*—In the 4th secondary cycle (Fig. 11a) of the first tertiary cycle six more pulses were added in the product counter 430A, causing it to pass through zero to 2. When it passes to zero its right hand stage switches right and a negative pulse is transmitted from from its terminal n to the terminal g of a carry trigger T113A, switching the latter to the left. The terminal k of this trigger is coupled by a voltage divider 491 to the grid G2 of a carry operate tube S123A. When the trigger T113A switches left it conditions the tube S123A to respond to a positive pulse applied to its grid G1. The latter grid is coupled by a voltage divider 492 and wire W21 (Figs. 9f, 9e, 9d, 9c and 9b) to the plate of a power tube P101 (Fig. 9b). The control grid of this tube is coupled by a resistor 490 to the terminal j of trigger T103. When the latter switches left at the 10 point in the fourth secondary cycle (Fig. 11a) the tube P101, which had been conductive, is cut off. The potential on its plate rises and this rise is imparted through wire W21 and voltage divider 492 to the grid G1 of tube S123A. The tube S123A becomes conductive and a negative pulse is transmitted from its plate resistor 493 through wire 494 to the terminals f and g of the left hand trigger of the counter 430B, adding one to this counter. Trigger T113A is switched right, if required, via line W22 (Figs. 9f–9b), tube P102 and trigger T103 which trips right at 14. When trigger T103 so switches right at 14, it also renders tube P101 conductive to reduce the voltage on wire W21 and the grid G1 of tube S123A.

The same carry means are provided for each order of the product storage device and the grids G1 of all of the tubes S123A–S123E are coupled to the wire W21 so that carries take place simultaneously from all orders in which the carry triggers have been tripped.

*Carry on carry.*—If a carry from the third order causes the fourth order counter to pass to zero, the carry trigger T113D is tripped and since all grids G1 are raised in voltage until 14 causes an output from the carry operate tube S123D. In this way carries may ripple through the whole product storage device.

At the 12 time in the ninth secondary cycle (Fig. 11b) of the first tertiary cycle, the secondary cycle counter (Fig. 9c) transmits an impulse from the terminal n of its trigger SEC. 4 when it switches right (Fig. 11b) through wire 419 to the tertiary cycle counter, advancing the latter by 1 and switching off the column switch circuit CS1 as it switches on the circuit CS2. The output impulse from the secondary counter also passes from wire 419, through wire W42 (Figs. 9c and 9b) to the terminal f of trigger T107 (Fig. 9b), switching the latter to the right. This causes the tube I120 to become conductive and the potential on the grid G2 of the tube S113 is held down below cut-off, terminating the transmission of B pulses through tube S113.

At the 15 time in the ninth secondary cycle (Fig. 11b) of the first tertiary cycle, the trigger T104 (Fig. 9b) switches right under control of PR11 (Fig. 11b) and causes an output pulse to be transmitted from the plate of power tube P103, through wire W53 (Figs. 9b and 9c) and condenser 468 (Fig. 9c) to the grids G1 of the tubes S115A–S115C. At this time the tube S115B is the only one conditioned via CS2 and W46 to transmit the pulse to its counter 360B because the column switch circuit CS2 (Fig. 9d) is conditioned for transmission, the potential at its terminal t is high and this high potential is imparted through wire W46 (Figs. 9d and 9c) and voltage divider 466 to the grid G2 of tube S115B. The successive pulses at the 15 time in each secondary cycle of the second tertiary cycle advance the counter 360B to zero just before the eighth secondary cycle.

Meanwhile, the trigger T106 (Fig. 9a) has been metering ten A pulses through the switch tube S112 and power tube P112, wire W35 (Figs. 9a–9d), column switch circuit CS2, terminal p of the latter, and wire 342 (Figs. 9d and 9e), to the grids G2 of the product pulse switch tubes S118A–S118C. Initially, the latter tubes are switched off by the potential on their control grids G1.

When the multiplier storage counter 360B (Fig. 9c) passes to zero, a negative pulse is transmitted from the related output triode I122B, the plate resistor 482, wire W44 (Figs. 9c and 9b) to the terminal g of trigger T107 (Fig. 9b), switching the latter to the left. When the terminal g of trigger T108 receives a negative pulse from the terminal n of PRI.4 at zero of the eighth secondary cycle of the second tertiary cycle, the trigger T108 is switched left and the tube S113 (Fig. 9b) is conditioned to transmit B pulses through the power tube P113, wire 378 (Figs. 9b–9d), and condenser 379 to the grids G1 of the tubes S116A–S116C. Ten B pulses are metered into the multiplicand storage counters 361A–361C in each of the eighth and ninth secondary cycles of the second tertiary cycle, causing these counters to cycle twice. Their output triggers T112A–T112C are switched left at the 4, 2 and 6 differential times, respectively, in each secondary cycle, conditioning the product pulse tubes S118A–S118C (Fig. 9e) to transmit six, eight and four A pulses, respectively, through the wires 432, 433, and 434 to the product storage counters 430B–430D, respectively. Thus, the number 486 is added twice in the counters 430B, 430C and 430D in the second tertiary cycle.

At the 12 time in the ninth secondary cycle of the second tertiary cycle, the column switch circuit CS2 is switched off and the circuit CS3 (Fig. 9d) is switched on. The potential at the terminal t of CS3 rises and this rise is transmitted through wire W47 (Figs. 9d and 9c) to the grid G2 of the tube S115C (Fig. 9c), conditioning the latter to respond to pulses applied to its grid G1. The pulse transmitted from tube P103, through wire W53, and condenser 468 to the grid G1 of tube S115C at the 15 time in the ninth secondary cycle of the second tertiary cycle causes a pulse to be transmitted from the plate resistor of the tube S115C to the multiplier counter 360C. Since the latter was set to 9, this first pulse drives the counter to zero. An output pulse from the related tube I122C is transmitted from the plate resistor 482, through wire W44 (Figs. 9c and 9b) to the terminal g of trigger T107, switching the latter to the left in time to allow the trigger T108 to meter groups of B pulses to the multiplicand storage counters in each of the nine secondary cycles of the third tertiary cycle.

During this time groups of A (Fig. 9a), through metered by the trigger T106 (Fig. 9a), through the column switch circuit CS3 and wire 343 (Fig. 9e) to the grids G2 of the third group of product pulse switch tubes S119A–S119C. The transmission of A pulses through these tubes to the product counters 430C–430E is controlled by the differentially timed output pulses from the multiplicand storage counters, in the same manner as previously described. Accordingly, the number 486 is added nine times in the counters 430C–430E.

At the end of each tertiary cycle thereafter, there is a column shift, under control of the tertiary cycle counter. While the column switch circuits for three more column shifts are shown, the multiplier and multiplicand storage devices for these are not illustrated. If they had zeros stored in them in accordance with the example, there would be no output from the successive multiplier storage counters and no B pulses transmitted to the multiplicand storage counters, hence no further product pulses transmitted to the product storage devices.

The multiplication is terminated at the end of the sixth tertiary cycle. At the 12 time in the ninth secondary cycle of the sixth tertiary cycle (Fig. 11c), the trigger TER. 3 (Fig. 9c) of the tertiary cycle counter switches right (Figs. 11c) and a negative pulse is transmitted from its terminal n through wire W24 to the terminal g of a trigger T101 (Fig. 9a), switching this trigger left. At the next 14 time PRI. 2 (Fig. 9b) of the primary counter switches left and a negative pulse is transmitted from its terminal m through wire W26 to terminal f of trigger T101, switching the latter right. From terminal n of trigger T101, a negative pulse is transmitted to terminal f of trigger T102, switching the latter to the right. This cuts off the tube S101 and terminates the supply of A pulses to the primary cycle counter.

The multiplication will be completed sometime before the 14 point of the third machine cycle (see Fig. 10b). Shortly after the 14 point of this cycle, the cam contact C103 opens (Fig. 10b) canceling all of the triggers except those in the product storage device.

*Punching the product.*—At the 9 point of the third machine cycle, the reading in of the second card and the punching of the product in the first card proceed concurrently. For the latter purpose there is provided an impulsing device shown in Fig. 9e, comprising a trigger T105 and switching cam contacts therefor, C107 and C108. This impulsing device is identical to the one controlled by the trigger T109 (Fig. 9b) from which the readin impulses are derived. The contact R103b (see DC1. Figs. 9a and 10b energizing R103) is closed at this time. The cam contacts C108 and C107 close alternately, in each point of the machine cycle from 9 to 0, the contact C108 closing at the beginning of the cycle point (Fig. 10b) and the contact C107 closing in the last half of the cycle point. When the contact C108 closes, and since R103b is closed positive voltage is extended from wire 92 through contacts R103b and C108 and grid resistor 509 to terminal h of trigger T105, switching the latter to the left. The terminal j of trigger T105 is connected through a grid resistor 510 to the control grid of a normally conductive power tube P111. When the trigger T105 switches left the potential on the terminal j is depressed and switches off the power tube P111. A negative pulse is transmitted from the plate of this tube, through a condenser 511 and wire W52 to all of the grids of a group of six triodes I123. The plate of the left hand tube I123 of the top pair is connected via wire 431 (Figs. 9e and 9f) and resistor 431a to wire 92. The plate of the right hand tube I123 of the top pair is connected via wire 432 (Figs. 9e and 9f), wire 494 and the right hand resistor 493 to wire 92 and the plate of the remaining tubes I123 are connected similarly to wire 92 via their respective lines 433–436, respectively. The plates of these triodes are connected to the wires 431–436, respectively, pertaining to the six orders of the product storage device shown in the drawing. For the six orders not shown, there will be six additional triodes, all having their grids connected to the wire W52. The wire W52 is connected to an intermediate point of a voltage divider 512 extending between the wires 92 and 78 and its potential is normally such as to render the tubes I123 non-conductive. When trigger T105 switches left, as described above, the positive pulse transmitted through the wire W52 to the grids of the tubes I123 renders these tubes conductive, depressing the potential on their plates and causing a negative pulse to be transmitted through each of the wires 431-436.

When the cam contact C107 closes, a positive potential is applied from wire 92, through contacts R103b and C107 and grid resistor 513 to the terminal i of trigger T105, switching the trigger to the right. With the next closure of contact C108, another negative pulse is transmitted to all of the counters of the product storage device. These counters are accordingly stepped forward from the positions which they had at the end of multiplication and will pass to zero at differential times, depending upon the different values stored in them. The product of the particular problem chosen is 450,522. Accordingly, since each of the counters 430C and 430E stands at 5 each will pass to zero in response to the fifth pulse transmitted to the product storage counters, switching their carry triggers T113C and T113E to the left.

The terminals k of each of the carry triggers is coupled by a voltage divider 514 to the control grid of a related power tube P115A-P115F. The screen grids of these tubes are connected through grid resistors 515 to a wire 516 connected to the upper end of a resistor 517 whose lower end is connected to the wire 90. By this means the voltage on the screen grids of the tubes P115A-P115F is normally maintained at cathode potential, so the tubes will not respond to any rise in potential of their control grids. During the product readout time, however, a cam contact C112 (see Figs. 10a, b) connects the upper end of the resistor 517 to the wire 92, lifting the potential on the screen grids of the tubes P115A-P115F so that they become responsive to any rise in potential imparted to their control grids.

At the 5 point in the third machine cycle, when the triggers T113C and T113E switch left, in the manner just described, the potentials of the control grids of the related tubes P115C and P115E are raised to a point which renders these tubes conductive, completing a circuit from wire 92, through respective punch magnets PM3 and PM5, plug wires 518, tubes P115C and P115E, to wire 90, energizing said punch magnets. This occurs at the time when the index point position 5 of the card is under the punches and holes are accordingly punched in the index point position 5 of the hundreds and tens of thousands columns of the product field.

Each time the trigger T105 (Fig. 9e) is switched right, upon closure of contacts C107, a positive pulse is transmitted from its terminal j, through condenser 520 to the control grid of a normally non-conductive power tube P110. The tube is rendered conductive and its plate potential is depressed, transmitting a negative pulse through plate resistor 521 and wire W22 (Figs. 9e and 9f) to the terminals f of all of the carry triggers T113A-T113F. Thus, any carry trigger which had been switched left by an output pulse from the related product counter is restored to its right hand position during the same cycle point. In the present example in the latter half of the fifth cycle point, the carry triggers T113C and T113E are restored, depressing the potential on the control grids of the related power tubes P115C and P115E, rendering these tubes non-conductive. The corresponding punch magnets PM3 and PM5 are consequently deenergized before the end of cycle point 5.

After the zero cycle point, contact C104 (Fig. 10b) opens, cancelling all the triggers of the product storage device, in preparation for the next multiplication which begins with the closure of contact C109 (Fig. 10b) after cycle point 11.

While there have been shown and described and pointed out the fundamental novel features of the invention as applied to preferred embodiments, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a calculating device, a source of electrical impulses, an impulse operated electronic counter constituting a cycle counter, means including normally inoperative switching means for transmitting impulses from said source to said cycle counter, means for rendering said switching means operative, means controlled by said cycle counter for rendering said switching means inoperative when a given number of impulses have been counted by said cycle counter, a factor storage device and a multiordered result storage device, carry means for said multiordered device each of said devices comprising an impulse operated electronic circuit, means for transmitting impulses from said source to each of said devices, and metering means controlled jointly by said cycle counter and said factor storage device for metering impulses through said transmitting means to said result storage device.

2. In a calculating device for calculation according to a system of notation using a chosen commercial base number, a cyclically operable factor storage device operable by steps in response to electrical impulses and adapted to go through a complete cycle in response to a number of impulses equal to said base number, means to set said factor storage device to a step corresponding to a selected factor for calculation, a source of impulses, means to transmit from said source to said factor storage device a given number of groups of impulses, each group being composed of a number of impulses equal to said base number, whereby said factor storage device is made to cycle in steps a number of times equal to said given number, a multiordered result storage device operable by electrical impulses, carry means for said multiordered device, means including a pulse transmission control device for transmitting impulses from said source to said result storage device during each cycle of said factor storage device, and means operated by said factor storage device, on passing to a certain step, for controlling said control device to limit to the value of the selected factor, the number of said last mentioned impulses to be admitted into said result storage device during each cycle of said factor storage device.

3. In a calculating device for calculation according to a decimal system of notation, a factor storage device comprising an electronic counter adapted to change its condition by steps in response to electrical impulses applied thereto and to go through a complete cycle of steps from zero to zero, in response to ten impulses, means to set said selected factor storage device to a step corresponding to a factor for calculation, a source of impulses, means for transmitting to said factor storage device from said source a given number of groups of impulses, each group being composed of ten impulses, whereby said factor storage device is made to cycle in steps a number of times equal to said given number, a multiordered result storage device each order comprising an electrical impulse operated electronic counter, carry means for said multiordered device, means including a pulse transmission control device for transmitting impulses from said source to said result storage device during each cycle of said factor storage device, and means operated by said factor storage device, each time it passes to zero, for regulating said control means to limit to the value of the selected factor, the number of impulses to be admitted into said result storage device during each cycle of said storage device.

4. In a device for multiplying factors according to a decimal system of notation, a multiplicand storage device comprising an electronic counter adapted to change its condition by steps in response to electrical impulses applied thereto and to go through a complete cycle of steps, from zero to zero, in response to ten impulses, means to set said multiplicand storage device to a step corresponding to a multiplicand factor, a multiplier storage device, means to set said multiplier storage device according to a multiplier factor, a source of electrical impulses, means controlled by said multiplier storage device for transmitting from said source to said multiplicand storage device a number of groups of impulses equal to said multiplier factor, each group including ten impulses, whereby said multiplicand storage device is made to cycle a number of times equal to said multiplier factor, a multiordered product storage device each order comprising an electrical impulse operated electronic counter, carry means for said product storage device, means including a pulse transmission control device for transmitting impulses from said source to said product storage device during each cycle of said multiplicand storage device, and means operated by said multiplicand storage device on passing to zero for regulating said control device to limit to the value of the multiplicand, the number of impulses to be admitted into said product storage device during each cycle of said multiplicand storage device.

5. In a multiplying device, a multiordered product storage device, carry means for said device, a multiplicand storage device, and a multiplier storage device, each of said devices comprising an electrical impulse operated electronic counter; means to impulse said multiplicand and multiplier storage devices to initially adjust their electrical conditions to represent multiplicand and multiplier factors, respectively; a source of electrical impulses, an electronic timer, impulse control means controlled jointly by said timer and by the adjusted electrical condition of said multiplier storage device, for transmitting multiplicand readout impulses from said source to said multiplicand storage device to further adjust the electrical condition of said multiplicand storage device in accordance with the value of said multiplier factor, and means controlled by said multiplicand storage device during said further adjustment to transmit to said product storage device a number of impulses proportional to the product of the factors initially stored in said multiplier and multiplicand storage devices.

6. In a multiplying device, a multiordered product storage device, carry means for said device, a multiplicand storage device, and a multiplier storage device, each of said devices comprising an electrical impulse operated electronic counter; means for setting said multiplicand and multiplier storage devices to represent multiplicand and multiplier factors, respectively; a source of electrical impulses, an electronic timer, means for transmitting electrical impulses to said product storage device, means for transmitting electrical impulses to said multiplicand storage device, means for transmitting electrical impulses to said multiplier storage device, means controlled by said timer for determining the maximum number of impulses which can be transmitted to said multiplicand storage device, and to said multiplier storage device, in the multiplication of two factors, means controlled by said multiplier storage device for reducing the number of impulses transmitted to said multiplicand storage device in proportion to the complement of the number stored in said multiplier storage device, and means controlled by said multiplicand storage device upon actuation by the reduced number of pulses transmitted thereto for transmitting to said product storage device a number of impulses equal in number to the impulses transmitted to said multiplicand storage device reduced in proportion to the complement of the number stored in said multiplicand storage device.

7. In a multiplying device for multiplication according to a system of notation using a certain base number, a multiordered product storage device, carry means for said device, a multiplicand storage device, and a multiplier storage device, said devices comprising electrical impulse operated electronic counters consisting of a sequence of electrical circuits including electronic tubes, said circuits being adapted to change from one stable state to another in sequence, in response to electrical impulses applied thereto, and to go through a complete cycle, from a counter state representative of zero to the same state representative of zero, in response to a number of impulses equal to said base number; means for setting said multiplicand and multiplier storage devices to represent multiplicand and multiplier factors, respectively; a source of electrical impulses, an electronic timer, means controlled by said timer for transmitting impulses to said multiplier storage device, means controlled by said timer for metering groups of impulses from said source to said multiplicand storage device, the number in each group being equal to said base number; means controlled by said multiplier storage device for limiting the number of groups of impulses metered to said multiplicand storage device to a number equal to the digit stored in said multiplier storage device, and means controlled by said multiplicand storage device for blocking transmission of impulses to said product storage device during secondary cycles when said multiplicand storage device is not receiving impulses, and for limiting the number of impulses in each group transmitted to said product storage device to the number equal to the value of the digit stored in said multiplicand storage device.

8. In a calculating device for calculation according to a system of notation using a certain base number, a factor storage device comprising an electronic counter adapted to operate by steps in response to electrical impulses and to go through a complete cycle of steps in response to a number of impulses equal to said base number, means for setting said factor storage device to a number constituting a factor for calculation, a multiordered result storage device, each order comprising an electrical impulse operated device, carry means for said multiordered device, normally non-conducting input switch means controlling the admission of impulses to said result storage device, a source of electrical impulses, means for transmitting groups of readout impulses from said source to said factor storage device, each group composed of a number of impulses equal to said base number, means for transmitting from said source to said input switch means impulses alternately interspersed with said readout impulses, means controlled by said factor storage device, each time it passes to a certain step, for rendering said input switch means conductive, and means to render said input switch means conductive after each group of readout impulses.

9. In a multiplying device for multiplication according to a system of notation using a certain base number, a multiordered product storage device, carry means for said device, a multiplicand storage device, and a multiplier storage device, each of said devices comprising an electrical impulse operated electronic circuit, said multiplicand storage device being adapted to go through a complete cycle of steps from zero to zero in response to a number of impulses equal to said base number; means for setting said multiplicand and multiplier storage devices to represent multiplicand and multiplier factors, respectively; normally inoperative product impulse switch means for controlling the input of impulses to said product storage device, means for transmitting a definite sequence of multiplier readout impulses to said multiplier storage device, a normally ineffective metering device adapted, when rendered effective, to transmit a group of multiplicand readout impulses to said multiplicand storage device after each multiplier readout impulse, each group containing a number of impulses equal to said base number, means for transmitting a product readin impulse to said product impulse switch means after each multiplicand readout impulse except the last one in each group, means controlled by said multiplier storage device, on passing to zero, for rendering said metering device effective, means controlled by said multiplicand storage device, each time it passes to zero, for rendering operative said product impulse switch, so that the following product readin impulses in each group will be transmitted to said product storage device, means for rendering inoperative said product input switch between groups of multiplicand readout impulses, and means for stopping said metering device at the end of said sequence of multiplier readout impulses.

10. In a multiplying device for multiplication according to a system of notation using a certain base number, a multiplier storage device, a multiplicand storage device and a product storage device, each of said devices being composed of a plurality of electronic counters constituting different orders, said counters comprising a sequence of electrical circuits including electronic tubes, said circuits being adapted to change from one stable state to another in sequence, in response to electrical impulses applied thereto, and to go through a complete cycle, from a counter state representative of zero to the same state representative of zero, in response to a number of impulses equal to said base number, said product storage device including carry means interposed between its different counters; means for setting the counters of said multiplier and multiplicand storage devices to represent multiplier and multiplicand factors, respectively; a source of impulses, an impulse operated electronic cycle counter, means for transmitting impulses from said source to said cycle counter; metering means adapted, when conditioned for transmission, to transmit groups of multiplicand readout impulses from said source to all of the counters of said multiplicand storage device simultaneously, each group composed of a number of impulses equal to said base number; product impulse control means including individual switch devices controlled by the respective multiplicand counters; means for transmitting a product readin impulse to each of said switch devices after each multiplicand readout impulse, except the last one in each group; column shift means operated by said cycle counter for variably connecting said switch devices with different counters of said product accumulator; a multiplier readout impulse conductor, means operated by said cycle counter for applying a sequence of multiplier readout impulses to said multiplier readout impulse conductor in the interval preceding each column shift operation, selective means for selectively transmitting impulses from said multiplier readout impulse conductor to any counter of said multiplier storage device, said selective means being operated by said cycle counter each time said column shift means is operated, to cause said multiplier readout impulses to be transmitted to a different counter of said multiplier storage device; means operated by each counter of said multiplier storage device, on passing to zero, for conditioning said metering device for transmission, means for conditioning said metering device for non-transmission at each column shift operation; means controlled by each counter of said multiplicand storage device, on passing to zero, for opening the related switch device, and means for closing said switch devices after each group of multiplicand readout impulses.

11. In a multiplying device for multiplication according to a system of notation using a certain base number, a multiplier storage device, a multiplicand storage device and a product storage device, each of said devices being composed of a plurality of electronic counters constituting different orders, said counters comprising electrical circuits including electronic tubes, said circuits being adapted to change from one stable state to another in sequence, in response to electrical impulses applied thereto, and to go through a complete cycle, from a counter state representative of zero to the same state representative of zero, in response to a number of impulses equal to said base number, said product storage device including carry means interposed between its different counters; means for setting the counters of said multiplier and multiplicand storage devices to represent multiplier and multiplicand factors, respectively; a source of impulses, an impulse operated electronic cycle counter, means for transmitting impulses from said source to said cycle counter; metering means adapted, when conditioned for transmission, to transmit groups of multiplicand readout impulses from said source to all of the counters of said multiplicand storage device simultaneously, each group composed of a number of impulses equal to said base number; product impulse control means including individual switch devices controlled by the respective multiplicand counters; means for transmitting a product readin impulse to each of said switch devices, each switch device comprising a set of electronic tubes, each set including a number of tubes equal to the number of counters of said multiplier storage device, each tube having a plate, a conditioning control grid, and an impulsing control grid, the plates in each set being respectively connected to different counters of said product storage device and the connections of the plates in the different sets being staggered in relation to the different counters of said product storage device, the conditioning control grid of each tube being connected to the conditioning control grids of all tubes in the same set, and the impulsing control grid of each tube being connected to the impulsing control grid of one tube in each other set to form a group, said product readin impulse transmitting means including a plurality of column switching circuits each comprising a network including electronic tubes so connected to said electronic cycle counter that said column switching circuits are conditioned in sequence for transmission of impulses, each column switching circuit having an output terminal connected to a related group of impulsing control grids of said switch device tubes; a multiplier readout impulse conductor, means operated by said cycle counter for applying a sequence of multiplier readout impulses to said multiplier readout impulse conductor, selective means controlled by said column switching means for selectively transmitting impulses from said multiplier readout impulse conductor to the different counters of said multiplier storage device; means operated by each counter of said multiplier storage device on passing to zero for conditioning said metering device for transmission, means for conditioning said metering device for non-transmission at each sequential conditioning of said column switching circuits; each set of conditioning control grids of said switch device tubes being connected to the related multiplicand counter so that, when the latter passes to zero, the related set of tubes are conditioned for the transmission of impulses, and means for conditioning all of said switch device tubes for non-transmission of impulses after each group of multiplicand readout impulses.

12. In calculating device for calculations involving columnshift, a result storage device and first and second factor storage devices, each of said devices comprising a plurality of electronic counters constituting different orders, said result storage device including carry means interposed between its orders, each of said electronic counters being adapted to be operated by electrical impulses; a source of impulses, an impulse operated electronic cycle counter, means for transmitting impulses from said source to said cycle counter, said cycle counter being adapted to count primary cycles, each consisting of a pulse and a space, secondary cycles, each consisting of a given number of primary cycles, and tertiary cycles, each consisting of a given number of secondary cycles; means including column shift means for transmitting groups of impulses from said source to said result storage counters, means controlled by said cycle counter for operating said column shift means once every tertiary cycle; metering means controlled by said cycle counter adapted, when conditioned for transmission, to transmit groups of impulses from said source concurrently to all of the counters of said first factor storage device during each secondary cycle; means controlled by said cycle counter for transmitting readout impulses to the counters of said second factor storage device, at the rate of one for each secondary cycle, means controlled by said cycle counter for directing said readout impulses to a different counter of said second factor storage device during each tertiary cycle, means operated by the different counters of said second factor storage device for conditioning said metering means for transmission during differential times, to determine the number of groups of impulses to be transmitted to the counters of said first factor storage device and the number of groups of impulses to be transmitted to the counters of said result storage device, and means operated by the individual counters of said first factor storage device for determining the different numbers of impulses to be transmitted in each group to the counters of said result storage device.

13. In a calculating device for calculations involving column shift, a result storage device comprising a plurality of impulse operated electronic counters constituting different orders, carry means interposed between said different orders, means forming a plurality of groups of impulse paths connected to different overlapping groups of result storage device counters, a plurality of column switch circuits each including an electronic switch tube having input control means and output means, the output means of the different electronic switch tubes being respectively coupled to the different groups of impulse paths, a source of impulses, an electronic cycle counter, means for transmitting impulses from said source to said cycle counter, said cycle counter comprising a primary section to which impulses are supplied from said source and by which are counted primary cycles each consisting of a pulse and a space, a secondary section to which impulses are supplied from said primary section and by which are counted secondary cycles each consisting of a given number of primary cycles, and a tertiary section to which impulses are supplied from said secondary section and by which are counted tertiary cycles each consisting of a given number of secondary cycles, each of said sections comprising a network including electronic tubes and having a plurality of stable states through which it steps in sequence in response to impulses applied thereto; each stable state being characterized by the conductive condition of a particular combination of the tubes of the network, and means controlled by said cycle counter for selectively transmitting metered groups of impulses from said source concurrently to the input control means of said electronic switch tubes, said means comprising means coupled to the tubes of the tertiary section of said cycle counter in various combinations for selectively transmitting impulses through chosen ones of said electronic switch tubes successively, said last means being operated progressively as the tertiary cycles are counted.

14. In a calculating device, a result storage device comprising a plurality of impulse operated electronic counters constituting different orders, carry means interposed between said orders, a factor receiving device comprising a plurality of impulse operated electronic counters, each counter operable in steps in proportion to an entered digit of said factor means for concurrently transmitting impulses to selected groups of said counters less than the total number of counters, comprising a number of sets of electronic tubes corresponding to the number of counters per group, each tube having a plate, a conditioning control grid, and an impulsing control grid, means interconnecting all of the conditioning control grids in each set, means connecting the impulsing control grid of each tube with the impulsing control grid of one tube in each other set to form a group, means connecting the plates of the tubes in each set with different counters, the plates of the different sets being connected in staggered relation to the counters, selective means for selectively transmitting impulses to the different groups of impulsing grids at different times, and means cooperating with each factor receiving counter for individually applying to the different sets of conditioning control grids, potentials adapted to render the tubes responsive to impulses applied to their impulsing control grids, said last means applying said potentials for various lengths of time in proportion to the value of the digit entered in its counter to determine, independently for each set, the number of impulses transmitted to the different counters through the tubes whose impulsing control grids are receiving impulses at the time.

15. In a calculating device, a result storage device comprising a plurality of impulse operated electronic counters constituting different orders, carry means interposed between said orders, means for concurrently transmitting impulses to selected groups of said counters less than the total number of counters, comprising a number of sets of electronic tubes corresponding to the number of tubes per group, each tube having a plate, a conditioning control grid, and an impulsing control grid, means interconnecting all of the conditioning control grids in each set, means connecting the impulsing control grid of each tube with the impulsing control grid of one tube in each other set to form a group, means connecting the plates of the tubes in each set with different counters, the plates of the different sets being connected in staggered relation to the counters, selective means for selectively transmitting impulses to the different groups of impulsing grids at different times, a cyclically operable storage counter for each set of tubes adapted to step from zero to zero in response to a given number of impulses, means for setting each storage counter to represent a digit for calculation, means for concurrently applying impulses to said storage counters, means operative to two conditions and operated by each storage counter, to one condition each time it passes to zero, for applying to the conditioning control grids of the related set of tubes a potential which renders the tubes responsive to impulses applied to their impulsing control grids, and means operating in synchronism with said selective means to operate said operative means to its other condition for depressing the potential on the conditioning control grids of all the tubes below the cutoff point prior to each time a different group of impulsing control grids is selected by said selective means.

16. In a multiplying device for multiplying a multiplicand having $m$ digits by a multiplier having $n$ digits, a product storage device comprising $m+n$ impulse operated electronic counters constituting different orders, carry means interposed between said orders; a multiplier storage device comprising $n$ electronic counters, a multiplicand storage device comprising $m$ electronic counters, all of said electronic counters being operable by electrical impulses and adapted to step through a complete cycle, from zero to zero, in response to a given number of impulses; means for setting the counters of said multiplicand and multiplier storage devices to represent multiplicand and multiplier factors, respectively; an array of product impulse switch tubes arranged in $m$ sets each containing $n$ tubes, there being one set for each multiplicand counter and one group comprising a tube in each set for each multiplier counter, each tube having input control means and output means, the output means of the set of tubes pertaining to the lowest order multiplicand counter being connected to the 1, 2, . . . $m$ orders of the product storage device, respectively, the output means of the set of tubes pertaining to the second order multiplicand counter being connected to the 2, 3 . . . $(m+1)$ orders of the product storage device, respectively, and the output means of the remaining sets of tubes being connected according to the same scheme to the different orders of the product storage device; impulse control means, means operated by said impulse control means for transmitting a sequence of multiplier readout impulses to each of said multiplier counters in turn, the sequence including a sufficient number of impulses to restore said multiplier counters to zero from any setting representing a significant value; means controlled by said impulse control means and initiated by each multiplier counter, on passing to zero, for transmitting to all of said multiplicand counters concurrently groups of impulses, each group having the correct number of impulses to cause said counters to cycle once; means operative to two conditions and operated by each multiplicand counter to one of said two conditions, on passing to zero for conditioning all the product impulse switch tubes in the related set to transmit impulses, means operating in synchronism with impulse control means to operate said operative means to the other of its two conditions to restore said tubes to non-transmitting condition, at the end of each cycle of said multiplicand counters; means operated by said impulse control means for selectively transmitting groups of impulses to the input control means of the different groups of said product impulse switch tubes, and for switching to a different group of tubes for each new sequence of multiplier readout impulses, the number of impulses in each group of impulses transmitted by said tubes to said product storage device counters being controlled by the point in each cycle of said multiplicand counters at which the latter pass through zero.

17. In a multiplying machine, means to feed a succession of record cards on which multiplier and multiplicand factors are recorded by designations placed in appropriate index point positions, the cards being spaced along the line of feed at a distance less than their dimension parallel to the direction of feed, a reading station through which the cards are fed to sense said factors, electronic pulse operated multiplier and multiplicand storage devices, means controlled by said machine producing pulses synchronized with said machine operation, means rendered operative upon sensing of said respective index point positions and cooperating with said pulses to pulse said multiplier and multiplicand storage devices to read into said storage devices the factors sensed on each card, a recording station to which the cards are fed directly from said reading station including recording devices for recording products on the cards, an electronic timer operative, out of synchronism with said machine, means controlled by said machine for starting said electronic timer immediately after a pair of factors has been read into said storage devices, means controlled by said electronic timer and cooperating with said multiplier storage device to produce pulses in proportion to the factor stored therein, means applying said pulses to said multiplicand counter, means controlled by said multiplicand counter for passing pulses in proportion to the value of the factor stored therein to produce a plurality of pulses proportional to the product of said multiplier and multiplicand factors, an impulse operated product accumulator operated by said last plurality of pulses, said operation being completed during the feed of the related card from the reading station to the punching station, means for restoring said storage devices to zero condition at the end of each multiplication, means for reading out said product accumulator and controlling said recording devices to record the product on the card during the passage of the latter through the recording station, and means for restoring said product accumulator to zero condition after each recording operation.

18. In a multiplying machine, a card reading station, a recording station, cyclically operable card feeding means adapted to feed a card through said card reading station during a portion of one cycle and through said recording station during a portion of the next cycle, an electronic multiplying device comprising a product storage device and two factor storage devices, each of said devices comprising an impulse operated electronic counter, means at said reading station for sensing two factors for calculation from two different fields of a card during a portion of one machine cycle, means controlled by said machine and by said sensing means for reading said factors into the respective factor storing devices, a source of electrical impulses, an electronic timer operable at electronic speed out of synchronism with said card machine, for regulating transmission of said pulses, means operable by said machine at the end of sensing of a card for beginning the transmission of impulses from said source to said timer, means controlled by said timer and said factor storage devices for electronically multiplying the factors stored in said factor storage devices at a rate greatly accelerated with respect to said machine operation and entering the result in said product storage device, and means for operating said recording means during a portion of the next machine cycle, under control of said result storage device, to record the result in a third field of the card.

19. In a calculating device, the combination of factor storage means and result storage means, each of said means comprising a plurality of electronic trigger circuits, an electronic timer, a source of impulses, and means cooperating with the latter for impressing impulses upon said factor storage means corresponding to factors of a problem, impulse metering means associated with said source, and means controlled by said timing means and said factor storage means for controlling said impulse metering means for metering a controlled quantity of impulses to said result storage means.

20. A multiplying device for multiplying in a plurality of orders comprising multiplicand storage devices, one for each order, multiplier storage devices, one for each order, each device comprising a series of electronic trigger elements, operative in steps, means for stepping said multiplicand storage devices to represent the digits of the multiplicand, and for stepping said multiplier storage devices to represent the digits of a multiplier, electronic timing means, column shift means whose conditions are altered under control of said timer means for controlling all said multiplicand devices selectively by each of said multiplier devices, a plurality of product storage devices, each comprising a series of electronic trigger elements operative in steps, carry means for said devices, transmission means for coupling said multiplicand orders and said product storage devices, said column shift means when its conditions are altered under control of said timer means cooperating with said multiplicand storage device to render effective said transmission means in selected groups to connect all said multiplicand orders to selected groups of said product storage orders.

21. In a calculating device for calculations involving column shift, a result storage device and first and second factor storage devices, each of said devices comprising a plurality of electronic circuits constituting different orders, said result storage device including carry means interposed between orders, an electronic timer comprising a series of trigger elements, each operable to either of two sustained electrical conditions, electronic column shift means controlled by said electronic timer means said column shift means, when controlled by different permutations of electrical conditions of said series of trigger circuits, selectively coupling the orders of one of said factor storage devices, in sequence, to all of the orders of said second factor storage device and selectively coupling all the orders of said second storage device to select groups of the orders of said product storage device, dependent upon the particular permutative control by said timer.

22. In a calculating device for calculations involving column shift, a plural order storage device, carry means connecting said orders, and first and second plural order factor storage devices, an electronic timer comprising a series of sequentially operable electronic trigger elements, each operable to an "on" and to an "off" electrical condition, electronic column shift means comprising a series of electronic circuits and means for applying selectively the different permutations of said "on" and said "off" electrical conditions to each of said circuits whereby said circuits respectively and selectively control the connection of each of the orders of said first plural order factor storage device to all of the orders of said second plural factor storage device and the connection of all of the orders of said second storage device to selected groups of orders of said product storage device.

23. In a calculating device for calculations involving a column shift, a plural order storage device, carry means connecting said orders, and first and second plural order factor storage devices, a column shift device comprising a plurality of circuits, one for each order of said factor storage devices, each circuit comprising a pair of similar electronic devices and each device including an input control element and an output element, and means comprising a plurality of trigger circuits operable to different permutations of stable conditions controlling the input elements of said respective circuits to selectively render effective both output elements of the respective circuits in accordance with the respective permutations to thereby connect, by the operation of each of said circuits, one order of said first factor storage device to all the orders of said second factor storage device and all the orders of said second factor storage device to select groups of orders of said result storage device.

24. In a machine of the character described, means controlled by said machine to feed a record card on which a control factor is recorded by a designation placed in an appropriate index point position, a reading station through which said card is fed to sense said factor, an electronic factor storage device comprising a series of pulse actuated elements, operable in steps, electronic gate means for said storage device for passing pulses to said storage device upon being rendered operable, means controlled by said machine to produce a series of pulses for application to said gate means, and an electronic trigger operable to either of two electrical sustained conditions, one of which renders said gate means operative and the other of which renders said gate means inoperative and tripped to that condition which renders the gate means operative upon sensing of said factor designation for rendering said gate means operative to selectively pass pulses out of said series, to step said storage means to an electrical condition indicative of the value of said recorded factor.

25. A computing device comprising a first denominational factor storage device, a second denominational factor storage device, and a denominational accumulating device each comprising a plurality of electronic elements operable by electric pulses, means for operating said factor storage devices respectively to respective denominational electrical conditions, each indicative of a digit of a factor, relay means for relaying to respective denominations of said accumulator, in groups, a number of pulses respectively representative of the electrical condition in each order of one factor storage device, means controlled by said relays for changing the individual denominations comprising groups of denominations of said accumulator, said respective groups comprising partially overlapping denominations, means controlled in accordance with the electrical conditions of the respective orders of the other factor storage device for controlling the number of times pulses are relayed to a chosen group of denominations, and means for coordinating the selective operation of said relays to shift relaying of pulses to different groups of denominations with the operation of different denominations of said other factor storage device.

26. In combination, a first counter circuit having denominational order networks each comprising a plurality of electronic circuits operable to assume a pattern of electrical conditions representative of one factor, a second similar counter operable to assume a condition representative of another factor, an electronic accumulator, means for applying pulses to said first counter to produce extraneously of said counter an electrical manifestation representative of the factor stored therein, and means controlled by said extraneous manifestation to repeatedly transfer under control of said second counter to said accumulator a series of pulses representative of the factor stored in said second counter, a number of times equal to said first factor.

27. A device as in claim 26 in which said means controlled by said extraneous manifestation includes means for applying pulses to said second counter to produce extraneously thereof a second electrical manifestation representative of the factor in said second counter.

28. In combination, a first counter circuit having denominational order networks each comprising a plurality of electronic circuits operable to assume a pattern of electrical conditions representative of one factor, a second similar counter operable to assume a pattern of electrical conditions representative of another factor, a pulse operated accumulator, means for applying pulses to said first counter to produce extraneously thereof an electrical manifestation representative of the factor stored therein, and means controlled in accordance with the pattern of conditions in said second counter and the extraneous manifestation of said first counter for regulating the application of pulses to said accumulator in accordance with both said factors.

29. In combination, a first counter circuit having denominational order networks each comprising a plurality of electronic circuits operable in steps to assume a pattern of electrical conditions representative of one factor, a second similar counter operable in steps to assume a pattern of electrical conditions representative of another factor, an electronic accumulator, means for applying pulses to said first counter to produce extraneously of said counter an electrical manifestation representative of the factor stored therein, means controlled by said extraneous manifestation to control application of a series of pulses to said second counter a number of times equal to the factor in said first counter to produce, each time, extraneously of said second counter, an electrical manifestation of the factor stored in said second counter, and means controlled by said last manifestation to regulate transmission of pulses to said accumulator in accordance with the value of the factor in said second counter, each time such a series of pulses is applied thereto.

30. In combination, an electronic counter comprising a series of electronic circuits operable in steps to assume electrical conditions representative of a quantity entered therein, mechanical recording means for producing a record of said quantity, means operable in synchronism with said recording means for producing a series of pulses, means applying said pulses to said counter to step said counter to different patterns in accordance with the number of pulses applied thereto, and means operable upon assumption of a certain pattern by said counter for rendering said recording means operative to record said quantity.

31. In a multiplying device, a multi-ordered product storage device, carry means for said device, a multiplicand storage device and a multiplier storage device each device comprising an electronic counter; means for setting said multiplicand and multiplier storage devices to represent multiplicand and multiplier factors, respectively; impulse metering means adapted to cooperate with said multiplicand and multiplier storage devices to meter impulses to said product storage device, stepping means cooperating with said multiplier storage device for controlling said metering means to control the metering of impulses in each step in accordance with a different digit stored in said multiplier storage device and said multiplicand storage device cooperating with said multiplier storage device whereby the pulses metered in each step are indicative of the product of all the multiplicand digits times one only of said multiplier digits.

32. In a calculating device, a multi-ordered result storage device comprising in each order, an electrical impulse operated electronic counter, carry means for said device, two factor storage devices, means for setting said factor storage devices to represent two factors, respectively, impulse metering means adapted to cooperate with said factor storage devices to meter pulses to said result storage device controlled in number by both said factors, one of said factor storage devices controlling said metering means to meter a number of impulses for each digit stored in said one factor storage device, and means controlled by the other factor storage device for regulating the number of impulses so metered, in proportion to the complete number stored in said other factor storage device and one only of the digits of the number stored in said one storage device.

33. In a calculating device for calculations involving column shift, a plurality of column shift circuits each including an electronic switch tube having input control means and output means, the output means of the different electronic switch tubes being respectively coupled to different overlapping groups of output paths, and selective means comprising a plurality of trigger circuits operable to different permutations of stable conditions for selectively conditioning the input control means of said electronic switch tubes to render said tubes effective in accordance with selected mutually exclusive permutations whereby said overlapping groups of output paths become effective one group at a time.

34. A calculating device for calculating in a plurality of orders and comprising, one group of storage devices one device for each order of a factor, a second group of storage devices one device for each order of another factor, a third group of storage devices one device for each order of a result, each of said devices comprising electronic elements and said result devices operable in steps, carry means for said result orders, an electronic timer, column shift means comprising a series of elements sequentially operative to a selected condition under control of said timer, one of said series of elements when so operated selectively connecting one of the orders of one of said factors to control the input to all of the orders of the second of said factors and connecting all of the orders of the second of said factors to a selected subgroup of the result orders.

35. A calculating device for calculating in a plurality of orders and comprising, one group of factor storage devices one device for each order of a factor, a second group of storage devices, one device for each order of another factor, a third group of storage devices providing result storage one device for each order thereof, each of said devices comprising electronic elements and said result devices operable in steps, carry means for said result orders, an electronic timer, column shift means comprising a series of elements sequentially operative to a selected condition under control of said timer, one of said series of elements when so operated rendering one of the orders of one factor storage device effective to control all of the orders of the other factor storage device.

36. A calculating device for calculating in a plurality of orders and comprising one group of storage devices one device for each order of a factor, a second group of storage devices one device for each order of another factor, a third group of storage devices for storing a result one device for each order thereof, each of said devices comprising electronic elements and said result devices operable in steps, carry means for said result orders, an electronic timer, column shift means comprising a series of elements sequentially operative to a selected condition under control of said timer, one of said series of elements when so operated selectively connecting all of the orders of one of said factors to a selected subgroup of the result orders.

37. An electronic calculator comprising a series of orders each including electronic trigger elements, said elements, per order, being less in number than the radix employed, means controlled in proportion to the value of one factor to apply pulses to selected orders in proportion to the value of said fatcor, and means controlled in proportion to the value of a second factor to control said applying means to further alter the pulses applied to selected orders in proportion to the value of said second factor.

38. An electronic calculator comprising a series of orders each including electronic trigger elements, said elements, per order, being less in number than the radix employed, means controlled in proportion to the value of one factor for metering to selected orders, groups of pulses, said groups being proportional to the value of said factor and means controlling said applying means to render effective out of each group a number of pulses in proportion to the value of a second factor.

39. An electronic computer comprising electronic accumulator means, electronic storage means comprising a series of electronic trigger elements, less in number than the radix employed and selectively settable to electronic patterns to represent one factor, and means controlled in accordance with another factor for transferring from said storage means to said accumulator electronic manifestations in accordance with the pattern of said one factor a number of times equal to said second factor.

40. A computer including an electronic accumulator, comprising in each order, a number of electronic trigger elements settable to respective on and off conditions and less in number than the radix employed, means for setting said orders selectively to patterns of on and off conditions, each representative of a different digit of said radix, means interconnecting the trigger elements of each order and the respective orders, whereby the successive pattern values of the same or different patterns are accumulated by said orders, storage means settable to represent one factor, means controlled by said storage means for transferring to said accumulator electronic manifestations representative of said factor to initially set said accumulator orders in respective patterns to represent the digits of said factor, and means controlling the repeated operation of said transferring means a number of times equal to a second factor.

41. A computer comprising a multiordered electronic accumulator, electronic storage means comprising a plurality of trigger elements comprising electron valve means whose current flow is adjustable to either one of two sustained conditions purely by alteration of an electrical phenomenon, one of said sustained conditions being termed the on condition and the other being termed the off condition, said elements thereby being settable to any one of ten patterns to represent a first factor by the mutually exclusive patterns of on and off conditions of said elements, means controlled by said storage means to transfer to said accumulator, pulses in accordance with said on and off pattern representative of said first factor, and means for further regulating said transfer in accordance with a second factor to control said transfer of pulses whereby said pulses are transferred to the orders of said accumulator in a pattern representative of the product of said first and second factors.

42. A computer comprising a multiordered electronic accumulator, a multiordered factor storage means, each order comprising a plurality of electronic trigger elements comprising electron valve means whose current flow is adjustable to either one of two sustained conditions purely by alteration of an electrical phenomenon, one of said conditions being termed the on condition and the other being termed the off condition, said elements being settable as a group to any one of ten chosen patterns of on and off conditions each mutually exclusively representative of a digit entered therein, means for setting said trigger elements of said factor storage means selectively in each of chosen orders in a pattern in accordance with the digits of one factor, a second factor storage means similarly settable in patterns in accordance with the digits of a second factor, means controlled by the pattern of each of the orders respectively of said first factor storage means for transferring pulses to said accumlator in accordance with said patterns, and means controlled by all the patterns of all the orders of said second factor storage means for regulating the transfer of said pulses in accordance with the product of each of the digits of said first factor storage device and all of the digits of said second factor storage device.

BYRON E. PHELPS.

REFERENCES CITED

The following references are of record in the file of this patent:

UNITED STATES PATENTS

| Number | Name | Date |
|---|---|---|
| 1,982,020 | Read | Nov. 27, 1932 |
| 2,079,429 | Tauschek | May 4, 1937 |
| 2,182,006 | Tauschek | Dec. 5, 1939 |
| 2,346,616 | Saxby | Apr. 11, 1944 |
| 2,402,988 | Dickinson | July 2, 1946 |
| 2,442,428 | Mumma | June 1, 1948 |
| 2,465,355 | Cook | Mar. 29, 1949 |
| 2,484,081 | Dickinson | Oct. 11, 1949 |
| 2,502,360 | Williams | Mar. 28, 1950 |

FOREIGN PATENTS

| Number | Country | Date |
|---|---|---|
| 476,935 | Great Britain | Apr. 26, 1937 |

OTHER REFERENCES

Method of Registering Multiple Simultaneous Impulses of Several Geiger Counters, Rossi, "Nature," April 25, 1930, page 636.

Switching Action of the Eccles-Jordan Trigger Circuit, Toomin, "Review of Scientific Instruments," June 1939, pages 191 and 192.

A Four Tube Counter Decade, Potter, "Electronics," June 1944; pp. 110—113, 358 and 360.

Electronic Counters, Grosdoff, "RCA Review," Sept. 1946, pp. 444 and 445.

---

Certificate of Correction

Patent No. 2,624,507                  January 6, 1953

BYRON E. PHELPS

It is hereby certified that error appears in the printed specification of the above numbered patent requiring correction as follows:

Column 49, line 2, strike out "selected" and insert the same before "factor" in line 3; column 51, line 21, for "conductive" read *non-conductive*; column 53, line 55, after "In" insert *a*; line 56, for "columnshift" read *column shift*; column 54, lines 61 and 62, strike out "concurrently"; column 62, line 27, for "fatcor" read *factor*; line 44, for "accumulator" read *accumulating*; column 64, lines 1 and 2, for "accumlator" read *accumulator*;

and that the said Letters Patent should be read as corrected above, so that the same may conform to the record of the case in the Patent Office.

Signed and sealed this 26th day of May, A. D. 1953.

[SEAL]

THOMAS F. MURPHY,
*Assistant Commissioner of Patents.*